(12) United States Patent
Zhang et al.

(10) Patent No.: US 8,774,251 B2
(45) Date of Patent: Jul. 8, 2014

(54) PHYSICAL LAYER DATA UNIT FORMAT

(75) Inventors: Hongyuan Zhang, Fremont, CA (US); Songping Wu, Cupertino, CA (US); Hui-Ling Lou, Sunnyvale, CA (US); Rohit U. Nabar, Sunnyvale, CA (US)

(73) Assignee: Marvell World Trade Ltd., St. Michael (BB)

(*) Notice: Subject to any disclaimer, the term of this patent is extended or adjusted under 35 U.S.C. 154(b) by 0 days.

(21) Appl. No.: 13/453,609

(22) Filed: Apr. 23, 2012

(65) Prior Publication Data
US 2012/0207192 A1    Aug. 16, 2012

Related U.S. Application Data

(63) Continuation of application No. 12/569,547, filed on Sep. 29, 2009, now Pat. No. 8,165,185.

(60) Provisional application No. 61/100,948, filed on Sep. 29, 2008, provisional application No. 61/101,833, filed on Oct. 1, 2008, provisional application No. 61/108,079, filed on Oct. 24, 2008, provisional application No. 61/110,357, filed on Oct. 31, 2008, provisional application No. 61/120,973, filed on Dec. 9, 2008, provisional application No. 61/121,392, filed on Dec. 10, 2008, provisional application No. 61/153,102, filed on Feb. 17, 2009, provisional application No. 61/156,651, filed on Mar. 2, 2009, provisional application No. 61/171,343, filed on Apr. 21, 2009, provisional application No. 61/174,382, filed on Apr. 30, 2009.

(51) Int. Cl.
*H04B 1/00*    (2006.01)

(52) U.S. Cl.
USPC .......................................... 375/135; 375/146

(58) Field of Classification Search
USPC .................. 375/135, 146, 130, 134, 145, 260
See application file for complete search history.

(56) References Cited

U.S. PATENT DOCUMENTS

| 6,771,976 B1 | 8/2004 | Koyama |
|---|---|---|
| 2004/0252777 A1 | 12/2004 | Suh et al. |

(Continued)

FOREIGN PATENT DOCUMENTS

| JP | 2010-532302 A | 10/2010 |
|---|---|---|
| WO | WO-2009/059229 A1 | 5/2009 |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physcial Layer in the 5 GHZ Band," *The Institute of Electrical Engineers, Inc.* (1999).

(Continued)

*Primary Examiner* — Emmanuel Bayard

(57) ABSTRACT

A method, implemented in a communication device configured to generate PHY data units corresponding to a first modulation mode and PHY data units corresponding to a second modulation mode, includes generating a PHY data unit having a CEF, including generating a sequence u of the CEF and generating a sequence v of the CEF. Sequence u includes complementary Golay sequences a and b, and is spread with a first cover code. Sequence v includes the complementary Golay sequences a and b, and is spread with a second cover code. The PHY data unit is generated such that sequence u precedes sequence v when the PHY data unit corresponds to the first modulation mode, and sequence v precedes sequence u when the PHY data unit corresponds to the second modulation mode. The method also includes causing the PHY data unit to be transmitted via a communication channel.

18 Claims, 39 Drawing Sheets

(56) References Cited

U.S. PATENT DOCUMENTS

| | | | |
|---|---|---|---|
| 2007/0168841 A1* | 7/2007 | Lakkis | 714/781 |
| 2009/0160707 A1 | 6/2009 | Lakkis | |
| 2009/0323587 A1 | 12/2009 | Trachewsky et al. | |
| 2010/0157907 A1* | 6/2010 | Taghavi Nasrabadi et al. | 370/328 |

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.* (2001).

"IEEE 802.15.3™ Guide Addresses Untapped High-Rate Wireless Personal Area Network (WPAN) Market," *The Institute of Electrical and Electronics Engineers, Inc.*, available at http://standards.ieee.org/announcements/pr_802153wpanguide.html (2004).

IEEE Std 802.15.3/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physcial Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2008).

International Search Report for PCT/US2009/058795, mailed Jan. 20, 2010.

Written Opinion of the International Searching Authority for PCT/US2009/058795, mailed Jan. 20, 2010.

Funada et al., "A design of single carrier based PHY for IEEE 802.15.3c standard," The 18th Annual IEEE International Symposium on Personal, Indoor and Mobile Radio Communications (PIMRC'07), *The Institute for Electrical and Electronics Engineers* (2007).

International Preliminary Report on Patentability for International Application No. PCT/US2009/058795, dated Mar. 29, 2011.

Notice of Rejection in corresponding application No. JP 2011-529353 dated Jun. 18, 2013.

Harada et al., CoMPA PHY proposal, IEEE 802.15-07-0693-03-003c, May 2007, slides 24-33.

Lakkis et al., "mmWave OFDM Physical Layer Proposal," IEEE 802.15-0760-03-003c, Sep. 2007.

Notification of the First Office Action in CN Application No. 200980138268.9 dated Jul. 2, 2013.

Second Office Action in Chinese Application No. 200980138268.9 dated Jan. 27, 2014.

* cited by examiner

588 →

| -Ga |
| Ga |
| -Ga |
| Ga |
| -Ga |
| ⋮ |

| Ga |
| Ga |
| Ga |
| Ga |
| Ga |
| ⋮ |

| Gb |
| Gb |
| Gb |
| Gb |
| Gb |
| ⋮ |

*FIG. 7B*

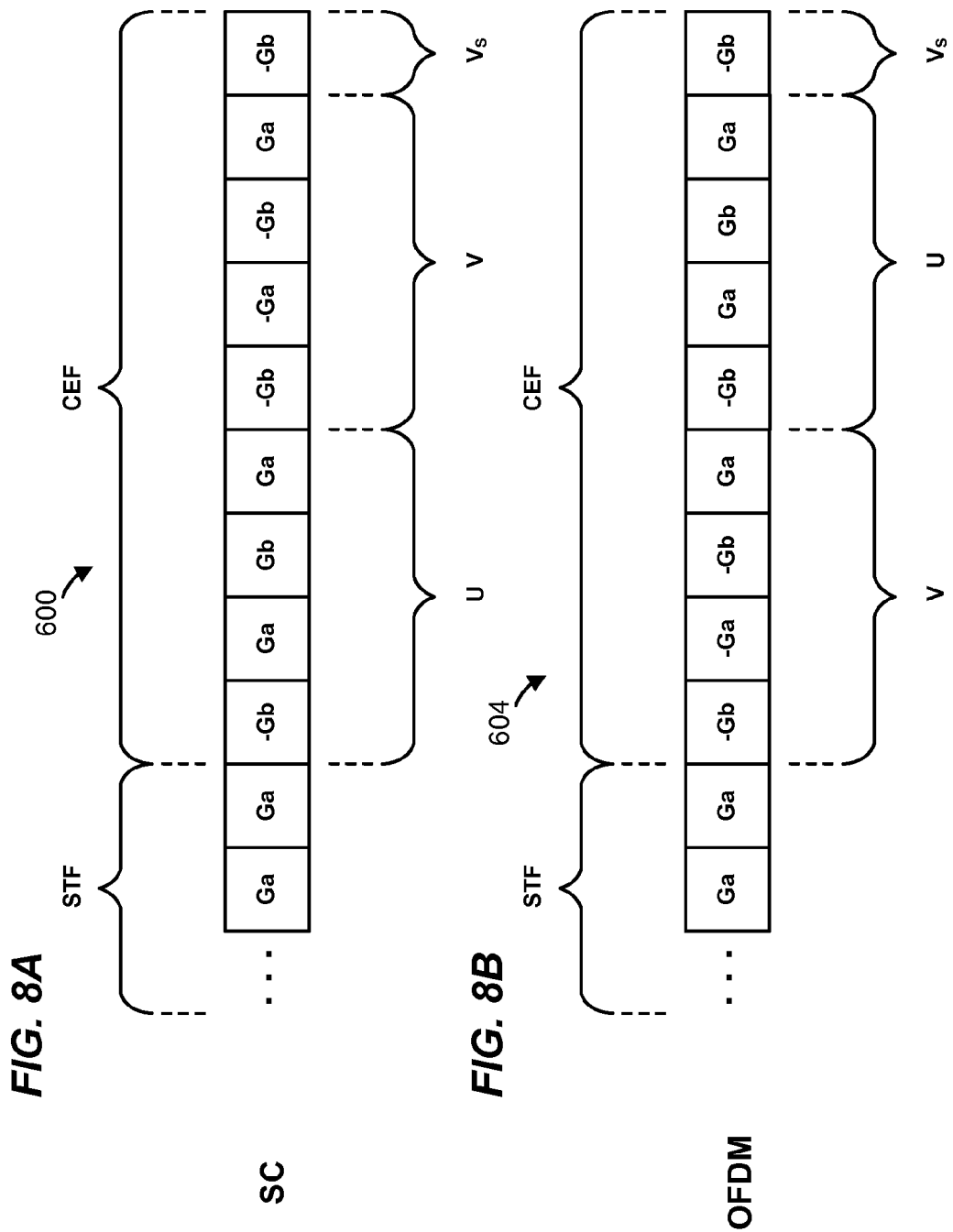

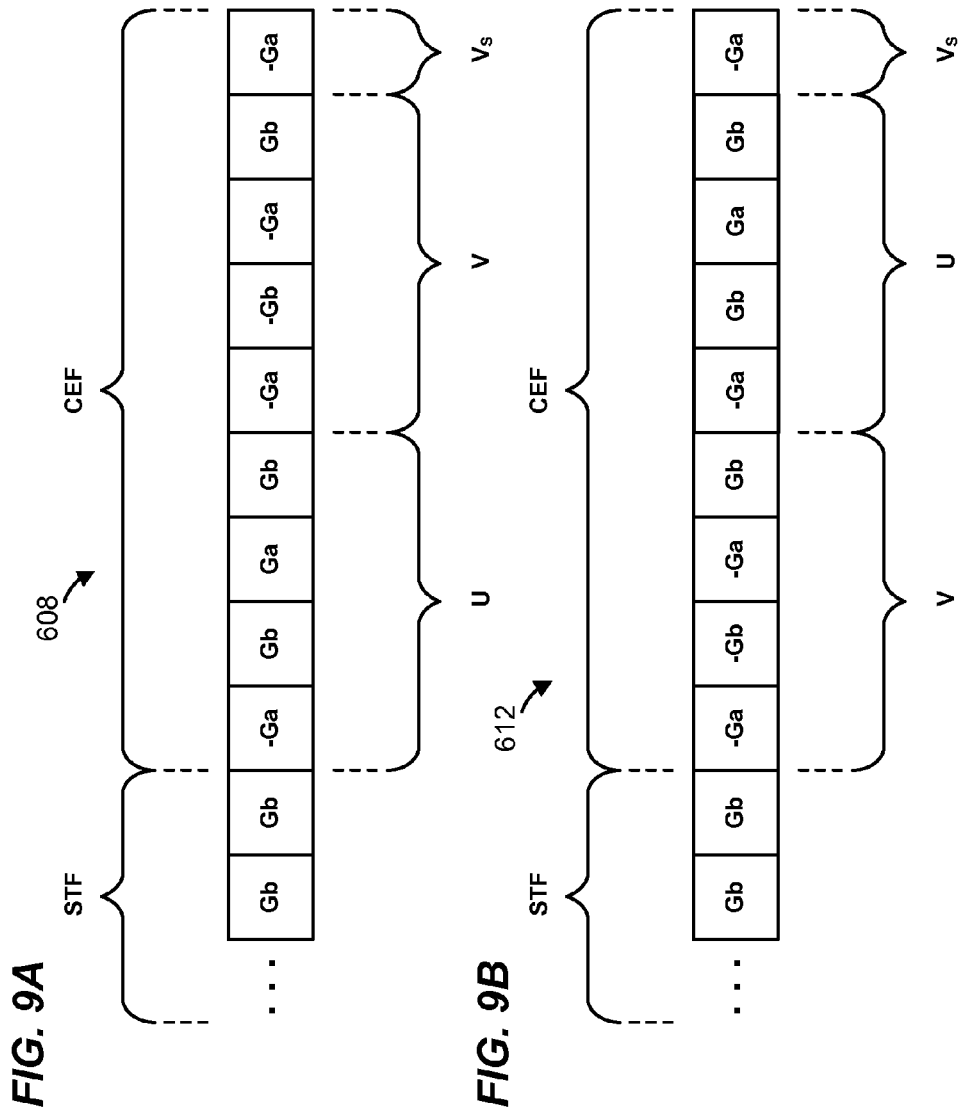

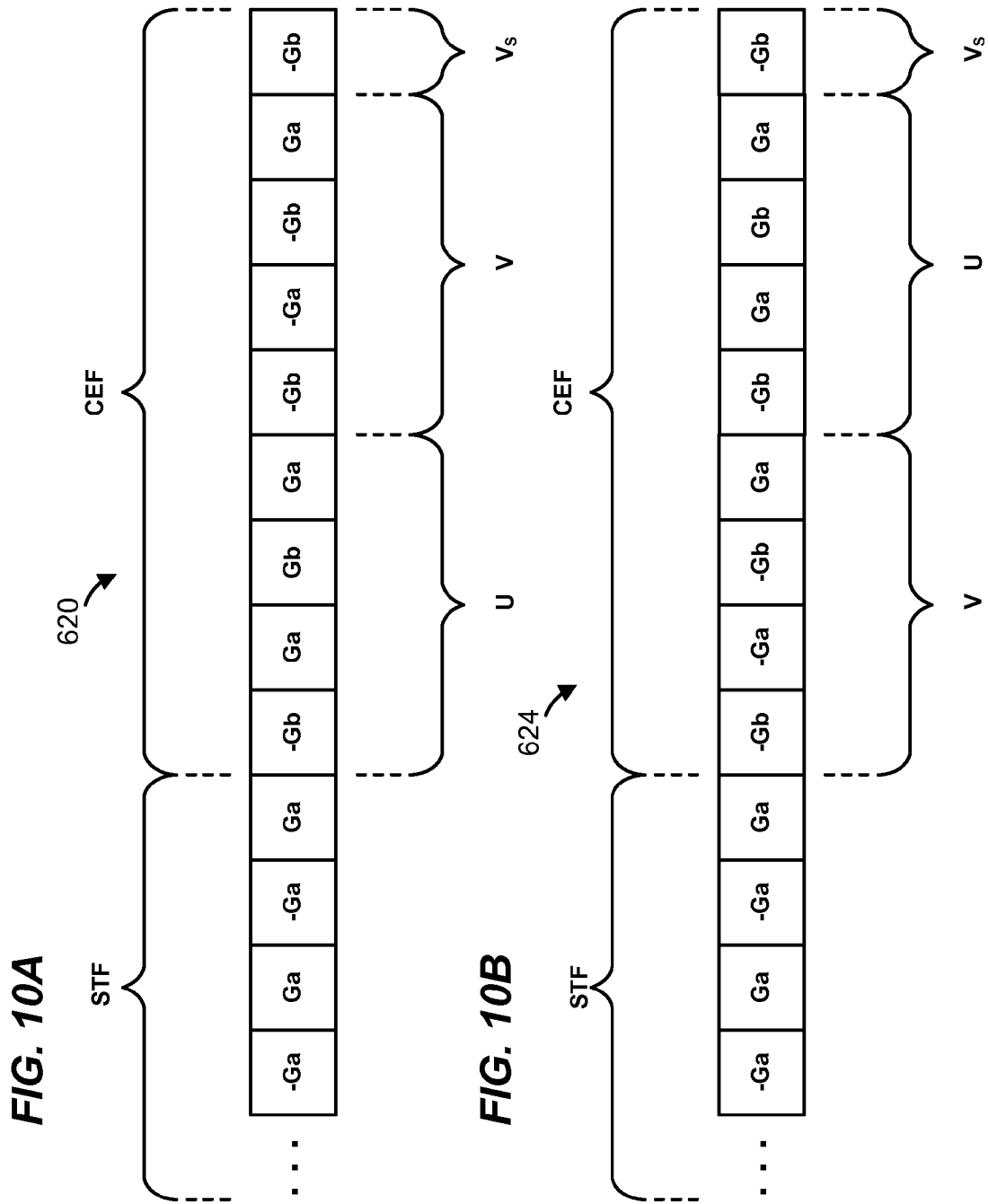

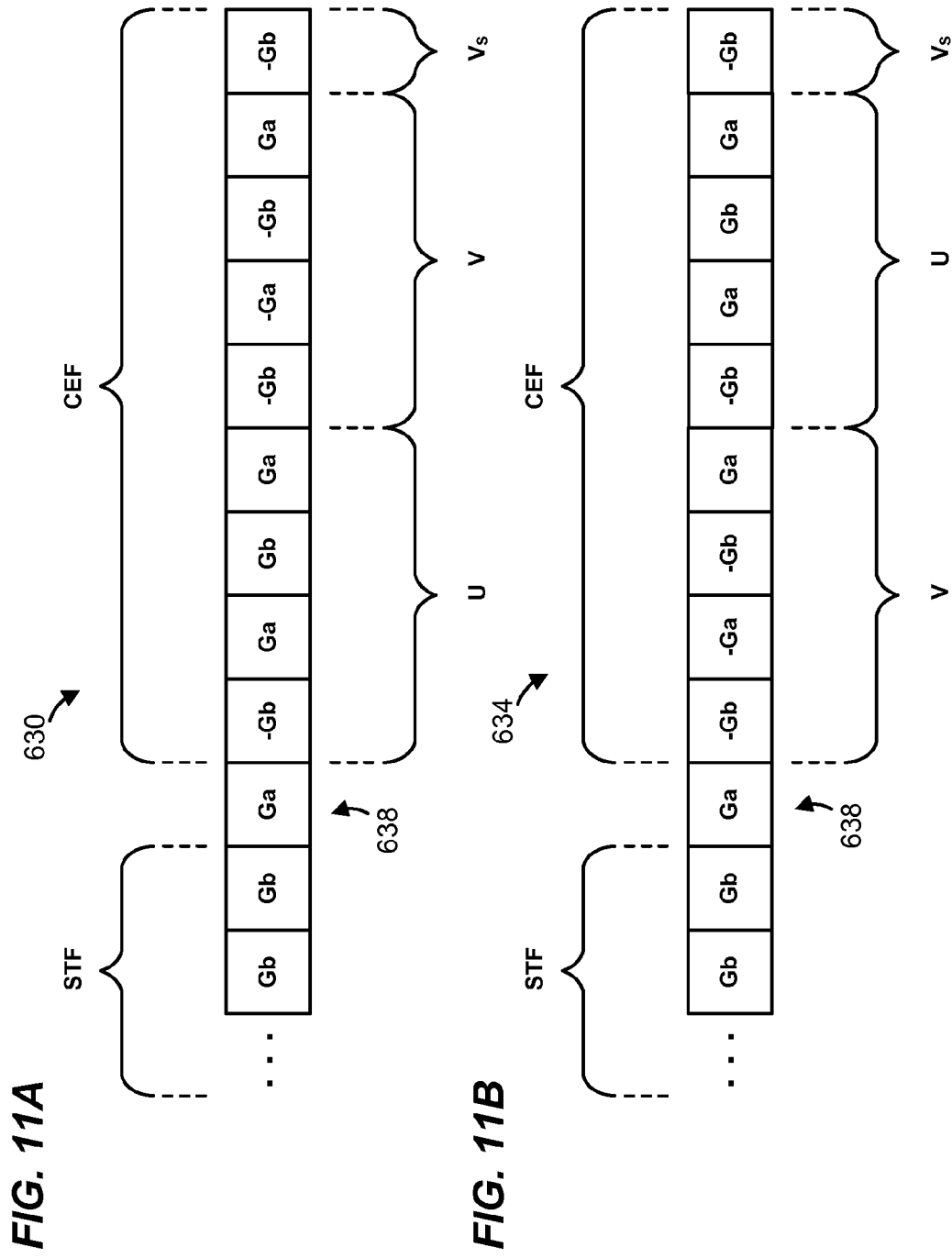

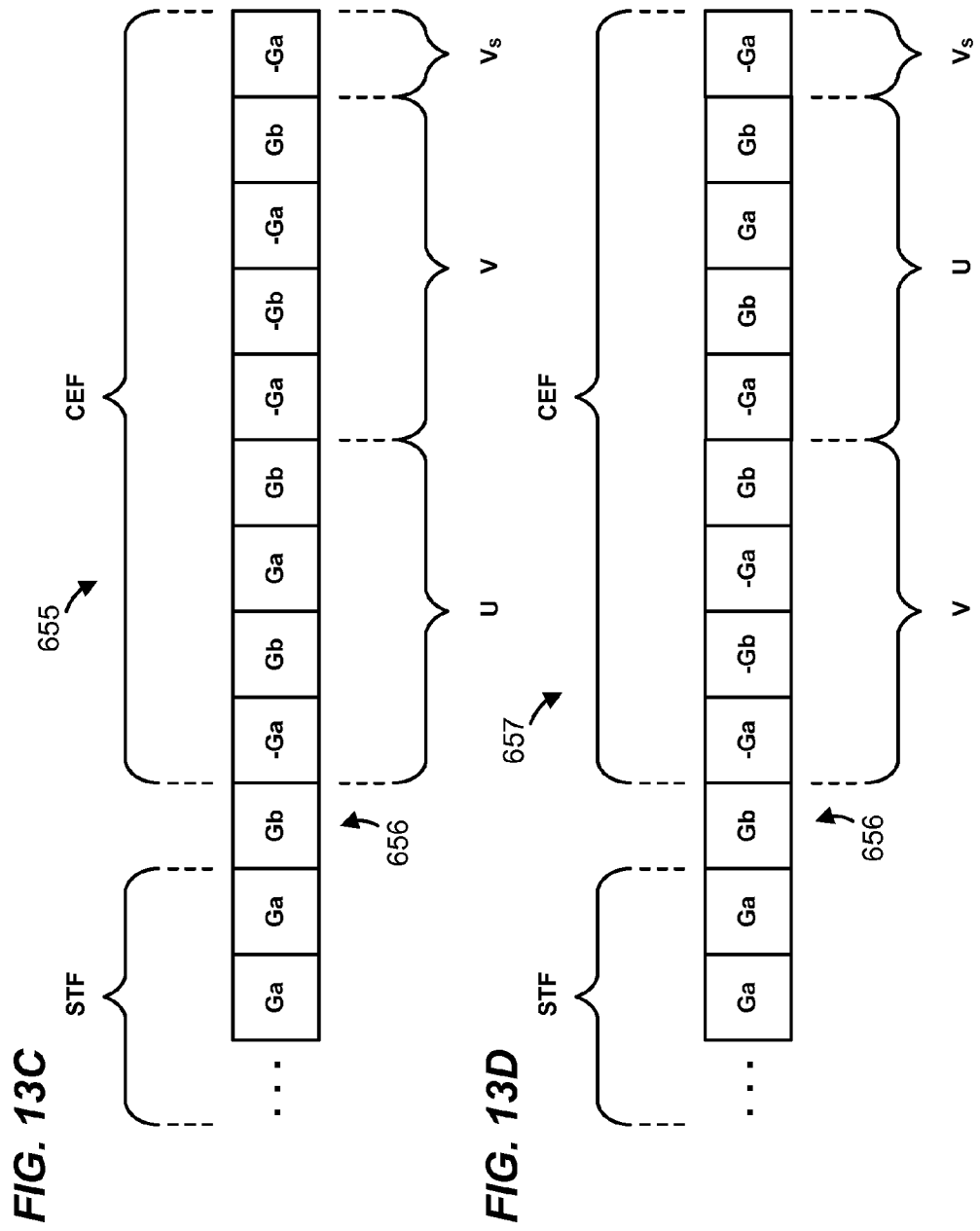

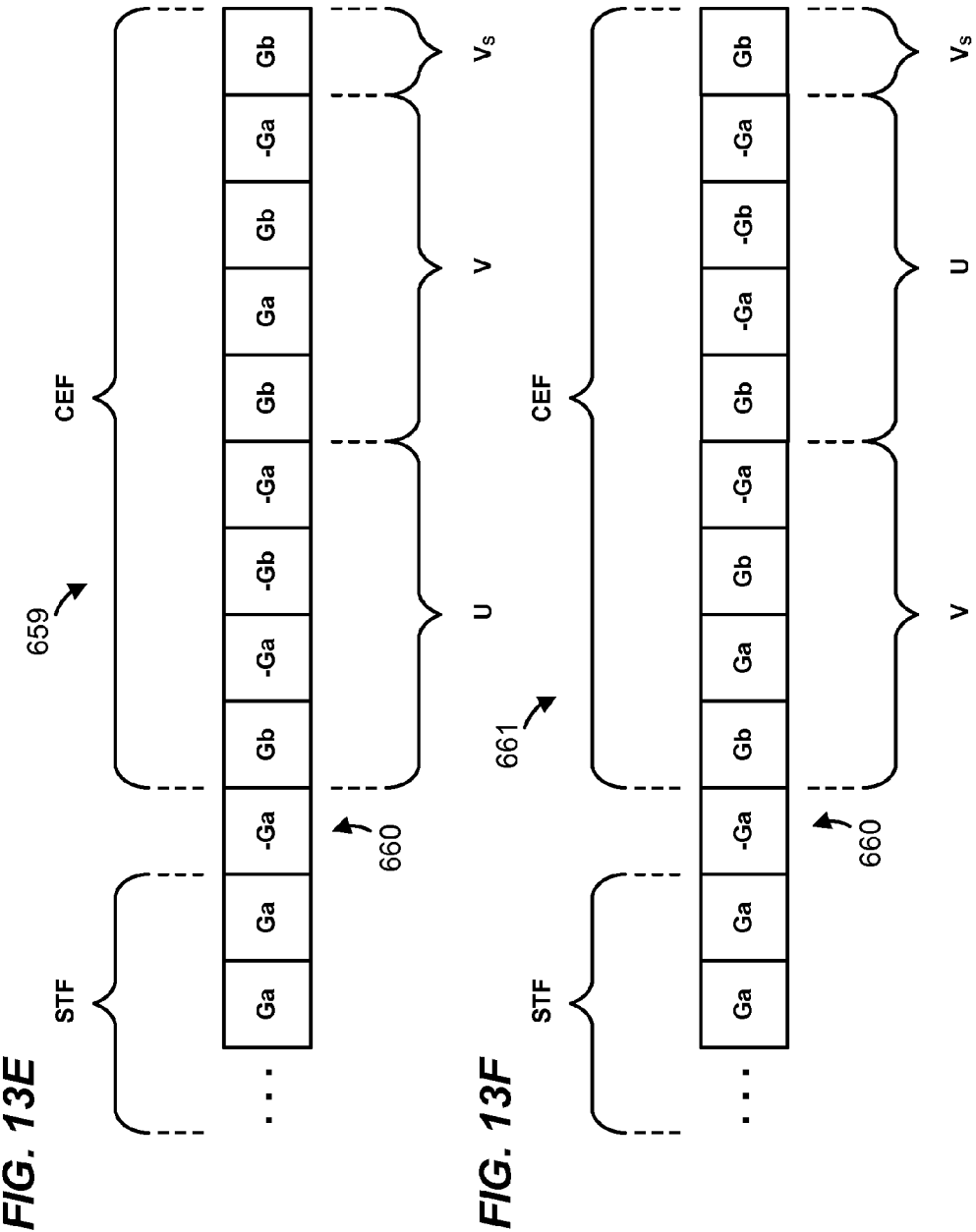

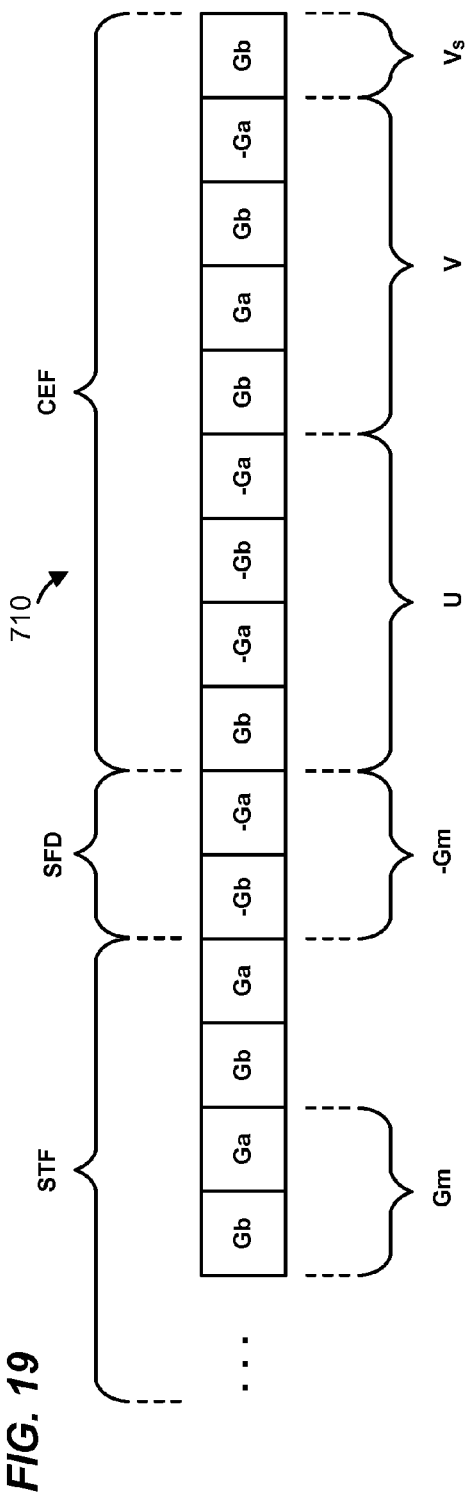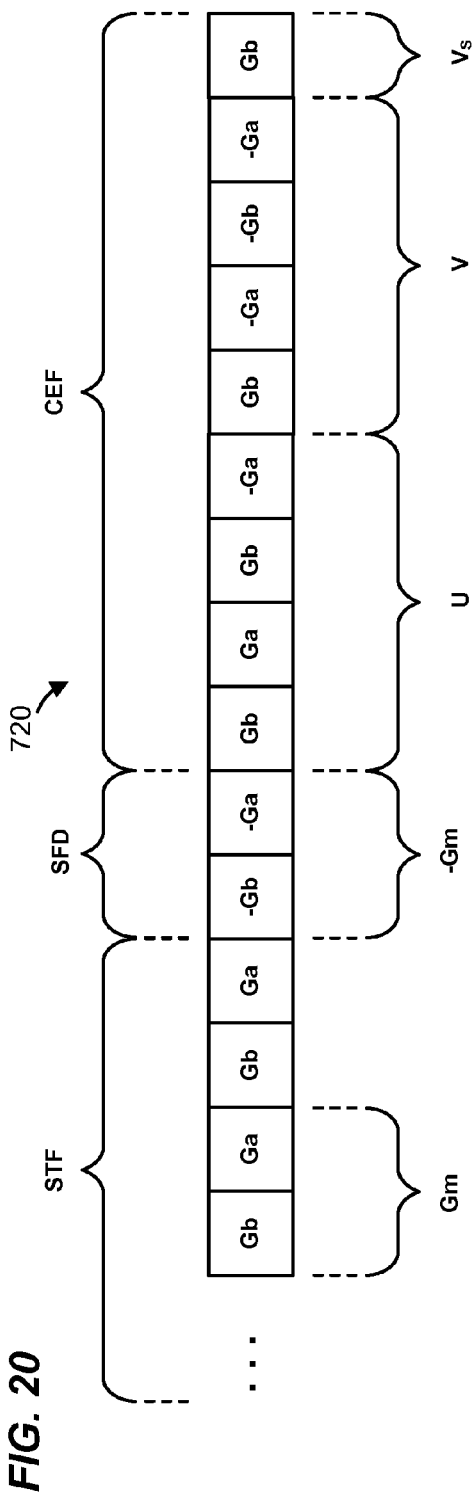

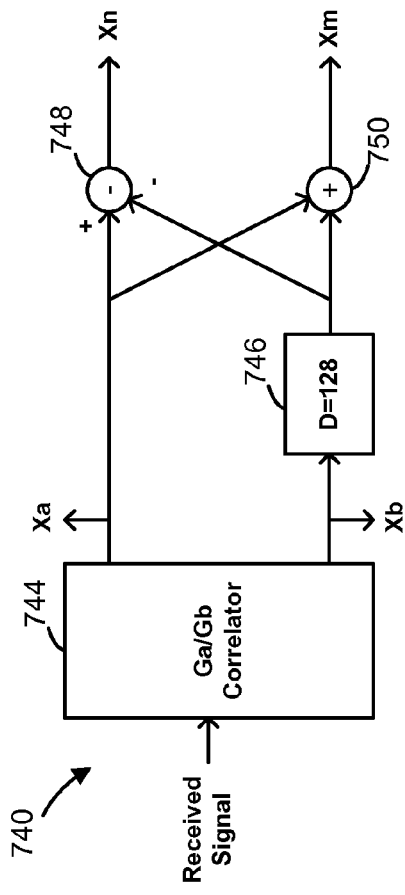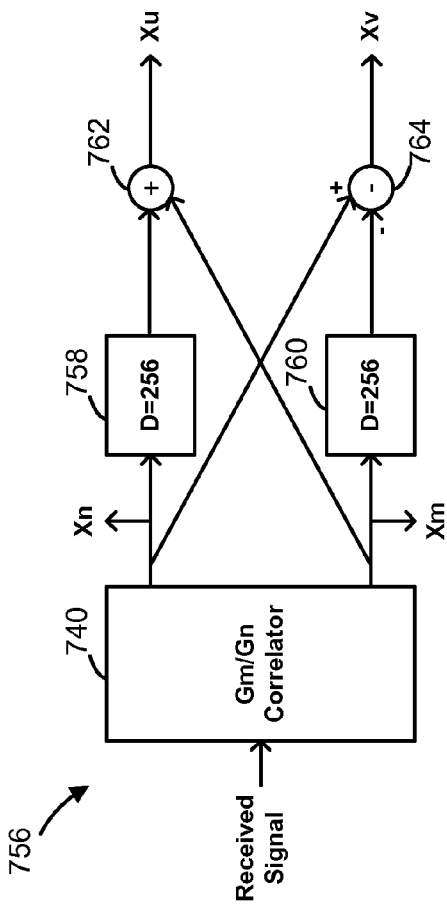

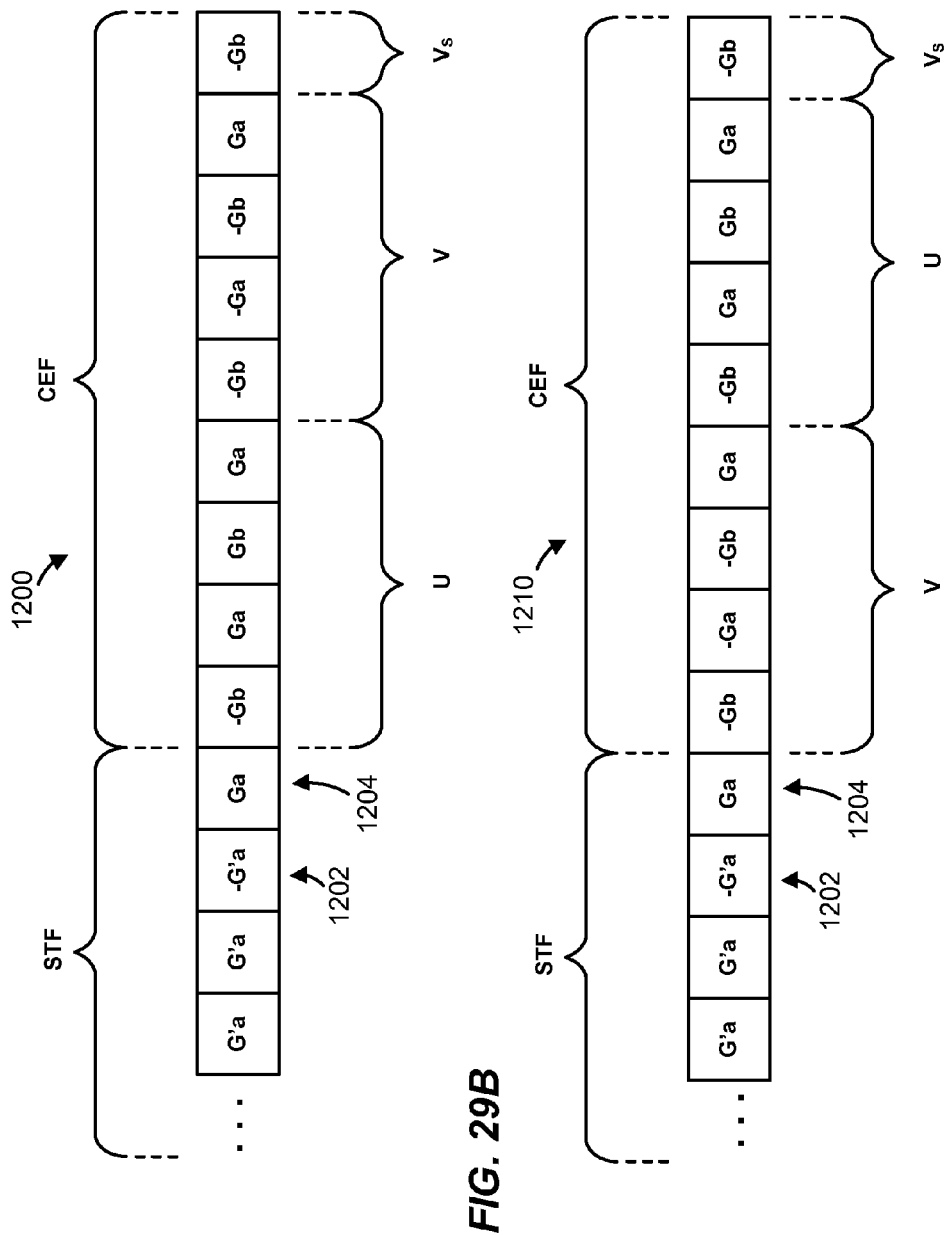

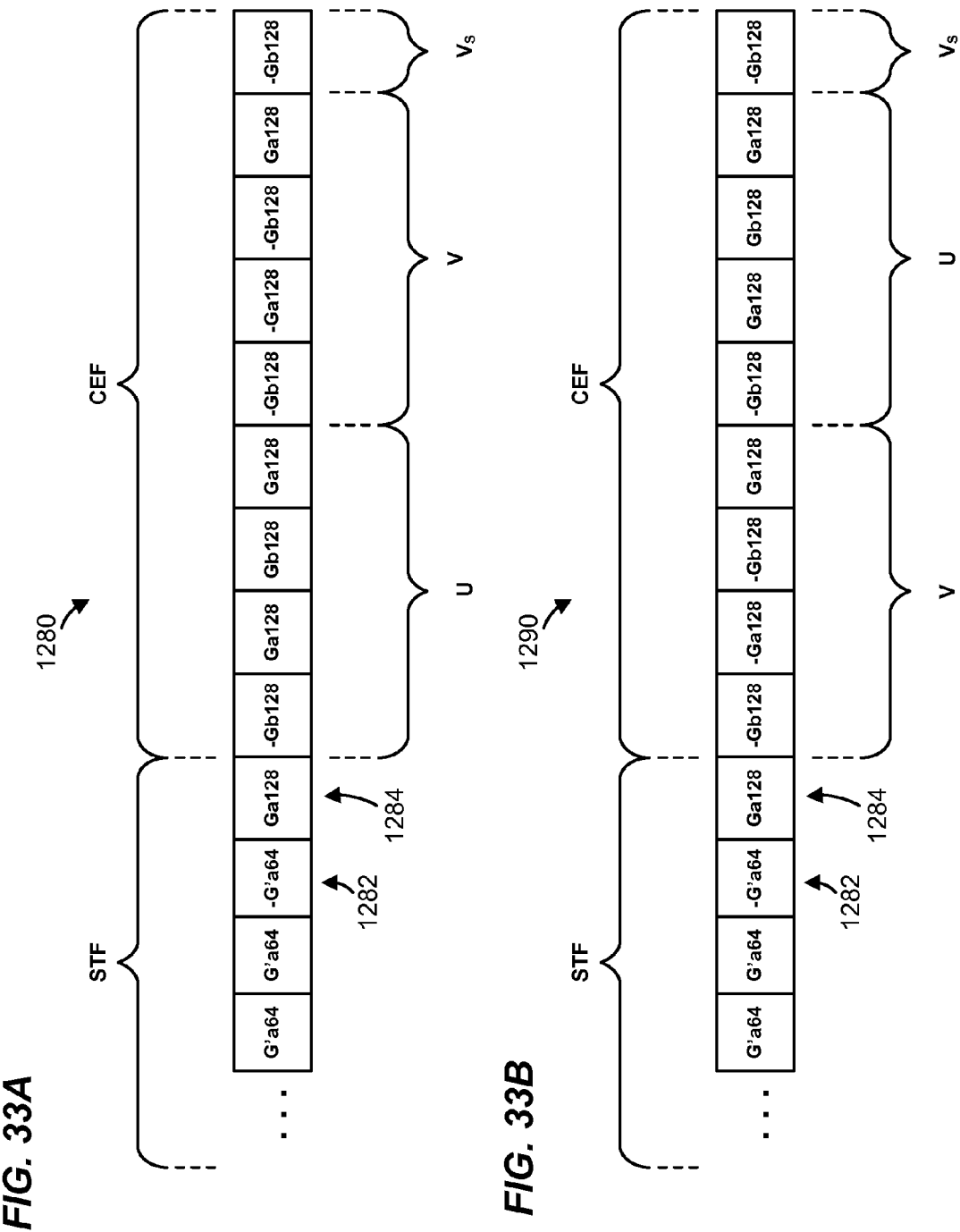

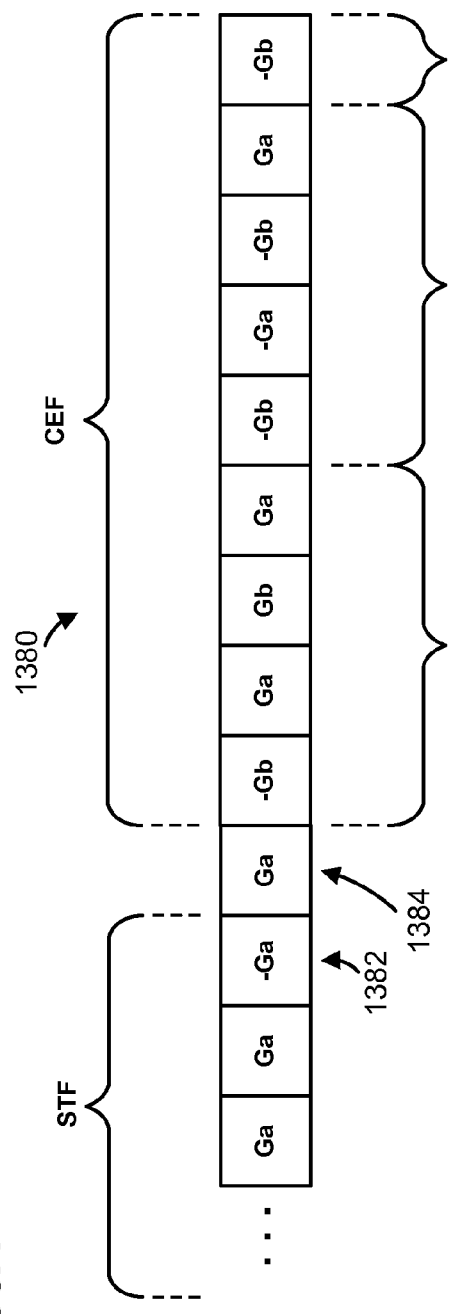
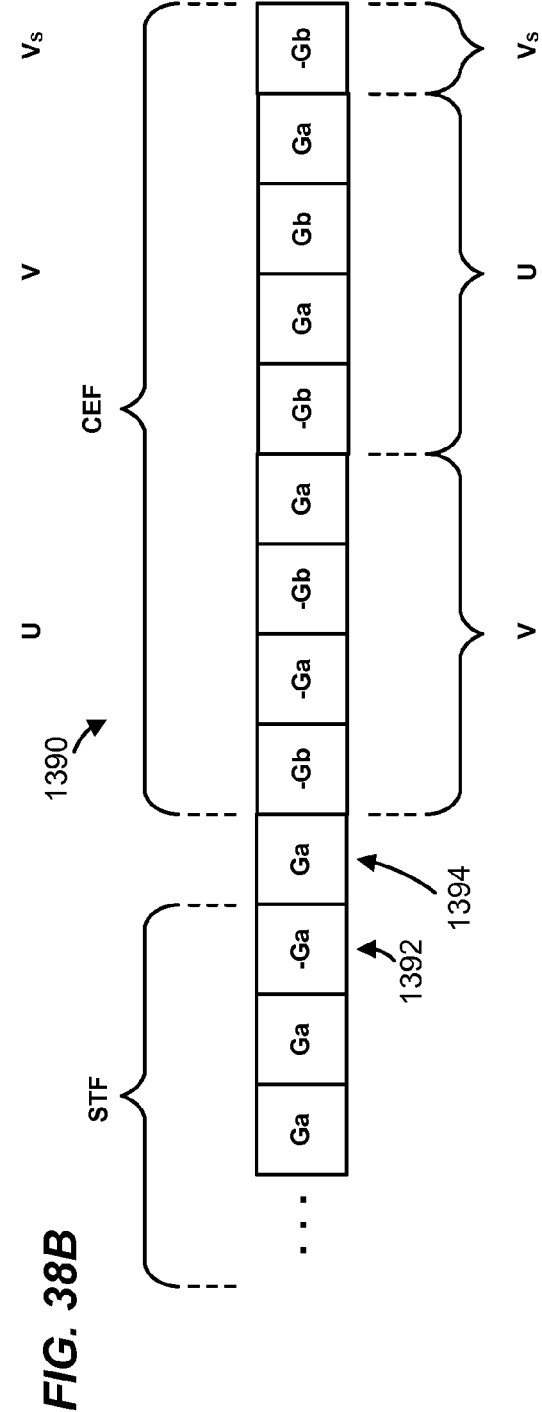

PHYSICAL LAYER DATA UNIT FORMAT

CROSS REFERENCE TO RELATED APPLICATIONS

The present application is a continuation application of U.S. application Ser. No. 12/569,547, now U.S. Pat. No. 8,165,185, entitled "Physical Layer Data Unit Format," filed Sep. 29, 2009, which claims the benefit of U.S. Provisional Patent Applications Nos. 61/100,948 filed Sep. 29, 2008, 61/101,833 filed Oct. 1, 2008, 61/108,079 filed Oct. 24, 2008, 61/110,357 filed Oct. 31, 2008, 61/120,973 filed Dec. 9, 2008, 61/121,392 filed Dec. 10, 2008, 61/153,102 filed Feb. 17, 2009, 61/156,651 filed Mar. 2, 2009, 61/171,343 filed Apr. 21, 2009, and 61/174,382 filed Apr. 30, 2009. The disclosures of all of the above-referenced applications are hereby incorporated by reference herein in their entireties.

FIELD OF TECHNOLOGY

The present disclosure relates generally to communication systems and, more particularly, to information formats for exchanging information via communication channels.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An ever-increasing number of relatively inexpensive, low power wireless data communication services, networks and devices have been made available over the past number of years, promising near wire speed transmission and reliability. Various wireless technology is described in detail in several IEEE standards documents, including for example, the IEEE Standard 802.11b (1999) and its updates and amendments, as well as the IEEE 802.15.3 Draft Standard (2003) and the IEEE 802.15.3c Draft D0.0 Standard, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, transmission systems compliant with the IEEE 802.15.3c or future IEEE 802.11ad standards support one or both of a Single Carrier (SC) mode of operation and an Orthogonal Frequency Division Multiplexing (OFDM) mode of operation to achieve higher data transmission rates. For example, a simple, low-power handheld device may operate only in the SC mode, a more complex device that supports a longer range of operation may operate only in the OFDM mode, and some dual-mode devices may switch between SC and OFDM modes. Additionally, devices operating in such systems may support a control mode of operation at the physical layer of the protocol stack, referred to herein as "control PHY." Generally speaking, control PHY of a transmission system corresponds to the lowest data rate supported by each of the devices operating in the transmission system. Devices may transmit and receive control PHY frames to communicate basic control information such as beacon data or beamforming data, for example.

The IEEE 802.15.3c Draft D0.0 Standard is directed to wireless wideband communication systems that operate in the 60 GHz band. In general, antennas and, accordingly, associated effective wireless channels are highly directional at frequencies near or above 60 GHz. When multiple antennas are available at a transmitter, a receiver, or both, it is therefore important to apply efficient beam patterns to the antennas to better exploit spatial selectivity of the corresponding wireless channel. Generally speaking, beamforming or beamsteering creates a spatial gain pattern having one or more high gain lobes or beams (as compared to the gain obtained by an omni-directional antenna) in one or more particular directions, with reduced the gain in other directions. If the gain pattern for multiple transmit antennas, for example, is configured to produce a high gain lobe in the direction of a receiver, better transmission reliability can be obtained over that obtained with an omni-directional transmission.

Beamforming generally involves controlling the phase and/or amplitude of a signal at each of a plurality of antennas to define a radiation or gain pattern. The set of amplitudes/phases applied to a plurality of antennas to perform beamforming is often referred to as a steering vector (or "phasor"). The IEEE 802.15.3c Draft D0.0 Standard proposes a method for selecting a steering vector. For selecting a transmit steering vector, the proposed method generally involves, for example, transmitting training signals during a training period using each of a plurality of steering vectors, determining the quality of the received training signals, and selecting a steering vector that corresponds to the "best" received training signal.

SUMMARY

In one embodiment, a method is implemented in a communication device configured to generate (i) physical layer (PHY) data units corresponding to a first modulation mode and (ii) PHY data units corresponding to a second modulation mode different than the first modulation mode. The method includes generating, in the communication device, a PHY data unit having a channel estimation field (CEF). Generating the PHY data unit includes generating a sequence u of the CEF. The sequence u of the CEF includes complementary Golay sequences a and b, and is spread with a first cover code. Generating the PHY data unit also includes generating a sequence v of the CEF. The sequence v of the CEF includes the complementary Golay sequences a and b, and is spread with a second cover code different than the first cover code. Generating the PHY data unit also includes generating the PHY data unit such that, within the CEF of the PHY data unit, (i) the sequence u precedes the sequence v when the PHY data unit corresponds to the first modulation mode, and (ii) the sequence v precedes the sequence u when the PHY data unit corresponds to the second modulation mode. The method also includes causing, with the communication device, the PHY data unit to be transmitted via a communication channel.

In some embodiments, the method may comprise one or more (or none) of the following elements. The sequence v of the CEF may be complementary to the sequence u of the CEF. The sequence u of the CEF and the sequence v of the CEF may form a complementary Golay pair. Generating the PHY data unit may include generating the PHY data unit such that, within the CEF of the PHY data unit, (i) the sequence u immediately precedes the sequence v when the PHY data unit corresponds to the first modulation mode, and (ii) the sequence v immediately precedes the sequence u when the PHY data unit corresponds to the second modulation mode. Generating the PHY data unit may further include generating an additional sequence of the CEF that immediately follows (i) the sequence v of the CEF when the PHY data unit corresponds to the first modulation mode, and (ii) the sequence u of the CEF when the PHY data unit corresponds to the second modulation mode, where the additional sequence of the CEF is a cyclic postfix. The sequence u of the CEF may include a sequence [b a b a] spread with the first cover code, and the sequence v of the CEF may include the sequence [b a b a] spread with the second cover code. Generating the PHY data unit may further include generating a short training field (STF) that precedes (i) the sequence u of the CEF when the PHY data unit corresponds to the first modulation mode, and (ii) the sequence v of the CEF when the PHY data unit corresponds to the second modulation mode, where the STF includes a plurality of consecutive repetitions of the Golay sequence a. The STF may further include a flipped Golay sequence –a immediately following the plurality of consecutive repetitions of the Golay sequence a. The first modulation mode may be a single carrier (SC) mode, and the second modulation mode may be an orthogonal frequency division multiplexing (OFDM) mode.

In another embodiment, a communication device for use in a wireless communication system, where the communication device exchanges information with other communication devices utilizing (i) PHY data units corresponding to a first modulation mode and (ii) PHY data units corresponding to a second modulation mode different than the first modulation mode, includes an integrated circuit device configured to generate a PHY data unit having a CEF. The integrated circuit device is configured to generate the PHY data unit at least by generating a sequence u of the CEF, where the sequence u of the CEF (i) includes complementary Golay sequences a and b and (ii) is spread with a first cover code, and by generating a sequence v of the CEF, where the sequence v of the CEF (i) includes the complementary Golay sequences a and b, and (ii) is spread with a second cover code different than the first cover code. The integrated circuit device is also configured to generate the PHY data unit by generating the PHY data unit such that, within the CEF of the PHY data unit, (i) the sequence u precedes the sequence v when the PHY data unit corresponds to the first modulation mode, and (ii) the sequence v precedes the sequence u when the PHY data unit corresponds to the second modulation mode. The integrated circuit device is also configured to cause the PHY data unit to be transmitted via a communication channel.

In some embodiments, the communication device may comprise one or more (or none) of the following elements. The sequence u of the CEF and the sequence v of the CEF may form a complementary Golay pair, and the integrated circuit device may be configured to generate the PHY data unit such that, within the CEF of the PHY data unit, (i) the sequence u immediately precedes the sequence v when the PHY data unit corresponds to the first modulation mode, and (ii) the sequence v immediately precedes the sequence u when the PHY data unit corresponds to the second modulation mode. The integrated circuit device may further be configured to generate the PHY data unit by generating an additional sequence of the CEF that immediately follows (i) the sequence v of the CEF when the PHY data unit corresponds to the first modulation mode, and (ii) the sequence u of the CEF when the PHY data unit corresponds to the second modulation mode, where the additional sequence of the CEF is a cyclic postfix. The sequence u of the CEF may include a sequence [b a b a] spread with the first cover code, and the sequence v of the CEF may include the sequence [b a b a] spread with the second cover code. The first modulation mode may be an SC mode, and the second modulation mode may be an OFDM mode.

In another embodiment, a method is implemented by a communication device configured to generate (i) PHY data units corresponding to an SC mode and (ii) PHY data units corresponding to an OFDM mode. The method includes generating, in the communication device, a PHY data unit having a CEF. Generating the PHY data unit includes generating a sequence u of the CEF, where the sequence u of the CEF (i) includes complementary Golay sequences a and b in a sequence [b a b a] and (ii) is spread with a first cover code, and generating a sequence v of the CEF, where the sequence v of the CEF (i) includes the complementary Golay sequences a and b in the sequence [b a b a], (ii) is spread with a second cover code different than the first cover code, and (iii) forms a complementary Golay pair with the sequence u of the CEF. Generating the PHY data unit also includes generating an additional sequence of the CEF that immediately follows the sequence u of the CEF or the sequence v of the CEF, where the additional sequence of the CEF is a cyclic postfix. Generating the PHY data unit also includes generating the PHY data unit such that, within the CEF of the PHY data unit, (i) the sequence u immediately precedes the sequence v when the PHY data unit corresponds to the SC mode, and (ii) the sequence v immediately precedes the sequence u when the PHY data unit corresponds to the OFDM mode. The method also includes causing, with the communication device, the PHY data unit to be transmitted via a communication channel.

In some embodiments, the method may comprise one or more (or none) of the following elements. Generating the PHY data unit may further include generating an STF that precedes (i) the sequence u of the CEF when the PHY data unit corresponds to the SC mode, and (ii) the sequence v of the CEF when the PHY data unit corresponds to the OFDM mode. The STF may include a plurality of consecutive repetitions of the Golay sequence a, and a flipped Golay sequence –a immediately following the plurality of consecutive repetitions of the Golay sequence a.

In another embodiment, a communication device for use in a wireless communication system, where the communication device exchanges information with other communication devices utilizing (i) PHY data units corresponding to an SC mode and (ii) PHY data units corresponding to an OFDM mode, includes an integrated circuit device configured to generate a PHY data unit having a CEF. The integrated circuit device is configured to generate the PHY data unit at least by generating a sequence u of the CEF, where the sequence u of the CEF (i) includes complementary Golay sequences a and b in a sequence [b a b a] and (ii) is spread with a first cover code, and generating a sequence v of the CEF, where the sequence v of the CEF (i) includes the complementary Golay sequences a and b in the sequence [b a b a], (ii) is spread with a second cover code different than the first cover code, and (iii) forms a complementary Golay pair with the sequence u of the CEF. The integrated circuit device is also configured to generate the PHY data unit by generating an additional sequence of the CEF that immediately follows the sequence u of the CEF or the sequence v of the CEF, where the additional sequence of the CEF is a cyclic postfix. The integrated circuit device is also configured to generate the PHY data unit such that, within the CEF of the PHY data unit, (i) the sequence u immediately precedes the sequence v when the PHY data unit corresponds to the SC mode, and (ii) the sequence v immediately precedes the sequence u when the PHY data unit corresponds to the OFDM mode. The integrated circuit device is also configured to cause the PHY data unit to be transmitted via a communication channel.

In some embodiments, the communication device may comprise one or more (or none) of the following elements. The integrated circuit device may further be configured to generate the PHY data unit by generating an STF that precedes (i) the sequence u of the CEF when the PHY data unit corresponds to the SC mode, and (ii) the sequence v of the CEF when the PHY data unit corresponds to the OFDM mode. The STF may include a plurality of consecutive repetitions of the Golay sequence a, and a flipped Golay sequence −a immediately following the plurality of consecutive repetitions of the Golay sequence a.

BRIEF DESCRIPTION OF THE DRAWINGS

FIG. 7A is a diagram of spreading for a preamble of a default data unit format;

FIG. 7B is a diagram of example spreading for a preamble of a control PHY data unit format, wherein a complementary spreading sequence is used compared to the spreading of FIG. 7A;

FIG. 7C is a diagram of example spreading for a preamble of a control PHY data unit format, wherein a different cover code is used compared to the spreading of FIG. 7A;

FIGS. 8A and 8B are diagrams of an example format for a preamble of a default data unit for a single carrier (SC) mode and an Orthogonal Frequency Division Multiplexing (OFDM) mode;

FIGS. 9A and 9B are diagrams of example formats for a preamble of a control PHY data unit, wherein a complementary spreading sequence is used in the STF compared to the format of FIGS. 8A and 8B;

FIGS. 10A and 10B are diagrams of example formats for a preamble of a control PHY data unit, wherein a different cover code is used in the STF compared to the format of FIGS. 8A and 8B;

FIGS. 11A and 11B are diagrams of example formats for a preamble of a control PHY data unit, wherein a complementary spreading sequence is used in the STF compared to the format of FIGS. 8A and 8B;

FIGS. 13C and 13D are diagrams of example formats for a preamble of a control PHY data unit, wherein a delimiter field is added in the STF prior to the CEF as compared to the format of FIGS. 8A and 8B;

FIGS. 13E and 13F are diagrams of further example formats for a preamble of a control PHY data unit, wherein a delimiter field is added in the STF prior to the CEF as compared to the format of FIGS. 8A and 8B;

FIG. 19 is diagram of another example format for a preamble of a control PHY data unit format, wherein a complementary spreading sequence is used in the STF compared to the format of FIGS. 8A and 8B;

FIG. 20 is diagram of another example format for a preamble of a control PHY data unit format, wherein a complementary spreading sequence is used in the STF compared to the format of FIGS. 8A and 8B;

FIG. 21 is diagram of an example correlator that may be used for detecting an STF spread as in FIGS. 19 and 20;

FIG. 22 is diagram of an example correlator that utilize the correlator of FIG. 21;

FIGS. 29A and 29B are diagrams of example formats for a preamble of a control PHY data unit, wherein a different spreading sequence is used in the STF as compared to the format of FIGS. 8A and 8B;

FIGS. 33A and 33B are diagrams of example formats for a preamble of a control PHY data unit, wherein a spreading sequence of a different length is used in the STF as compared to the format of FIGS. 8A and 8B;

FIGS. 37A-B and 38A-B are diagrams of example formats for a preamble of a control PHY data unit, wherein an additional field between the STF and the CEF is used to permit the use of identical channel estimation sequences in SC/OFDM default data units and control PHY data units.

DETAILED DESCRIPTION

Figure 1:
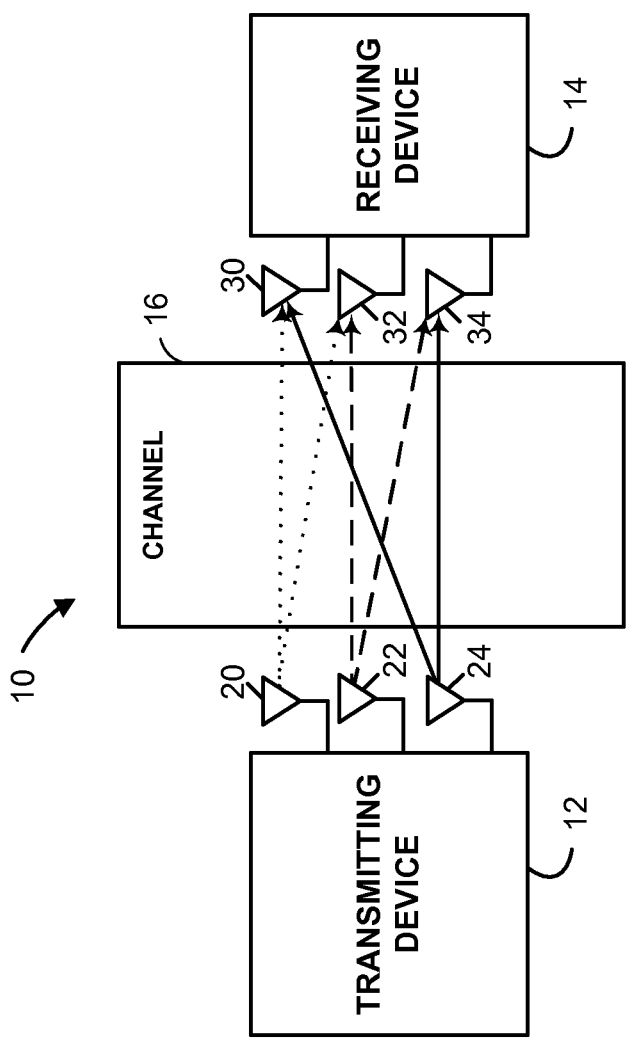
FIG. 1 is a block diagram of a communication system including a transmitter and a receiver that may communicate physical layer (PHY) information using data units that conform to a PHY data unit format.

FIG. 1 is a block diagram of an example wireless communication system 10 in which devices, such as a transmitting device 12 and a receiving device 14, may transmit and receive data units (e.g., packets) via a shared wireless communication channel 16. The devices 12 and 14 may communicate according to a communication protocol that utilizes different physical layer (PHY)/media access control (MAC) layer packet formats depending on the mode of operation. For example, when the devices 12 and 14 need to exchange information provided in a layer in a protocol stack at or above the MAC layer, a first format is utilized, whereas if a control procedure such as beamforming training is being performed, a second format ("control PHY" format) is utilized. If desired, control PHY may be associated with multiple sub-formats defined for separate procedures (e.g., beacon transmission, beamforming), different network types (e.g., SC only, OFDM only, SC/OFDM), and/or other purposes. Each of the devices 12 and 14 may be, for example, a mobile station or a non-mobile station equipped with a set of one or more antennas 20-24 and 30-34, respectively. Although the wireless communication system 10 illustrated in FIG. 1 includes two devices 12, 14, each with three antennas, the wireless communication system 10 may, of course, include any number of devices, each equipped with the same or a different number of antennas (e.g., 1, 2, 3, 4 antennas and so on). For beamforming, however, at least one of the devices 12, 14 generally should include more than one antenna.

Also, it will be noted that although the wireless communication system 10 illustrated in FIG. 1 includes a transmitting device 12 and a receiving device 14, devices in the wireless communication system 10 may generally operate in multiple modes (e.g., a transmit mode and a receive mode). Accordingly, in some embodiments, antennas 20-24 and 30-34 may support both transmission and reception. Alternatively or additionally, a given device may include separate transmit antennas and separate receive antennas. It will be also understood that because each of the devices 12 and 14 may have a single antenna or multiple antennas, the wireless communication system 10 may be a multiple input, multiple output (MIMO) system, a multiple input, single output (MISO) system, a single input, multiple output (SIMO) system, or a single input, single output (SISO) system. For beamforming, however, at least one of the devices 12, 14 generally should include more than one antenna. Thus, in beamforming, the system 10 will generally be a MIMO, MISO, or SIMO system.

In general, the communication system 10 may include SC-only, OFDM-only, or dual-mode (SC and OFDM) devices. To enable any device operating in the communication system 10 to transmit and receive at least control PHY packets, modulation of control PHY is preferably selected to match the slowest data rate (i.e., SC) supported in the communication system 10. In other words, because each OFDM device typically is capable of processing at least control PHY packets associated with an SC mode, modulating control PHY packets using an SC mode generally provides any device with access to control PHY messaging. In other embodiments, each device operating in the communication system 10 is an OFDM device, and modulation of control PHY may be selected to match an OFDM modulation scheme, if desired. In yet other embodiments, the communication system 10 includes only SC devices, and control PHY modulation is accordingly limited to an SC mode only.

Although devices in the communication system 10 may transmit and receive control PHY packets during various control procedures, the techniques for generating and receiving control PHY packets are discussed below with reference to beamforming. It will be noted, however, that beamforming packets may correspond to only one of a plurality of types of the control PHY data units of the communication system 10. A receiving device may accordingly determine, in the first instance, whether a packet is a control PHY packet, followed by determining whether the packet is a beamforming training (BFT) packet. In other embodiments, control PHY format may be used exclusively for beamforming, while yet other embodiments may not include a separate PHY or MAC format for beamforming at all, and use the control PHY format for control procedures unrelated to beamforming. In some embodiments, there may be a single control PHY format used for multiple purposes such as beamforming training, beacon transmission, etc. In other embodiments, separate control PHY sub-formats may correspond to different purposes such as beamforming beamforming training, beacon transmission, etc.

Figure 2:
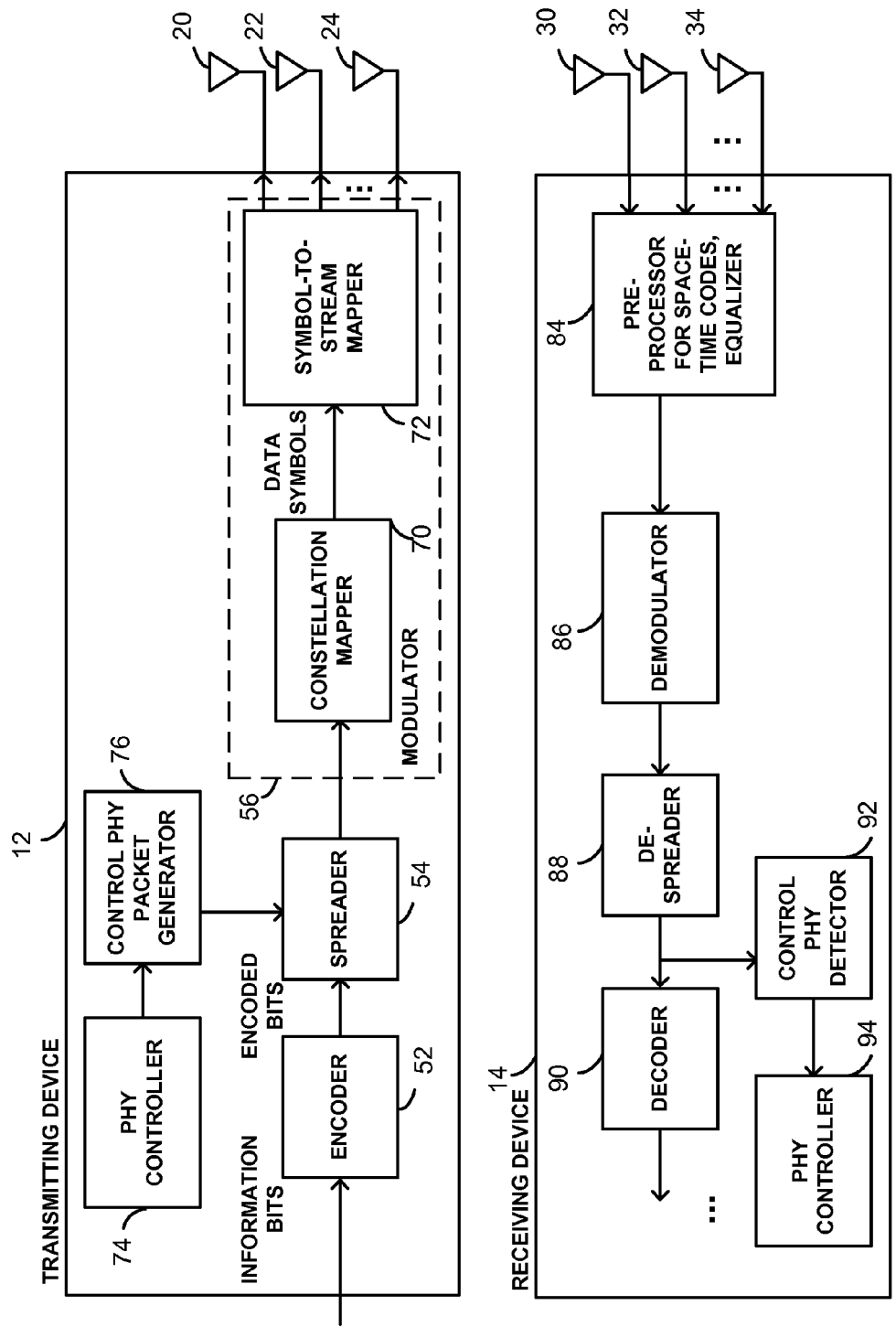
FIG. 2 depicts block diagrams of a transmitter and a receiver that may operate in the system of in FIG. 1.

FIG. 2 illustrates, in relevant part, the architectures of the transmitting device 12 and the receiving device 14. The transmitting device 12 may generally convert a sequence of information bits into signals appropriate for transmission through a wireless channel (e.g., channel 16 of FIG. 1). More specifically, the transmitting device 12 may include an encoder 52 (e.g., a convolution encoder) that encodes information bits, a spreader 54 that converts each encoded bit to a sequence of chips, and a modulator 56 that modulates the encoded chips into data symbols, which are mapped and converted to signals appropriate for transmission via one or more transmit antennas 20-24. In general, the modulator 56 may implement any desired modulation techniques based on one or more of phase shift keying, binary phase-shift keying (BPSK), $\pi/2$ BPSK (in which modulation is rotated by $\pi/2$ for each symbol or chip so that the maximum phase shift between adjacent symbols/chips is reduced from 180° to 90°), quadrature phase-shift keying (QPSK), n/2 QPSK, frequency modulation, amplitude modulation, quadrature amplitude modulation (QAM), n/2 QAM, on-off keying, minimum-shift keying, Gaussian minimum-shift keying, dual alternative mark inversion (DAMI), etc In some embodiments, the modulator 56 may include a bit-to-symbol mapper 70 that maps encoded bits into symbols, and a symbol-to-stream mapper 72 that maps the symbols into multiple parallel streams. If only one transmit antenna is utilized, the symbol-to-stream mapper 72 may be omitted. Information is transmitted in data units such as packets.

The transmitter 12 includes a control PHY controller 74 that generally controls operation when control PHY data units are transmitted and/or received. The control PHY controller 74 may include a BFT controller (not shown) that controls operation during a BFT period in which the transmitter 12 cooperates with the receiver 14 to determine a beamforming vector or vectors for the transmitter 12 and/or the receiver 14. The transmitter 12 also includes a control PHY packet generator 76 that generates control PHY. For example, packets transmitted during a BFT period (which may be a type of control PHY packet) may have a different format as compared to non-control PHY packets, i.e., "regular" SC or OFDM packets used to convey information at or above the MAC layer. Regular packets, as opposed to control PHY packets, are referred to herein as "default packets" or packets that conforming to a "default format." In some embodiments, BFT packets may be different both from regular packets and from control PHY packets not associated with beamforming. For example, BFT packets may have a format that is a sub-format of control PHY packets. The control PHY packet generator 76 may be coupled to the control PHY controller 74 and may receive control signals from the control PHY controller 74. The control PHY packet generator 76 also may be coupled to the spreader 54 and/or the modulator 56, and may cause the spreader 54 and/or the modulator 56 to operate differently when transmitting control PHY packets.

The transmitting device 12 may include various additional modules that, for purposes of clarity and conciseness, are not illustrated in FIG. 2. For example, the transmitting device 12 may include an interleaver that interleaves the encoded bits to mitigate burst errors. The transmitting device 12 may further include a radio frequency (RF) front end for performing frequency upconversion, various filters, power amplifiers, and so on. Still further, while FIG. 2 illustrates a control PHY controller 74 a control PHY packet generator 76 dedicated specifically to controlling during transmission/reception of control PHY packets and generating control PHY packets, the transmitting device 12 may also include one or several controllers associated with respective control PHY procedures (such as BFT, beacon transmission, etc.) communicatively coupled to a control PHY packet generator. For example, a transmitting device similar to the transmitting device 12 may include a control PHY packet generator that generates packets according to one control PHY format or multiple control PHY sub-formats (including a beamforming format, if desired), and a control PHY controller that controls various control PHY procedures (optionally including beamforming). In this embodiment, the control PHY packet generator and the control PHY controller may be coupled to other components of the corresponding transmitting device in a manner.

The receiving device 14 may include a pre-processor for space-time codes and equalizer 84 coupled to one or more receive antennas 30-34, a demodulator 86, a despreader 88, and a decoder 90. If only one receive antenna is utilized, the pre-processor for space-time codes may be omitted, and the unit 84 may include an equalizer. The receiving device 14 also includes a control PHY packet detector 92 and a control PHY controller 94 that generally controls operation during reception and/or transmission of control PHY packets. For example, the control PHY controller 94 may include a BFT controller (not shown) that controls operation during a BFT period in which the receiver 14 cooperates with the transmitter 12 to determine a beamforming vector or vectors for the transmitter 12 and/or the receiver 14. The control PHY packet detector 92 generally detects control PHY packets and, when detected, causes the control PHY packets to be forwarded to the control PHY controller 94. It will be understood that the receiving device 14 may also include other components such as filters, analog-to-digital converters, etc. that are omitted from FIG. 2 for the purposes of clarity and conciseness.

Similar to the transmitting device 12, the receiving device 14 may include components for processing control PHY packets in addition to, or in instead of, the control PHY packet detector 92 and a control PHY controller 94. In an embodiment, a control PHY packet detector may be coupled to a BFT controller, a beacon controller, and other components associated with respective control PHY procedures, or the control PHY controller may include the BFT controller, the beacon controller, etc.

As will be described in more detail below, a control PHY packet may be signaled by modified spreading of a preamble and/or a header of a packet. Thus, in these embodiments, the control PHY packet detector 92 may analyze the spreading of the preamble and/or the header of a packet. In these embodiments, the control PHY packet detector 92 may be coupled to the despreader 88.

As discussed above, the transmitting device 12 may also operate in a receive mode, and the receiving device 14 may also operate in a transmit mode. Thus, the transmitting device 12 may include at least some of the same or similar components as the receiving device 14, and vice versa.

In general, the devices 12 and 14 may communicate using a packet format that allows for shorter packets, for example, as compared to a format utilized, for example, to communicate information originating from layers at or above the MAC layer. For example, much information conveyed in a PHY header and/or a MAC header may be un-needed for some control PHY functions. Thus, the present disclosure provides various embodiments of a control PHY data unit format that omits or reinterprets fields in the data unit (e.g., in the PHY header and/or the MAC header) so that, in some implementations or for some control PHY data units, the data unit length may be shortened and/or filled with more control PHY information as compared to packets utilized, for example, to communicate information originating from layers at or above the MAC layer. The control PHY packet generator 76 may generate the control PHY packets. For example, the control PHY packet generator 76 may generate the control PHY packets during the BFT period.

The present disclosure further provides several embodiments of a control PHY format that devices in the communication system 10 may utilize for control procedures other than beamforming, or both for beamforming and other control procedures. According to another aspect of the present disclosure, at least some of the embodiments of control PHY format enable the receiving device 14 to detect a control PHY packet relatively early, i.e., prior to receiving the entire data unit, prior to receiving the entire data unit header, or even prior to receiving the entire PHY header. As discussed in more detail below, some of these embodiments allow control PHY detection based only on a portion of the short training field (STF) of the packet preamble, some embodiments involve processing the STF and at least a portion of the channel estimation field (CEF), still other embodiments involve processing the STF and an intermediate field preceding the CEF (such as a delimiter field), etc. Early control PHY detection in turn allows the receiving device 14 to adjust synchronization algorithms and determine whether, for example, the header and/or the payload of the packet will require decoding. As one example, the receiving device may use the results of early detection to assess the length of one or several fields in the preamble because the STF of a control PHY may include a significantly larger number of training sequences than the STF of a regular packet. As another example, an OFDM-only device may receive a packet modulated according to an SC modulation scheme. Because this device may not be able to decode the header and the payload of a regular SC packet, but nevertheless may be able to decode the header and the payload of a control PHY packet, early detection can eliminate certain unnecessary steps and reduce the number processing errors at the OFDM-only device.

In time division multiple access (TDMA)-type networks (e.g. channel time allocation (CTA) periods in the superframe structure described in the IEEE 802.15.3c Draft D0.0 Standard), beamforming often requires transmitting training signals in frames (e.g., sounding packets) during time slots dedicated to BF training between the transmitter 12 and the receiver 14. For example, if the transmitter 12 has multiple antennas, the transmitter 12 may transmit a plurality of sounding packets to the receiver 14, where each sounding packet is sent using a different transmit beamforming vector. The receiver 14 may analyze the quality of each of the received sounding packets, and may transmit a feedback packet to the transmitter 12 indicating the "best" transmit beamforming vector. Similarly, if the receiver 14 has multiple antennas, the receiver 14 may request that the transmitter 12 transmit a plurality of sounding packets to the receiver 14. The receiver 14 may receive each sounding packet using a different receive beamforming vector. The receiver 14 may then analyze the quality of each of the received sounding packets choose a "best" receive beamforming vector.

Figure 3A:
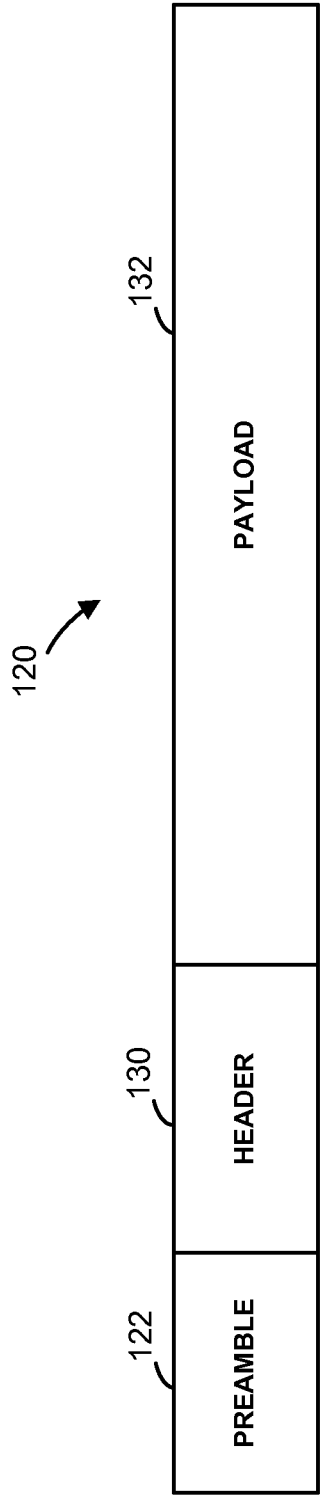
FIGS. 3A and 3B is a diagram of a prior art data unit format.

FIG. 3A is a diagram of a prior art physical layer packet format 120. For instance, the IEEE 802.15.3c Draft D0.0 Standard utilizes the packet format 120. The packet 120 includes a preamble 122, a header 130, and a payload 132. In the IEEE 802.15.3c Draft D0.0 Standard, the preamble 122 generally provides training information that helps the receiver 14 detect the packet 120, adjust an automatic gain control (AGC) setting, obtain frequency and timing synchronization, etc. Also in the IEEE 802.15.3c Draft D0.0 Standard, the header 130 provides information of the basic PHY parameters required for decoding the payload (e.g. a length of the payload, modulation/coding method, pilot insertion information, cyclic prefix length in OFDM mode, preamble length of the next packet, reserved fields, etc.) so that the receiver 14 can adjust its decoding apparatus accordingly. The header 130 also includes MAC layer information.

Figure 3B:
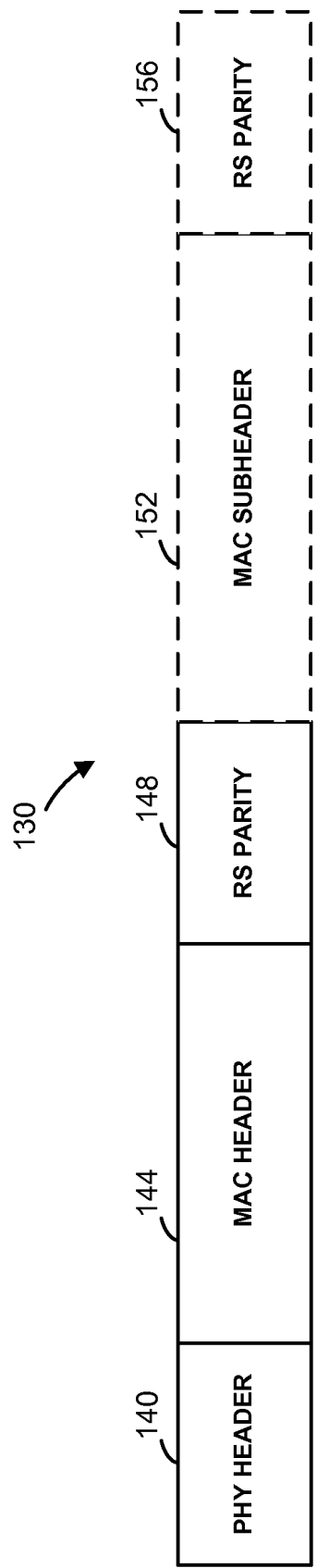
Figure 4:
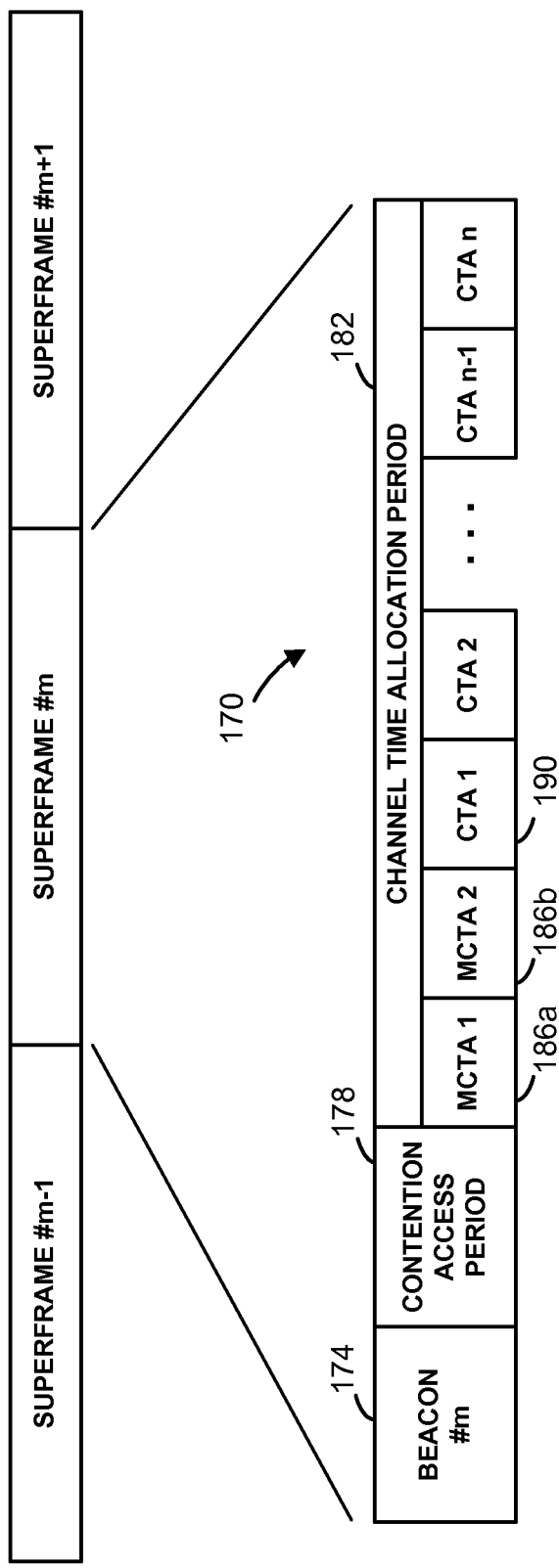
FIG. 4 is a diagram of a prior art superframe format.

FIG. 3B is a diagram illustrating a format of the header 130 specified in the IEEE 802.15.3c Draft D0.0 Standard. The header 130 includes a PHY header 140, a MAC header 144 (including a header check sequence (HCS)), and Reed-Solomon parity bits 148 generated from the MAC header 144. Optionally, the header 130 may include a MAC subheader 152 (including an HCS) and Reed-Solomon parity bits 156 generated from the MAC subheader 152.

As discussed above, the IEEE 802.15.3c Draft D0.0 Standard provides for TDMA-type communications. In a TDMA mode, each device is (or two devices are) allocated a dedicated time slot by the network controller, so that only a particular device (or a particular pair of devices) is (are) communicating during the time slot, where the other devices will be set to idle to save power. The time slot may be set so that only one device (STA1) may transmit data to the other (STA2), and STA2 may only send acknowledgment (ACK) or failure (NAK) to STA1 (often referred to as a "single direction" allocated time slot). The time slot may also be set so that both STA1 and STA2 can send data to each other (often referred to as a "bi-direction" allocated time slot).

An example of TDMA communications is seen in the super-frame structure described in the IEEE 802.15.3c Draft D0.0 Standard. A superframe 170 may include a beacon period 174, a contention access period (CAP) 178, and a channel time allocation (CTA) period 182. The beacon period 174 generally is used for transmitting control information to a piconet, allocating guaranteed time slots (GTSs), synchronization, etc. The CAP period 178 generally is used for authentication/association requests/responses, channel time requests, etc. The CTA period 182 is generally used for providing single direction allocated time slots and bi-direction allocated time slots. The CTA period 182 may include management CTA slots 186 and n CTA slots 190. Beamforming training (or maybe other purposes like antenna switching, time-domain precoding, beacon transmission, etc) may be conducted in one or more CTA slots 190, for example. For BFT, for example, the BFT period may involve transmitting BFT sounding packets over different directions (e.g., using different beamforming vectors), and a "best" direction may be chosen. During the BFT period, channel quality cannot be guaranteed. Thus, data transmission may be delayed until after BFT is finished and a beamforming vector has been selected.

The CTA in which BFT is to take place may already be allocated to a particular pair of devices (STA1 and STA2). Both STA1 and STA2 may have pre knowledge of the other's MAC address. Thus, providing source and destination MAC addresses in a MAC header of a BFT sounding packet during a CTA 190 may, in effect, be transmitting already known information. Additionally, other information in the header of the packet 120 (FIG. 3) may not be needed for BFT.

Figure 5:
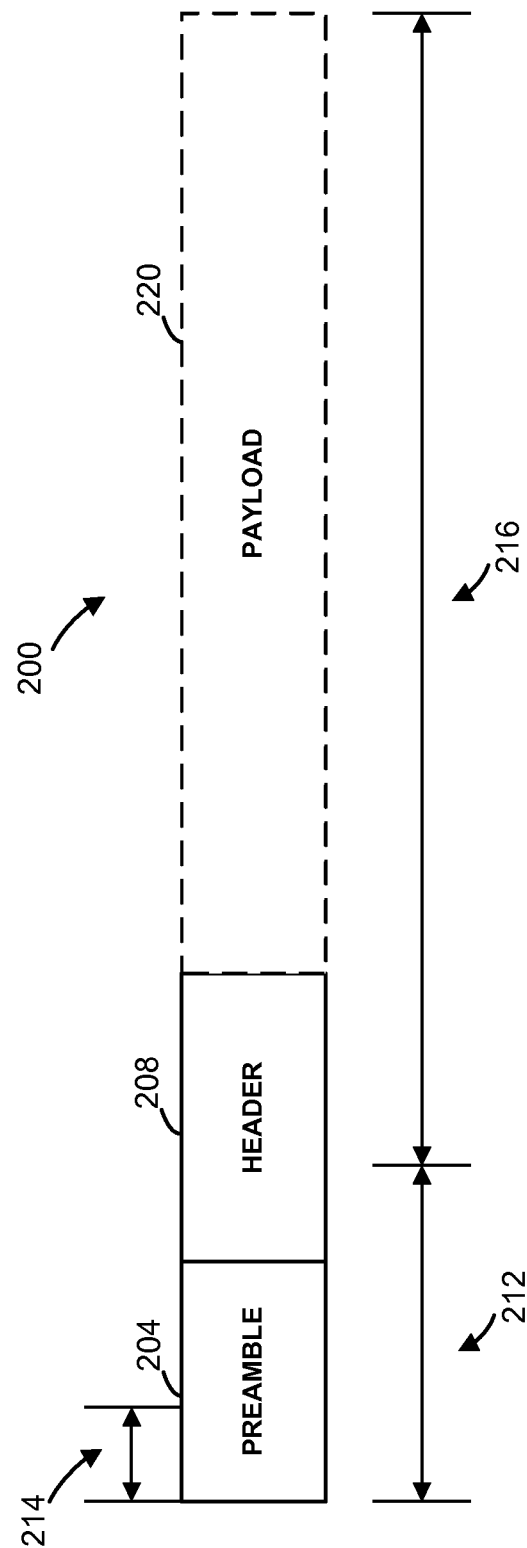
FIG. 5 is a diagram of an example control physical layer (PHY) data unit format.

FIG. 5 is a block diagram of an embodiment of a new physical layer data unit format 200 to be used in protocol functions such as beamforming training, antenna switching, time-domain precoding, beacon transmission, etc. The format 200 will typically be used for an exchange of information for the physical layer (PHY), as opposed to exchanging data units that originated from the MAC layer or higher. For example, PHY processes in a pair of communication devices may need to exchange information for purposes of, for example, beamforming training (BFT), antenna switching, time-domain precoding, beacon transmission, etc., and such information may be transmitted in data units that conform to the format 200. On the other hand, another format (referred to herein as the "default format"), such as the format 120 of FIG. 3A, will be utilized when communicating data units that originate from the MAC layer or higher. Typically, data units conforming to the format 200 (i.e., control PHY data units) will have a shorter length than data units conforming to the default format (i.e., default data units). The format 200 may be used for BFT data units, i.e., data units sent during BFT. It is to be understood, however, that the format 200 may be used for other functions such as antenna switching, time-domain precoding, beacon transmission, etc. Also, as indicated above, the control PHY data unit format 200 may correspond to only one of several control PHY data unit sub-formats.

The control PHY packet 200 includes a preamble 204 and a header 208. A first portion 212 of the control PHY packet 200 includes the preamble 204 and may include a beginning portion of the header 208. The first portion 212 is encoded to indicate that the packet conforms to the control PHY packet format 200 as opposed to the default format (e.g., the format 120 of FIG. 3A). The first portion 212 may be encoded in a variety of ways. For example, in some embodiments, the preamble 204 and/or the PHY header may be encoded to indicate the control PHY packet format 200 by utilizing different spreading sequences than the default format. In some embodiments, only a section 214 of the first portion 212 may be formatted differently than the respective portion of the preamble 122. Although the section 214 is illustrated in FIG. 5 as being at the beginning of the packet 200, the section 214 could be located, in general, in any part of the first portion 212. In other words, not all of the first portion 212 need be formatted differently than the default format. Preferably but not necessarily, the portion 214 in these embodiments is in an earlier section of the preamble 204 (as measured from the perspective of a receiving device) to allow early identification of the control PHY packet format based only on the portion 214. In other embodiments, other information in the first portion may indicate a sub-format of the control PHY packet. For example, a field in a PHY header portion of the header 208 may indicate the control PHY packet is a BFT packet. In still other embodiments, combinations of modulation, spread codes, and PHY header fields may be used to indicate a control PHY packet and a sub-format of the control PHY packet. Various embodiments of an encoded first portion 212 are described in further detail below. If there are multiple types of control PHY packets, or sub-formats of a control PHY packet, a field in the PHY header may indicate to which format the control PHY packet conforms. For example, a field in the PHY header may indicate whether the control PHY is a BFT packet. As another example, a field in the PHY header may indicate whether the control PHY includes a payload.

Generally, the first portion 212 may conform to the default format at least in some respects. On the other hand, a second portion 216 of the control PHY packet 200 generally does not conform to the default format, but rather conforms to the format 200. For example, if a receiver determines that a received packet conforms to the format 200, the receiver may reinterpret fields in the second portion 216 as compared to fields specified by the default format. For example, header fields specified by the default format could be used for control PHY fields (e.g., BFT fields) not specified by the default format. For example, a modulation and coding scheme (MCS) field, a cyclic prefix (CP) length field, reserved bits, etc., could be utilized for BFT information such as one or more of a BFT countdown identifier (ID) number, a feedback indication bit (e.g., if set to 1 it may indicate that a beamforming (BF) ID number field may be interpreted as an indicator of the "best" BF direction), a receive BF sweeping request subfield (e.g., the station performing receive BF may request that a transmitter send a plurality of BFT sounding packets, and the number of BFT sounding packets requested is indicated; a zero indicates receive BFT is not requested), a field indicating a forward/reverse link direction, other subfields to be used for exchanging information elements used for channel sounding for BF, etc. In embodiments in which the format 200 is not for BFT, fields specified in the default format could be utilized for antenna switching training information, time-domain precoding information, MCS feedback information, beacon transmission, etc. Thus, upon receiving a packet that conforms to the format 200, a receiver may utilize information in the packet to perform a PHY function such as selecting a beamforming vector, performing time-domain precoding, selecting an MCS, performing channel estimation, beacon transmission, etc.

In some embodiments, the control PHY packet 200 may include a payload 220, whereas in other embodiments the control PHY packet 200 may omit the payload 220. In embodiments that include a payload 220, the format 200 may permit the payload 220 to be selectively omitted. For instance, the first portion 212 or the second portion 216 may be encoded to indicate whether the data unit 200 includes the payload 220. In some embodiments, the control PHY packet 200 may omit the MAC header portion in the header 208 and may also omit the payload 220. In another embodiment, the control PHY packet 200 may extend after the PHY header 320 and include at least a portion of a MAC header and/or a payload. For example, the control PHY packet 200 may include a MAC header, or only a portion of the MAC header, such as the MAC destination address. In another embodiment, the control PHY packet 200 may include a payload, but omit the MAC header. The payload may be used to transmit control PHY-related IEs, for example. In one embodiment, the payload may have a fixed length.

In one embodiment, a payload length field in the PHY header (included in the header 208 and the first portion 212) may be set to zero to indicate that the control PHY packet 200 is a BFT packet. If the payload length field is set to zero, other header fields specified by the default format could be used for BFT purposes (or antenna switching training information, time-domain precoding information, MCS feedback information, beacon transmission, etc.).

Figure 6:
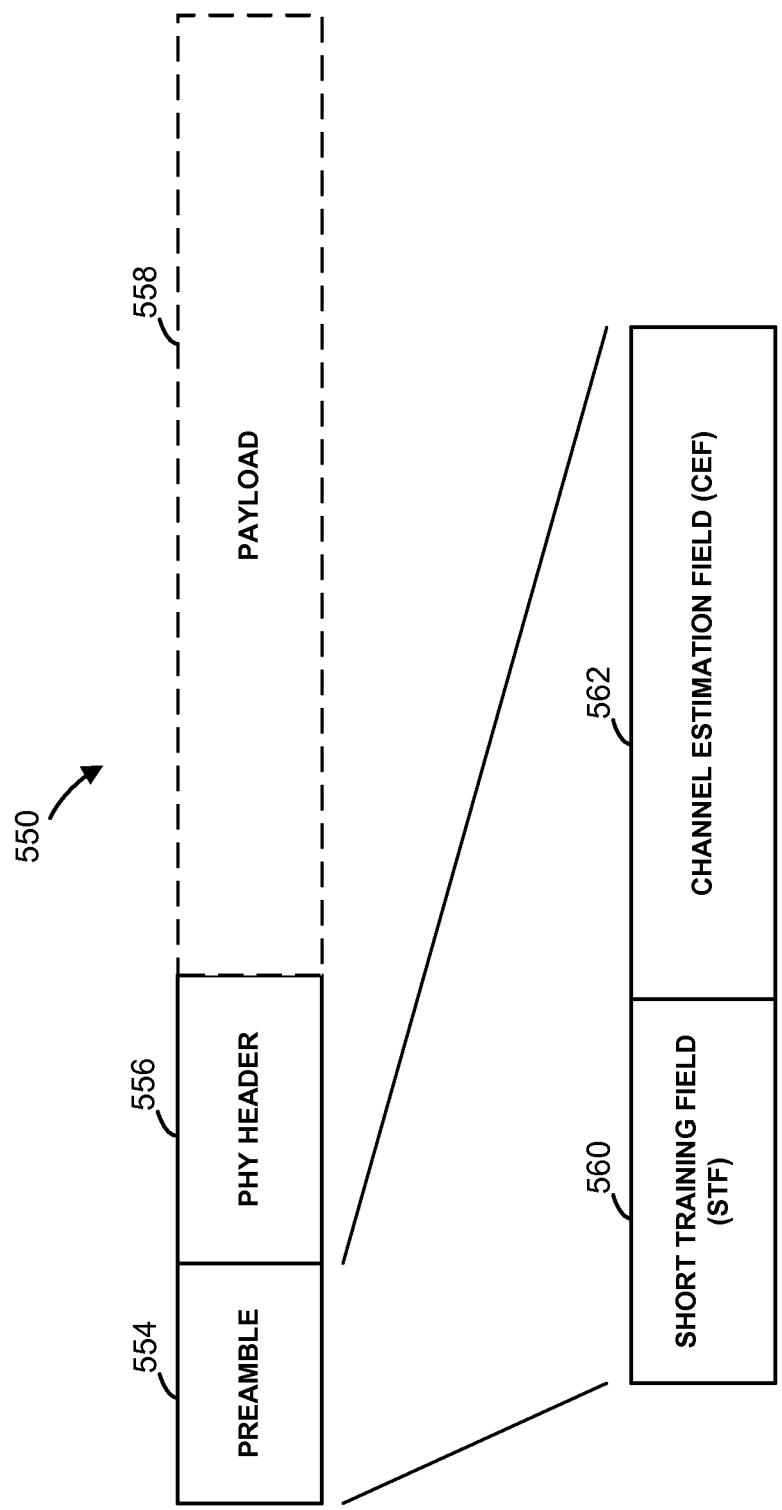
FIG. 6 is a diagram of an example control PHY data unit format.

A control PHY packet may be signaled by modified spreading of a preamble and/or a header of a packet. An example packet format common to both default packets and control PHY packets will now be described with reference to FIG. 6. A packet 550 may include a preamble 554, a header 556, and optionally a payload 558 (e.g., the payload 558 may be omitted in control PHY packets). The preamble 554 generally provides training information that helps a receiver to detect a current packet, adjust an AGC (Automatic Gain Control) setting, synchronize frequency and timing, etc. The header 556 generally includes information for basic (e.g., PHY) parameters for decoding the payload 558 (e.g. length of the payload, modulation/coding method, etc.) so that the receiver can adjust its decoding apparatus accordingly. The preamble 554 may include a short training field (STF) 560 and a channel estimation field (CEF) 562. The STF 560 generally includes information that is useful for synchronization, whereas the CEF 562 generally includes information that is useful for channel estimation. For example, the STF 560 may include a synchronization (sync) sequence, and the CEF may include a channel estimation sequence (CES).

In some embodiments, the preamble 554 may have the same general format in both default packets and control PHY packets, as will be described in more detail below, except that spreading may be modified. In these embodiments, the format of the header 556 may differ between default packets and control PHY packets. For example, the header of a control PHY packet may be longer than in a default packet. Similarly, the payload 558 optionally may be omitted in at least some control PHY packets.

In other embodiments, the preamble 554 may have a different format in default packets as compared to control PHY packets, as will be described in more detail below. For example, in some embodiments, the STF 560 may be longer in control PHY packets as compared to default packets. As another example, the CEF 562 may be longer as compared to default packets. As yet another example, the STF 560 may be longer and the CEF 562 may be shorter in control PHY packets as compared to default packets. As still another example, the STF 560 may be longer and the CEF 562 may be omitted in at least some control PHY packets as compared to default packets.

FIG. 7A is a diagram of an example STF 580 in a default packet. The STF 580 includes a plurality of sequences a which may be Golay sequences (Ga). For example, the sequence a may be a length-128 sequence (or some other suitable length). FIG. 7B is a diagram of an example STF 584 in a control PHY packet that corresponds to the STF 580 of the default packet. The STF 584 includes a plurality of sequences b which may be Golay sequences (Gb). The sequence b is a complementary sequence to the Golay sequence a. Generally, the two complementary sequences a and b have correlation properties suitable for detection at a receiving device. For example, the complementary spreading sequences a and b may be selected so that the sum of corresponding out-of-phase aperiodic autocorrelation coefficients of the sequences a and b is zero. In some embodiments, the complementary sequences a and b have a zero or almost-zero periodic cross-correlation. In another aspect, the sequences a and b may have aperiodic cross-correlation with a narrow main lobe and low-level side lobes, or aperiodic auto-correlation with a narrow main lobe and low-level side lobes.

In some embodiments, the number of sequences b in the STF 584 is greater than the number of sequences a in the STF 580. This may help with synchronization in situations in which the signal to noise ratio (SNR) is lower in the transmission of control PHY packets as compared to default operation.

FIG. 7C is a diagram of another example STF 588 in a contro PHY packet that corresponds to the STF 580 of the default packet. The STF 588 includes a plurality of sequences a as in the STF 580. In the STF 588, however, the sign of alternate sequences a are flipped. In FIG. 7C, a minus sign may indicate that modulation is 180 degrees out of phase as compared to a non-negative sequence. In some embodiments, the number of sequences a in the STF 588 is greater than the number of sequences a in the STF 580. This may help with synchronization in situations in which the signal to noise ratio (SNR) is lower in the transmission of control PHY packets as compared to default operation.

In some embodiments, the CEF following the STF 584 and/or the STF 588 may be the same length as the CEF following the STF 580. In other embodiments, the CEF following the STF 584 and/or the STF 588 may be longer than the CEF following the STF 580. For example, if the length of the sequence a is L (e.g., L=128 or some other suitable length), then the length of the CEF following the STF 584 and/or the STF 588 may be K*L longer than the CEF following the STF 580, where K is an integer greater than or equal to one. In these embodiments, the additional length in the CEF may be used for more reliable frame timing, and/or to keep channel estimation sequences the same as in default packets.

In still other embodiments, the CEF following the STF 584 and/or the STF 588 may be shorter than the CEF following the STF 580. For example, the CEF following the STF 584 and/or the STF 588 may be one half the length of the CEF following the STF 580, or some other suitable shorter length. In still other embodiments, the CEF may be omitted following the STF 584 and/or the STF 588.

FIGS. 8A and 8B are diagrams of a preamble format for a default packet in a single carrier (SC) mode and an OFDM mode. In particular, FIG. 8A is a diagram of the preamble format 600 for SC mode, and FIG. 8B is a diagram of the preamble format 604 for OFDM mode. In FIG. 8A, an STF comprises a plurality of sequences a which may be Golay sequences (Ga). For example, the sequence a may be a length-128 sequence (or some other suitable length). A CEF of the preamble 600 comprises a pattern of the sequence a, and a complementary sequence b, which may also be a Golay sequence (Gb) of the same length as the sequence a, where a and b may be modified by a cover code. As used herein, the term "cover code" refers to how a series of sequences are augmented to form a longer sequence. For example, for a sequence [−b, +a, +b, +a], where a and b are complementary sequences, the cover code may be represented as [−1, +1, +1, +1], where −1 may indicate that the binary complement of the code a or b is utilized, or that the modulated signal corresponding to code −a, for example, is phase shifted by 180° with respect to the modulated signal corresponding to code +a. In this example [−b, +a, +b, +a], the cover code could be represented differently, such as [0, 1, 1, 1], where the first 0 indicates that −b is utilized. A plurality of a and b sequences in the CEF may form composite sequences u and v, where u and v are themselves complementary sequences. In some embodiments, u and v are themselves complementary Golay sequences. If the sequences a and b are each of length 128, then the sequences u and v are each of length 512. A sequence $v_s$ is merely the sequence −b, and the sequence $v_s$ acts as a cyclic postfix.

As can be seen in FIGS. 8A and 8B, the STF in both the SC mode and the OFDM mode is the same (i.e., a plurality of a sequences). Also, the CEF in both the SC mode and the OFDM mode is similar, except that the order of the sequences u and v is reversed. Also, it can be seen that $v_s$ acts as a cyclic postfix for both u and v.

If a communication protocol permits both SC and OFDM transmissions, a common control PHY format in general may be defined for SC transmissions, OFDM transmissions, or for both SC and OFDM transmissions. For example, a common control PHY format may be transmitted using SC modulation for a protocol that permits both SC and OFDM transmissions. However, it is also possible to define separate control PHY formats for SC transmissions and OFDM transmissions.

FIGS. 9A and 9B are diagrams of two example preamble formats for a control PHY packet, and that correspond to the default format illustrated in FIGS. 8A and 8B. In particular, FIG. 9A is a diagram of the control PHY preamble format 608, which corresponds to FIG. 8A. FIG. 9B is a diagram of the control PHY preamble format 612, which corresponds to FIG. 8B. In the formats illustrated in FIGS. 9A and 9B, the complementary sequence b is used in the STF to signal that the packet is a control PHY packet. Also in the formats illustrated in FIGS. 9A and 9B, the CEF is same length as in the formats of FIGS. 8A and 8B. It is noted, however, that the a and b sequences are swapped in the CEF's of FIGS. 9A and 9B as compared to the CEF's of FIGS. 8A and 8B, respectively, so that the preamble includes different sequences at the end of the STF field and at the start of the CEF field. In this manner, the preamble may efficiently signal the beginning of the CEF field.

FIGS. 10A and 10B are diagrams of a two example formats for a control PHY packet, and that correspond to the default formats illustrated in FIGS. 8A and 8B. In particular, FIG. 10A is a diagram of the preamble format 620, which corresponds to FIG. 8A. FIG. 10B is a diagram of the preamble format 624, which corresponds to FIG. 8B. In the formats illustrated in FIGS. 10A and 10B, the sign of alternate sequences in the STF is flipped as compared to the STF in the default mode preamble to signal that the packet is a control PHY packet. Also in the formats illustrated in FIGS. 10A and 10B, the CEF is same length as in the formats of FIGS. 8A and 8B. It is also noted that the CEF's in FIGS. 9A and 9B are the same as in FIGS. 8A and 8B, respectively.

FIGS. 11A and 11B are diagrams of two example preamble formats for a control PHY packet, and that correspond to the default formats illustrated in FIGS. 8A and 8B. In particular, FIG. 11A is a diagram of the preamble format 630, which corresponds to FIG. 8A. FIG. 11B is a diagram of the preamble format 634, which corresponds to FIG. 8B. In the formats illustrated in FIGS. 11A and 11B, the complementary sequence b is used in the STF to signal that the packet is a control PHY packet. Also in the formats illustrated in FIGS. 11A and 11B, a delimiter field 638 is included between the STF and the CEF. The delimiter field 638 may be useful for improving frame timing reliability, for example. The delimiter field 638 may include one or more sequences a. It is noted that the CEF's in FIGS. 11A and 11B are the same as in FIGS. 8A and 8B, respectively.

Figures 12A, 12B:
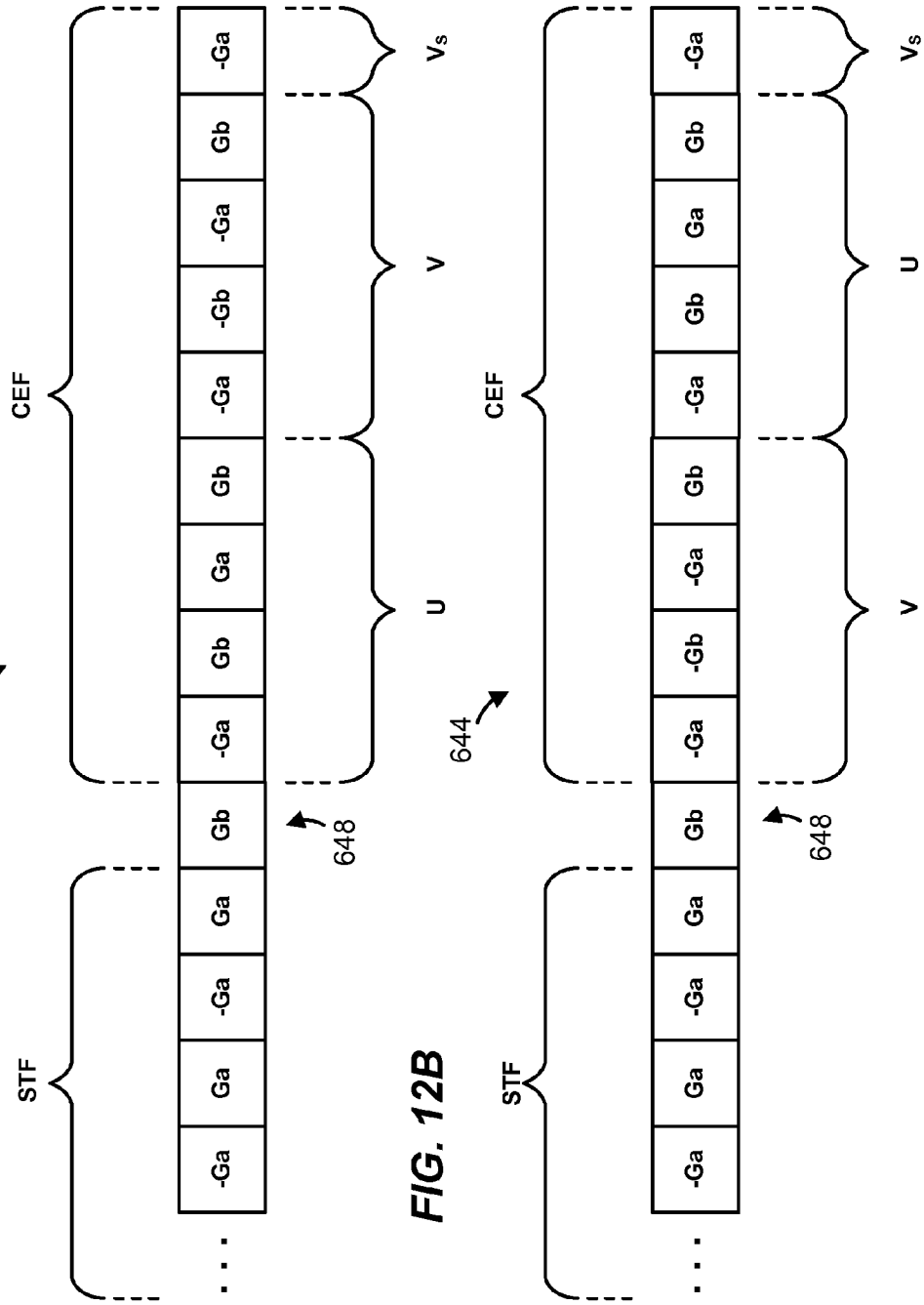
FIGS. 12A and 12B are diagrams of example formats for a preamble of a control PHY data unit, wherein a different cover code is used in the STF compared to the spreading of FIGS. 8A and 8B.

FIGS. 12A and 12B are diagrams of two example preamble formats for a control PHY packet, and that correspond to the default formats illustrated in FIGS. 8A and 8B. In particular, FIG. 12A is a diagram of the preamble format 640, which corresponds to FIG. 8A. FIG. 12B is a diagram of the preamble format 644, which corresponds to FIG. 8B. In the formats illustrated in FIGS. 12A and 12B, the sign of alternate sequences in the STF is flipped as compared to the STF in the default mode preamble to signal that the packet is a control PHY packet. Also in the formats illustrated in FIGS. 12A and 12B, a delimiter field 648 is included between the STF and the CEF. The delimiter field 648 may be useful for improving frame timing reliability, for example. The delimiter field 648 may include one or more sequences b. Also in the formats illustrated in FIGS. 12A and 12B, the CEF is same length as in the formats of FIGS. 8A and 8B. It is noted, however, that the a and b sequences are swapped in the CEF's of FIGS. 12A and 12B as compared to the CEF's of FIGS. 8A and 8B, respectively.

Figures 13A, 13B:
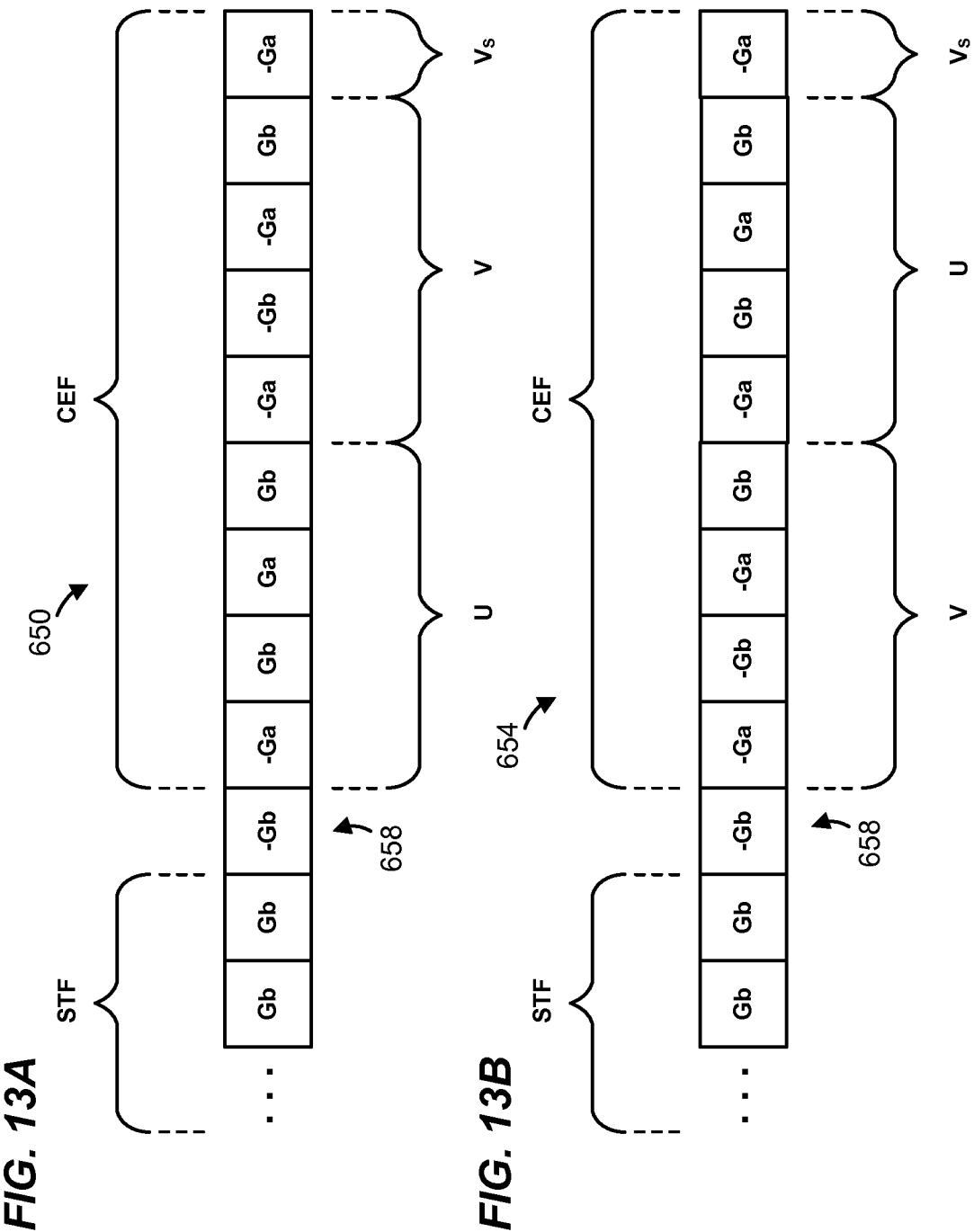
FIGS. 13A and 13B are diagrams of example formats for a preamble of a control PHY data unit, wherein a complementary spreading sequence is used in the STF compared to the format of FIGS. 8A and 8B.

FIGS. 13A and 13B are diagrams of two example preamble formats for a control PHY packet, and that correspond to the default formats illustrated in FIGS. 8A and 8B. In particular, FIG. 13A is a diagram of the preamble format 650, which corresponds to FIG. 8A. FIG. 13B is a diagram of the preamble format 654, which corresponds to FIG. 8B. In the formats illustrated in FIGS. 13A and 13B, the complementary sequence b is used in the STF to signal that the packet is a control PHY packet. Also in the formats illustrated in FIGS. 13A and 13B, a delimiter field 658 is included between the STF and the CEF. The delimiter field 658 may be useful for improving frame timing reliability, for example. The delimiter field 658 may include one or more sequences −b. Also in the formats illustrated in FIGS. 13A and 13B, the CEF is same length as in the formats of FIGS. 8A and 8B. It is noted, however, that the a and b sequences are swapped in the CEF's of FIGS. 13A and 13B as compared to the CEF's of FIGS. 8A and 8B, respectively.

FIGS. 13C and 13D are diagrams of two example preamble formats for a control PHY packet. In the preamble formats 655 and 657, the same complementary sequence a is used in the STF as in the default formats illustrated in FIGS. 8A and 8B, respectively, and a delimiter field 656 between the STF and the CEF signals that the packet is a control PHY packet. The delimiter field 656 may include one or more sequences b. As compared to the formats of FIGS. 8A and 8B, the a and b sequences are swapped in the CEF's of FIGS. 13C and 13D, respectively.

Next, FIGS. 13E and 13F depict two example preamble formats for a control PHY packet in which the sequence a is used in the STF of the preamble format 659 and the preamble format 661. The control PHY formats 695 and 661 correspond to the default formats in FIGS. 8A and 8B, respectively. Similar to the formats illustrated in FIGS. 13C and 13D, the formats 659 and 661 utilize the same sequence in the STF as the respective formats of FIGS. 8A and 8B. The delimiter field 660 includes one or more sequences −a to signal, by flipping the sign of the sequence a relative to the preceding STF field, that the packet is a control PHY packet. To ensure efficient detection and correlation of the CEF sequences in the CEF, the signs of a and b sequences are flipped in the CEF's of FIGS. 13E and 13F as compared to the CEF's of FIGS. 8A and 8B, respectively.

Referring now to the examples of FIGS. 11A, 11B, 12A, 12B, and 13A-13F, in an alternative, the CEF may be omitted.

Figure 14:
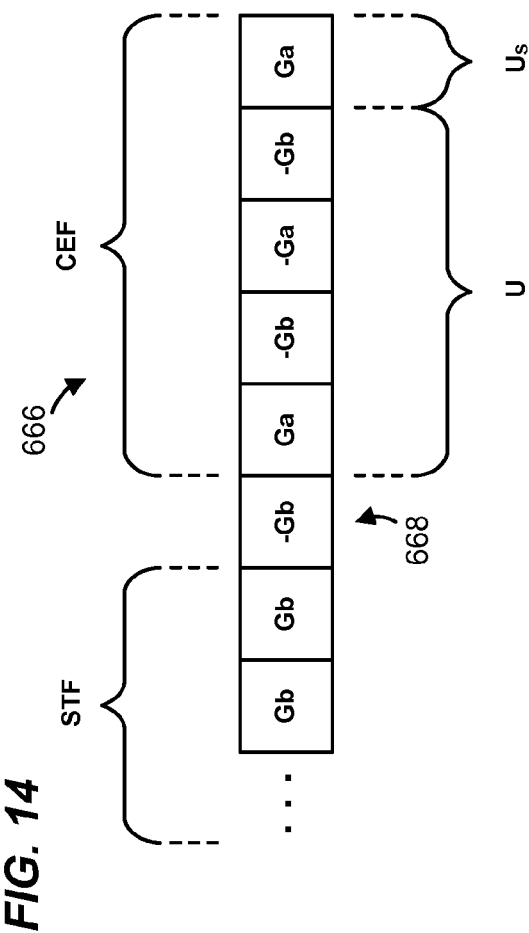
FIG. 14 is diagram of another example format for a preamble of a control PHY data unit, wherein a complementary spreading sequence is used in the STF compared to the spreading of FIGS. 8A and 8B.
Figure 15:
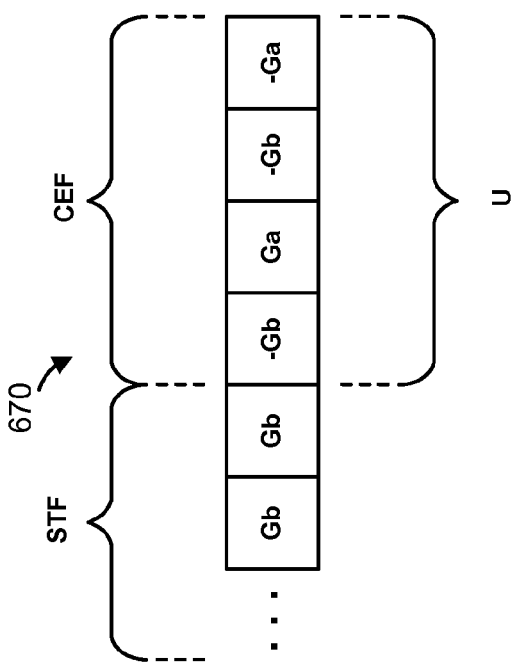
FIG. 15 is diagram of another example format for a preamble of a control PHY data unit, wherein a complementary spreading sequence is used in the STF compared to the format of FIGS. 8A and 8B.

Referring now to the examples of FIGS. 9A, 9B, 10A, 10B, 11A, 11B, 12A, 12B, 13A-13F, in an alternative, the CEF may be of approximately half the length as in the preamble of a default packet. FIG. 14 is an example format 666 for a preamble for a control PHY packet in which the control PHY packet is signaled by using the complementary sequence b in the STF. The format 666 also includes a delimiter field 668 having one or more −b sequences. Further, the format 660 includes a CEF that includes only one composite sequence u (as opposed to two composite, complementary sequences u and v). The CEF includes a cyclic postfix field $u_s$, which is optional and may be omitted in some implementations. FIG. 15 is another example format 670 for a preamble for a control PHY packet in which the control PHY packet is signaled by using the complementary sequence b in the STF. The format 670 includes a CEF that includes only one composite sequence u (as opposed to two composite, complementary sequences u and v). A first sequence of u (−b) is phase shifted by 180 degrees with respect to the sequences used in the STF. The particular u sequences shown in FIGS. 14 and 15 are not required. Rather, any suitable u (e.g., a Golay sequence) composed of a and b complementary sequences may be utilized. For instance, if there is no delimiter field, u may be selected so that it begins with a complementary sequence to the last sequence in STF.

Figure 16:
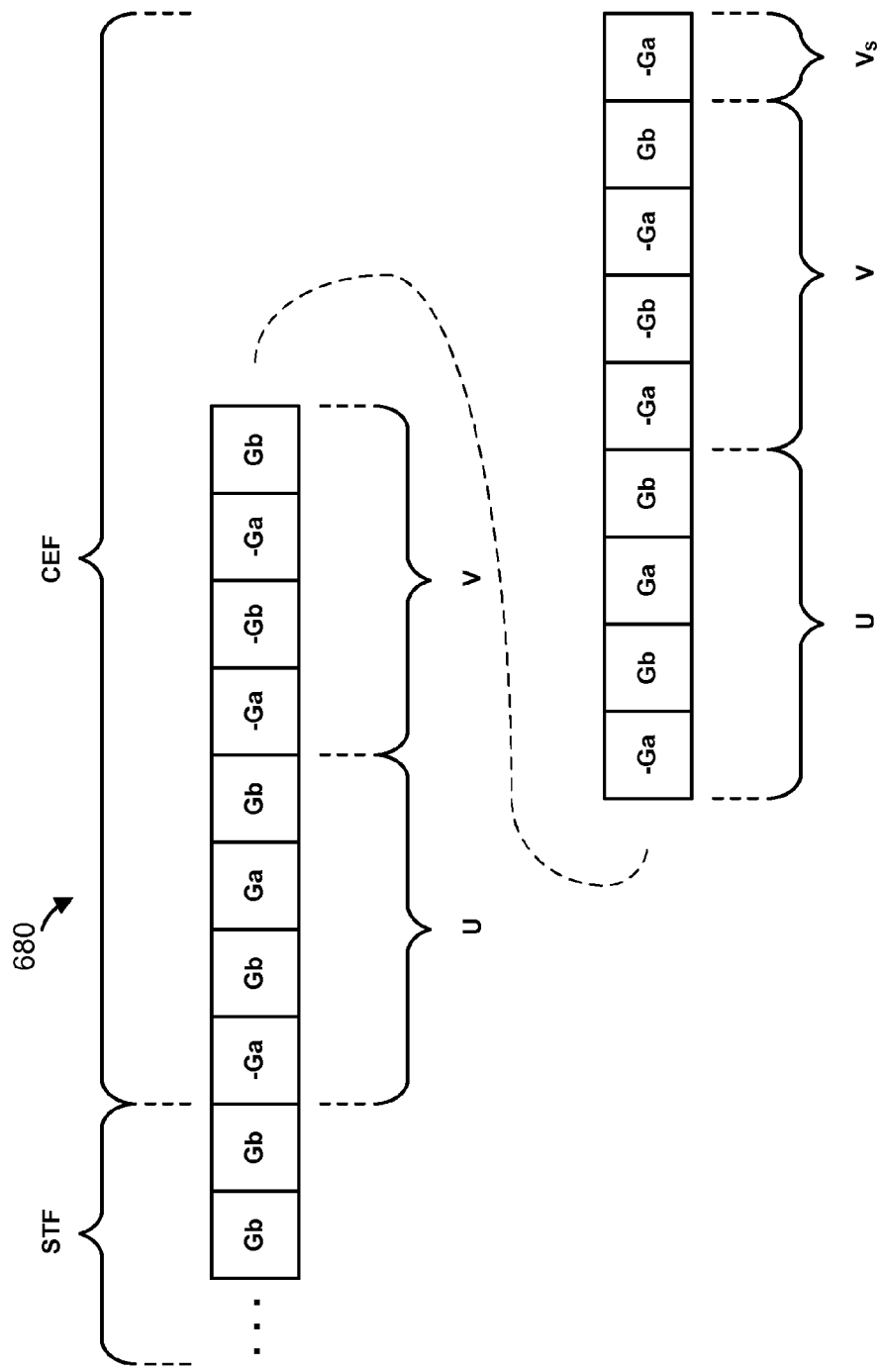
FIG. 16 is diagram of another example format for a preamble of a control PHY data unit format, wherein a complementary spreading sequence is used in the STF compared to the format of FIGS. 8A and 8B.
Figure 17:
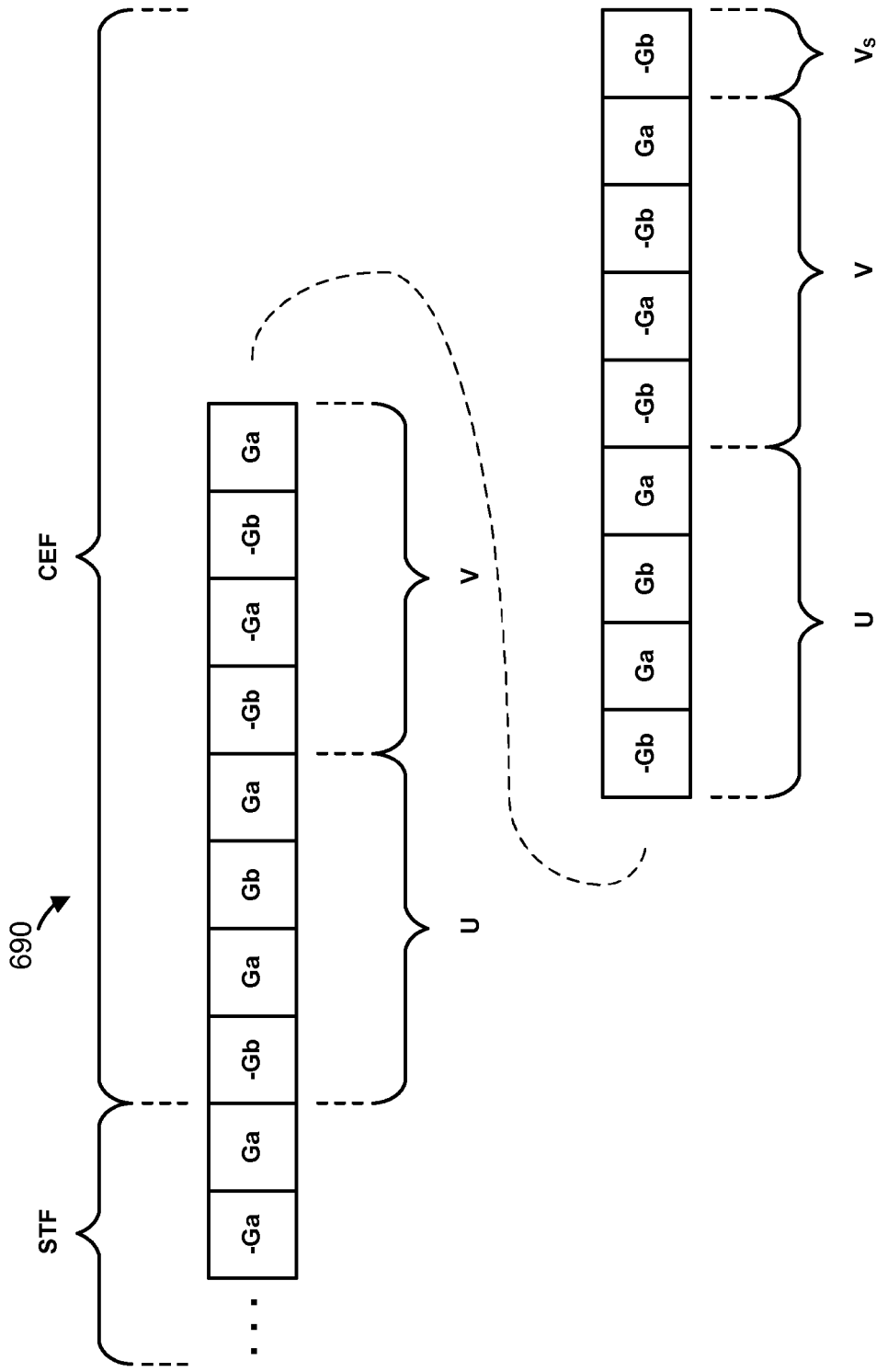
FIG. 17 is diagram of another example format for a preamble of a control PHY data unit format, wherein a different cover code is used in the STF compared to the format of FIGS. 8A and 8B.
Figure 18:
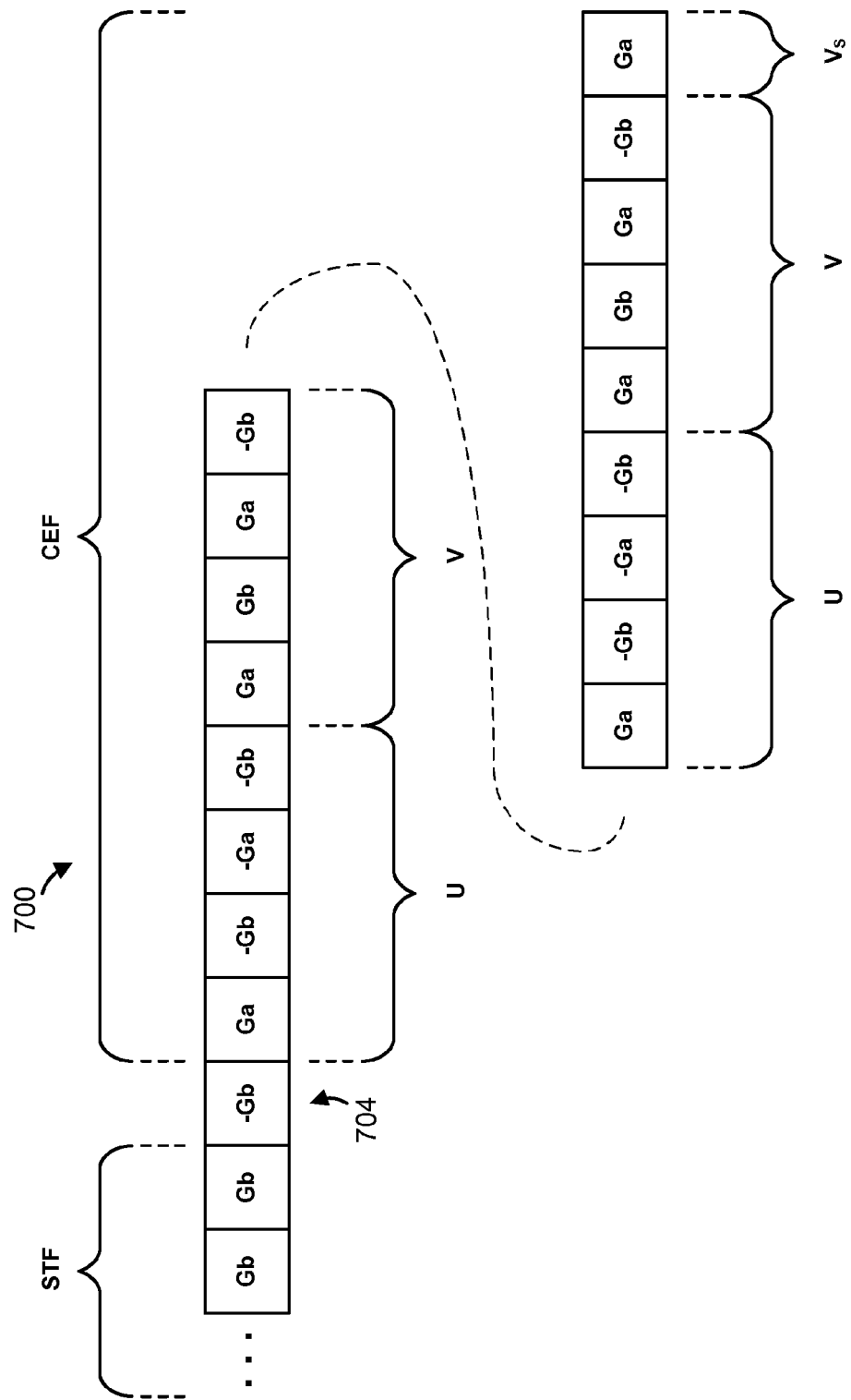
FIG. 18 is diagram of another example format for a preamble of a control PHY data unit format, wherein a complementary spreading sequence is used in the STF compared to the format of FIGS. 8A and 8B.

Referring now to the examples of FIGS. 9A, 9B, 10A, 10B, 11A, 11B, 12A, 12B, 13A-13F, in an alternative, the CEF may be approximately multiple times (e.g., 2 or more) the length as in the preamble of a default packet. FIG. 16 is a diagram of an example format 680 for a preamble for a control PHY packet in which the control PHY packet is signaled by using the complementary sequence b in the STF. The format 680 is similar to the format 608 of FIG. 9A except that the CEF in the format 680 includes two or more u sequences and two or more v sequences. FIG. 17 is a diagram of an example format 690 for a preamble for a control PHY packet in which the control PHY packet is signaled by using the alternating +a, −a sequences in the STF. The format 690 is similar to the format 620 of FIG. 10A except that the CEF in the format 690 includes two or more u sequences and two or more v sequences. FIG. 18 is a diagram of an example format 700 for a preamble for a control PHY packet in which the control PHY packet is signaled by using the complementary sequence b in the STF. The format 700 includes a delimiter field 704 having one or more sequences −b. The CEF includes two or more u sequences and two or more v sequences. The receiver of a data unit that conforms to the formats 680, 690, or 700 may perform channel estimation two or more times using the repetitions of u and v sequences. The receiver may then average the results, for example, to improve the overall quality of channel estimation.

In the examples of FIGS. 16-18, as with the examples of FIGS. 9A, 9B, 10A, 10B, 11A, 11B, 12A, 12B, 13A-13F, the last sequence of the STF (when no delimiter field) or the last sequence of the delimiter field (when included) may act as a cyclic prefix of the first composite symbol in the CEF. Also, in the examples of FIGS. 16-18, as with the examples of FIGS. 9A, 9B, 10A, 10B, 11A, 11B, 12A, 12B, 12A, and 12B, the last sequence of the composite sequence u may act as a cyclic prefix of v, and vice versa. Similarly, the first sequence of the composite sequence v may act as a cyclic postfix of u, and vice versa. When multiple sequences u and v are included in the CEF, the receiver may generate a channel estimation for each u, v pair, and then combine the results by averaging, for example.

Referring again to FIG. 2, with default formats as discussed with reference to FIGS. 8A and 8B and control PHY preamble formats as discussed with reference to FIGS. 9A, 9B, 10A, 10B, 13A, 13B, 14 and 15, the control PHY detector 92 may include a correlator configured to cross correlate with the sequence a (an "a correlator") and a correlator configured to cross correlate with the sequence b (a "b correlator"), in one embodiment. In this embodiment, the control PHY detector 92 may utilize the output of the a correlator and the output of the b correlator to determine when an SFD of a default packet or an SFD of a control PHY packet has been received. With control PHY preamble formats as discussed with reference to FIGS. 10A, 10B, 12A and 12B, the control PHY detector 92 may include an a correlator and a correlator configured to cross correlate with the sequence –a (a "–a correlator"), in one embodiment. In this embodiment, the control PHY detector 92 may utilize the output of the a correlator and the output of the –a correlator to determine when an STF of a default packet or an STF of a control PHY packet has been received. In another embodiment for use with preamble formats as discussed with reference to FIGS. 10A, 10B, 12A and 12B, the control PHY detector 92 may include an a correlator and may utilize the output of the a correlator to determine when an STF of a default packet or an STF of a control PHY packet has been received.

In other embodiments, a control PHY packet may be signaled using repeated sequences in the STF that are double the length of a. For example, if a is a length-128 sequence, a control PHY packet may be signaled using repeated length-256 sequences in the STF. The length of STF may be the same as in the default mode. In other words, the number of double-length sequences may be one half the number of a sequences in the STF of the default packet. In one embodiment, the double-length sequences are combinations of the complementary sequences a and b. In this embodiment, and if the CEF also utilizes the sequences a and b, an a correlator and a b correlator may be reused for both control PHY packet detection and channel estimation in default mode.

A double-length sequence m may be utilized in the STF to signal a control PHY packet. The sequence m may be any of the following combinations of the complementary sequences a and b: [b a], [b –a], [a b], or [a –b]. If the sequences a and b are Golay sequences (Ga, Gb), then a double-length Golay sequence Gm may be used, and Gm may be any of the following: [Gb Ga], [Gb –Ga], [Ga Gb], or [Ga–Gb]. If a delimiter field is utilized, the delimiter field may utilize one or more of the following double-length sequences: –m or n, where n is a complementary sequence of m. For example, if m is [b a], [b –a], [a b], or [a –b], then n may be [b –a], [b a], [a –b], or [a b], respectively. If the sequences a and b are Golay sequences (Ga, Gb), and if Gm is [Gb Ga], [Gb –Ga], [Ga Gb], or [Ga –Gb], then n may be a Golay sequence (Gn) and may be [Gb –Ga], [Gb Ga], [Ga –Gb], or [Ga Gb], respectively. In these embodiments in which double-length sequences are utilized in the STF, composite sequences for the CEF may be selected so that the last half-length sequence of the STF (when no delimiter field) or the last half-length sequence of the delimiter field (when included) may act as a cyclic prefix of the first composite sequence in the CEF. For example, if the a sequence is a length-128 sequence, the last 128 chips of the STF (when no delimiter field) or the last 128 chips of the delimiter field (when included) may act as a cyclic prefix of the first composite sequence in the CEF.

FIG. 19 is a diagram of an example preamble format 710 for a control PHY packet that utilizes a double-length sequence m. A start frame delimiter (SFD) field may include one or more sequences –m. A CEF is selected so that the –a sequence in the SFD acts as a cyclic prefix for u. FIG. 20 is a diagram of another example preamble format 720 for a control PHY packet that utilizes a double-length sequence m. A delimiter (SFD) may include one or more sequences –m. A CEF is selected so that the –a sequence in the SFD acts as a cyclic prefix for u. As can be seen, the u and v sequences are different in the formats of FIGS. 19 and 20. A format for a default packet corresponding to the formats of FIGS. 19 and 20 may utilize a plurality of a sequences.

Referring again to FIG. 2, with control PHY preamble formats as discussed with reference to FIGS. 19 and 20, the control PHY detector 92 may include a correlator configured to cross correlate with the sequence a (an "a correlator") and a correlator configured to cross correlate with the sequence b (a "b correlator"), in one embodiment. In this embodiment, the control PHY detector 92 may utilize the output of the a correlator and the output of the b correlator to determine when an SFD of a default packet or an SFD of a control PHY packet has been received. In another embodiment, the control PHY detector 92 may include an "a correlator" and a correlator configured to cross correlate with the sequence m (an "m correlator"). In this embodiment, the control PHY detector 92 may utilize the output of the a correlator and the output of the m correlator to determine when an SFD of a default packet or an SFD of a control PHY packet has been received.

An alternative way for auto-detection is to run 128- and 256-Golay correlators in parallel during the carrier sensing period (i.e. running regular PHY and control PHY carrier sensing in parallel), if the carrier sensing by the 256-Golay correlator claims a valid control PHY signal, then it will always over-write the carrier sensing result for the regular PHY (i.e. the result with the 128-Golay correlator output).

FIG. 21 is an example correlator 740 that may be utilized in embodiments that utilize Gm in the preamble to signal a control PHY packet, and where the a and b sequences have lengths of 128. The correlator 740 generates a cross correlation (Xm) of the received signal with the sequence m, and a cross correlation (Xn) of the received signal with the sequence n. The correlator 740 may include a Ga/Gb correlator 744 that generates a cross correlation (Xa) between a received signal and the sequence Ga, and that generates a cross correlation (Xb) between the received signal and the sequence Gb. An Xb output is coupled to a delay line 746 that provides a delay of 128 chips. The correlator 740 also includes a subtractor 748 and an adder 750. The subtractor 748 is coupled to an Xa output of the correlator 744 and to an output of the delay line 746. The subtractor 748 subtracts a delayed version of Xb from Xa to generate Xn. The adder 750 is coupled to the Xa output of the correlator 744 and to the output of the delay line 746. The adder 750 adds the delayed version of Xb to Xa to generate Xm. In the embodiment of FIG. 20, the Ga/Gb correlator 744 can be used also for detecting cross correlations with the sequences a and b. In other embodiments in which the lengths of the a and b sequences are not 128, a different length delay line may be utilized.

FIG. 22 is an example correlator 756 that may be utilized in embodiments that utilize Gm in the preamble to signal a control PHY packet, and where the a and b sequences have lengths of 128. The correlator 756 generates a cross correlation (Xu) of the received signal with the sequence u, and a cross correlation (Xv) of the received signal with the sequence v. The correlator 756 may include the Gm/Gn correlator 740. The Xn output is coupled to a delay line 758 that provides a delay of 256 chips. An Xm output is coupled to a delay line 760 that provides a delay of 256 chips. The correlator 756 also includes an adder 762 and a subtractor 764. The subtractor 764 is coupled to the Xn output of the correlator 740 and to an output of the delay line 760. The subtractor 748 subtracts a delayed version of Xm from Xn to generate Xv. The adder 762 is coupled to the Xm output of the correlator 740 and to an output of the delay line 758. The adder 762 adds the delayed version of Xn to Xm to generate Xu. In the embodiment of FIG. 20, the Gm/Gn correlator 740 can be used also for detecting cross correlations with the sequences m and n. In other embodiments in which the lengths of the a and b are not 128, a different length delay line may be utilized.

In other embodiments, the control PHY packet may be signaled by using a sequence a' in the STF, where a' is neither the same as a nor a complementary sequence of a. The sequence a' may have the same length as a or it may be half the length of a. In these embodiments, the CEF may comprise composite sequences utilizing the complementary sequences a and b. In these embodiments, a delimiter field comprising one or more of the sequence –a' may optionally be included. Also in these embodiments, a cyclic prefix optionally may be included prior to the CEF.

In some embodiments, a control PHY packet may be signaled by the spreading sequence used to spread the PHY header. For example, a default packet may utilize the sequence a to spread data in the PHY header, whereas a control PHY packet may utilize the complementary sequence b to spread data in the PHY header. In these embodiments, a receiver may detect a control PHY packet by cross correlating with the sequences a and b comparing the energy of the two cross correlations. In one specific example, the sequences a and b may be Golay sequences of length 64. Of course, other length sequences may also be utilized.

In some embodiments, there may be multiple types of control PHY packets of which a BFT packet is one type. In these embodiments, the control PHY packet may be signaled by the preamble as discussed above with respect to FIGS. 9A, 9B, 10A, 10B, 11A, 11B, 12A, 12B, 13A, 13B, and 14-20. In order to then signal a BFT packet as opposed to the other types of control PHY packets, other information may be encoded in the preamble and/or the PHY header. For example, the order of u and v in the CEF may be switched to signal a BFT packet. As another example, the spreading sequence used to spread the PHY header may be used to signal whether the packet is a BFT packet. As another example, one or more fields in the PHY header (e.g., the payload length field, a BFT field of a PHY header of a control PHY packet, etc.) may signal a BFT packet.

Figure 23:
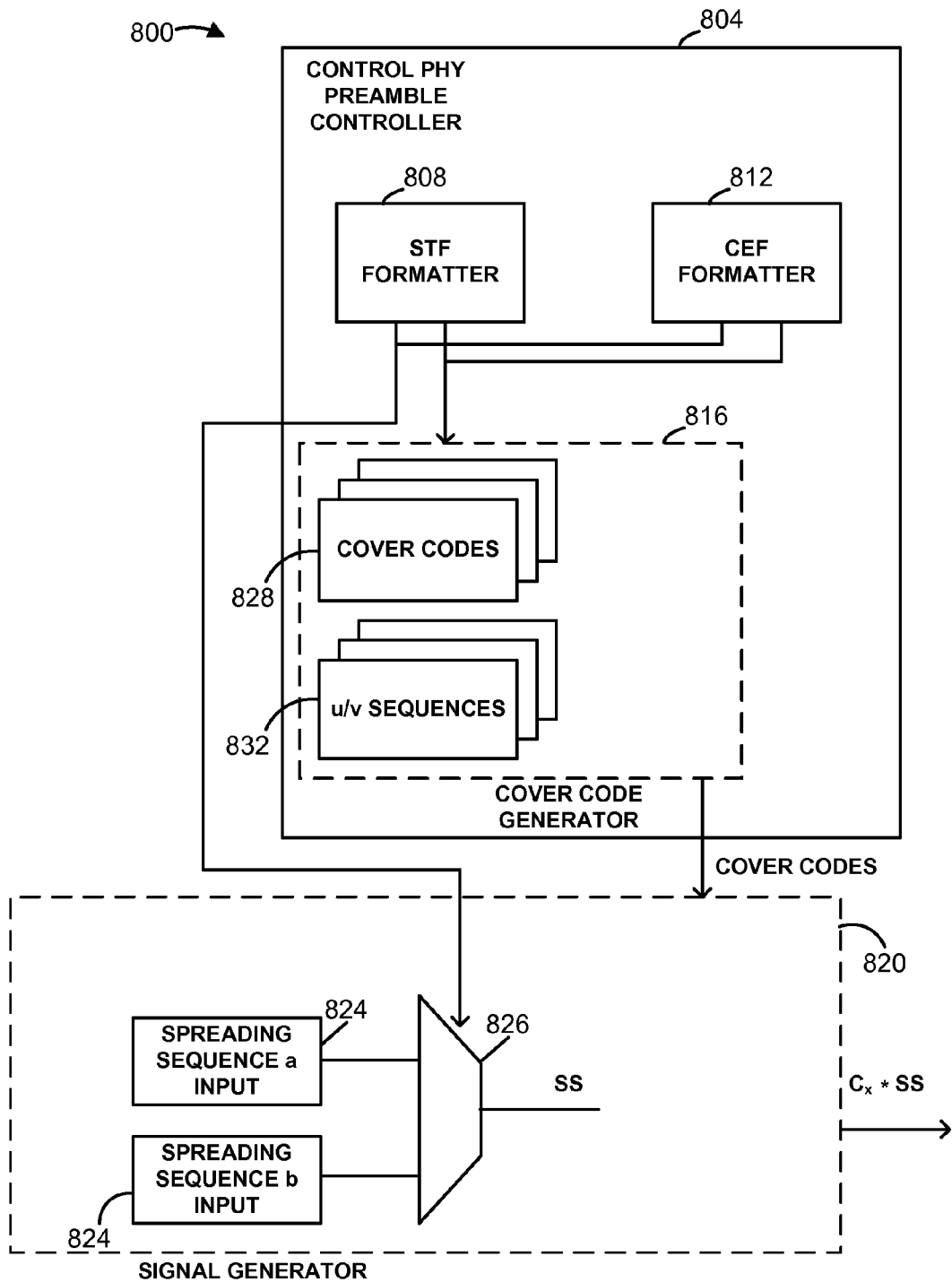
FIG. 23 is a block diagram of an example control PHY preamble generator.

FIG. 23 is a block diagram of an example control PHY packet preamble generator 800 that may be included in the control PHY packet generator 76 (FIG. 2) in embodiments corresponding to FIGS. 9A, 9B, 10A, 10B, 11A, 11B, 12A, 127B, 13A, 138B, and 14-20. The control PHY packet preamble generator 800 may include a control PHY packet preamble controller 804 that includes an STF formatter 808 and a CEF formatter 812, each of which may be implemented using hardware, a processor executing machine readable instructions, or combinations thereof. Each of the formatters 808 and 812 is communicatively coupled to at least a cover code generator 816 and a signal generator 820.

The signal generator 820 generally receives cover codes and indications of when to generate signals using either a chip sequence a or a chip sequence b from the STF formatter 808, the CEF formatter 812 and the cover code generator 816. The chip sequences a and b are complementary sequences. In some embodiments, the signal generator 820 may include a memory device 824, such as RAM, ROM, or another type of memory, to store the complementary sequences a and b. In other embodiments, the signal generator 820 may include a and b sequence generators. In one embodiments, the signal generator 820 includes a binary selector 826 to select one of the two complementary sequences a and b for preamble signal generation. The two complementary sequences a and b have correlation properties suitable for detection at a receiving device. For example, the complementary spreading sequences a and b may be selected so that the sum of corresponding out-of-phase aperiodic autocorrelation coefficients of the sequences a and b is zero. In some embodiments, the complementary sequences a and b have a zero or almost-zero periodic cross-correlation. In another aspect, the sequences a and b may have aperiodic cross-correlation with a narrow main lobe and low-level side lobes, or aperiodic auto-correlation with a narrow main lobe and low-level side lobes. In some of these embodiments, the sequences a and b are complementary Golay sequences. Although various lengths of the sequences a and b may be utilized, each of the sequences a and b, in some of the embodiments, has a length of 128-chips.

The cover code generator 816 may include a memory device 828, such as RAM, ROM, or another type of memory, to store sets of cover codes. Similarly, the cover code generator 816 may include a memory device 832, such as RAM, ROM, or another type of memory, to store u/v sequences. The cover code generator 816 also may include one or more other memory devices to store other sequences that span all or parts of the STF field, all or parts of CEF field, or both the STF field and the CEF field. In response to commands from the STF formatter 808 and the CEF formatter 812, the cover code generator 816 may generate cover codes for a particular PHY preamble.

From the foregoing, it will be appreciated that the control PHY packet preamble controller 804 may control the signal generator 820 to generate a control PHY packet preamble using only one pair of sequences a and b. In some embodiments, however, in addition to the sequences a and b, the control PHY preamble controller 804 may also control the signal generator 820 to utilize other sequences a' and b' to generate a control PHY preamble.

Figure 24:
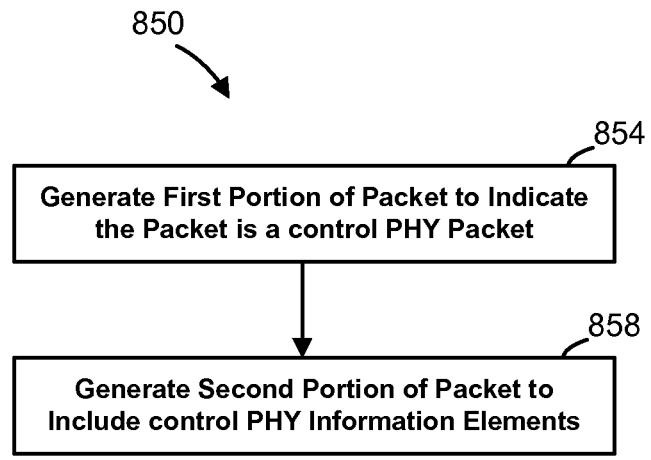
FIG. 24 is a flow diagram of an example method for generating a control PHY packet.

FIG. 24 is a flow diagram of an example method 850 for generating a control PHY packet. The method 850 may be utilized in a wireless communication system in which communication devices exchange information utilizing data units that conform to a first format that includes a MAC header. The control PHY packet conforms to a second format that is different than the first format. The method 850 may be implemented by a transmitter such as the transmitter 12 of FIG. 2.

At block 854, a first portion of a packet may be generated to indicate that the packet is a control PHY packet. The first portion of the packet may include a preamble and may include a portion of the PHY header, and the first portion of the packet may conform at least in some respects to the first format. At block 858, a second portion of the packet is generated according to the second format. The second portion of the control PHY packet includes control PHY information elements.

Figure 25:
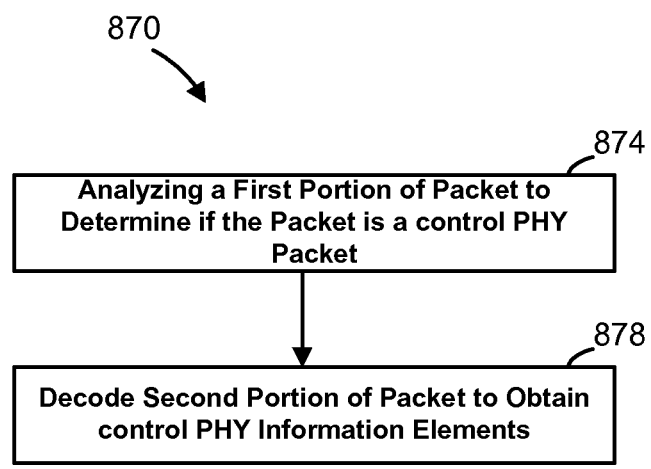
FIG. 25 is a flow diagram of an example method for detecting and utilizing a received control PHY packet.

FIG. 25 is a flow diagram of an example method 870 for decoding a control PHY packet. The method 870 may be utilized in a wireless communication system in which communication devices exchange information utilizing packets that conform to the first format, wherein the control PHY packets conform to the second format. The method 850 may be implemented by a receiver such as the receiver 14 of FIG. 2.

At block 874, a first portion of a received packet is analyzed to determine if the received packet is a control PHY packet. The first portion of the received packet may include a preamble and may include a beginning portion of the PHY header. If the received packet is determined to be a control PHY packet, control PHY information elements in a second portion of the control PHY packet may be decoded at block 878. The second portion of the control PHY packet conforms to the second format.

From the foregoing, it will be noted that a control PHY packet, e.g., a BFT packet, a beacon transmission packet, may include or omit various fields in the header and in the payload depending on implementation and the requirements of the control procedure. Thus, a BFT packet may include a BF ID field but a control PHY packet used for beacon transmission may omit this field. With respect to encoding, spreading, and modulating the header and the payload, the components 52-56 illustrated in FIG. 2 may be used. Alternatively, the header and the payload of a control PHY packet may be modulated and spread using an example modulator 1100 illustrated in FIG. 26. Preferably, modulation of a control PHY header is the same as the modulation of the corresponding control PHY payload.

The modulator 1100 may include a frame check sequence (FCS) generator 1102, a padding bit generator 1104, a scrambler 1106, a forward error correction (FEC) bit generator 1108, a constellation mapper 1110, a spreader 1112, and a block and cyclic prefix generator 1114. If desired, the components 1102, 1104, 1108, and 1114 may be omitted. If included, the FCS generator 1102 applies a CRC code to the header or the payload. Similarly, the optional padding bit generator 1104 need not necessarily apply padding bits. However, padding bits are unconditionally applied if the block and cyclic prefix generator is activated. Further, the scrambler 1106 may use either the seed specified in the PHY header or, alternatively, a predetermined seed stored at the receiver, for example. The FEC bit generator 1108 may apply the same low density parity check (LDPC) code as regular or default packets (see FIG. 3B). The constellation mapper 1110 may apply any desired modulation scheme to the encoded bits such as BPSK, QPSK, 16 QAM, differential BPSK (DBPSK), differential QPSK (DQPSK), etc.

If desired, the spreader 1112 may apply the same spreading sequence to the header and/or the payload as used in spreading the preamble of the control PHY packet. Accordingly, the receiving device 14 (see FIG. 1) may use the same correlator for processing the preamble, the header, and (if available) the payload of a control PHY packet. The spreader 1112 in some embodiments may apply a spreading sequence complementary to the spreading sequence used to spread the STF of the control PHY packet. Thus, if a 128-chip Golay sequence a is applied to the STF of a packet, a 128-chip Golay sequence b complementary to a may be applied to the payload of the packet. In this manner, a device seeking a control PHY packet such as a beacon will not mistake the payload of another control PHY packet for the STF of the control PHY packet being sought.

In some configurations, the spreader 1112 may apply a spreading sequence of a different length to the header and/or the payload. For example, the preamble of a control PHY packet may be spread with a spreading factor (i.e., length of the spreading sequence) of 128, and the header and payload of the same packet may be spread with a spreading factor of 64 or 32.

When the spreader 1112 applies spreading sequences of different lengths to various parts of a control PHY packet, the spreading sequences may be selected so as to permit the use of shared correlator architecture. To better illustrate such efficient shared correlator architecture, an example correlator 1130 associated with a pair of complementary 128-chip Golay sequences is discussed next with reference to FIG. 27A. As is known, a pair of complementary Golay sequences may be defined by a weight vector W and a delay vector D. In particular, a pair of 128-chip Golay sequences $a_{128}$ and $b_{128}$ may be defined by $$W_{128} = [W_1\, W_2\, W_3\, W_4\, W_5\, W_6\, W_7] \text{ and} \qquad (1)$$

$$D_{128} = [D_1\, D_2\, D_3\, D_4\, D_5\, D_6\, D_7], \qquad (2)$$

and implemented in hardware, firmware, or software as a plurality of multipliers 1132, delay elements 1134, and adders/subtractors 1136. In operation, the correlator 1130 receives an input signal 1140 and outputs a pair of cross-correlation signals Xa and Xb indicative of correlation between the input signal 1140 and the sequences $a_{128}$ and $b_{128}$, respectively.

Figure 27A:
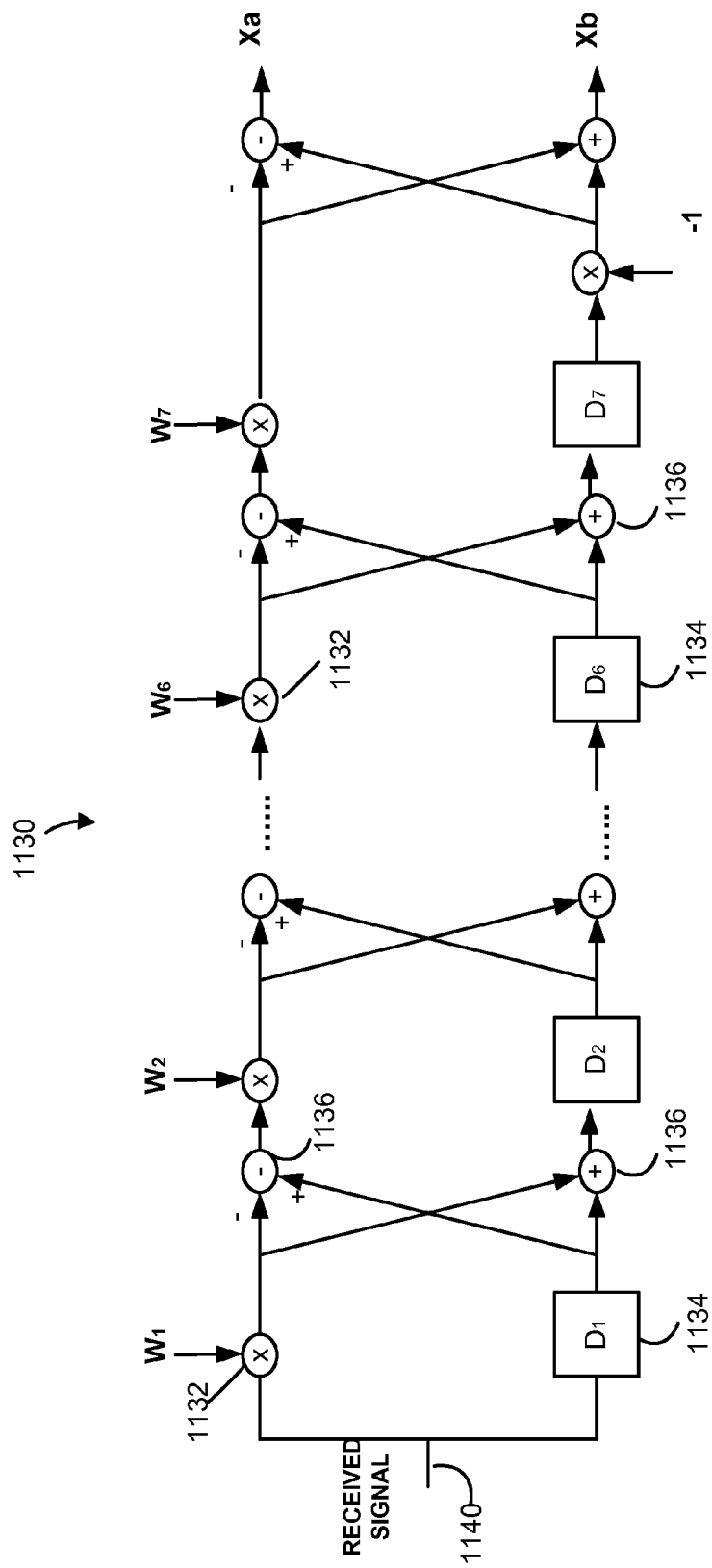
FIG. 27A is a block diagram of a correlator for correlating a signal with Golay sequences.
Figure 27B:
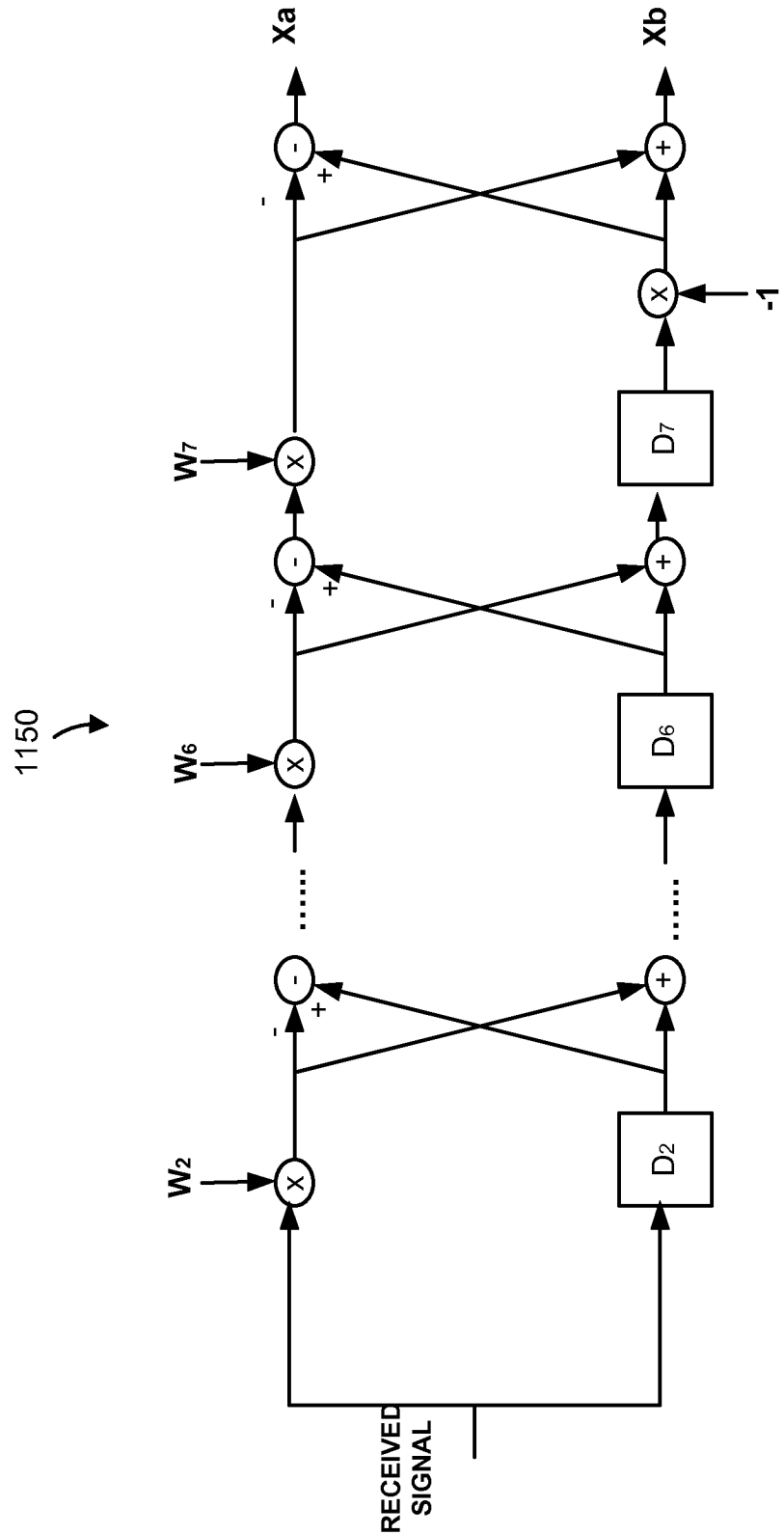
FIG. 27B is a block diagram of a correlator for correlating a signal with shorter sequences as compared to the correlator of FIG. 27A.

To permit efficient reuse of the architecture of the correlator 1130, the vector $D_{128}$ may be given by $$D_{128} = [64\, D_2\, D_3\, D_4\, D_5\, D_6\, D_7], \qquad (3)$$

so that vectors $W_{64}$ and $D_{64}$ given by $$W_{64} = [W_2\, W_3\, W_4\, W_5\, W_6\, W_7] \text{ and} \qquad (4)$$

$$D_{64} = [D_2\, D_3\, D_4\, D_5\, D_6\, D_7] \qquad (5)$$

define complementary Golay sequences $a_{64}$ and $b_{64}$ that are the first halves of the respective sequences $a_{128}$ and $b_{128}$. Referring to FIG. 27B, a correlator 1150 implements the algorithm associated with the $W_{64}$ and $D_{64}$ to process 64-chip sequences in the header and/or the payload of a control PHY packet, while the correlator 1130 of FIG. 27A may process 128-chip sequences in the preamble of the same control PHY packet. It will be noted that the architecture of the correlators 1130 and 1150 is generally the same, except that the correlator 1130 effectively extends the correlator 1150 by an additional stage to process another delay element and another multiplication factor.

Figure 27C:
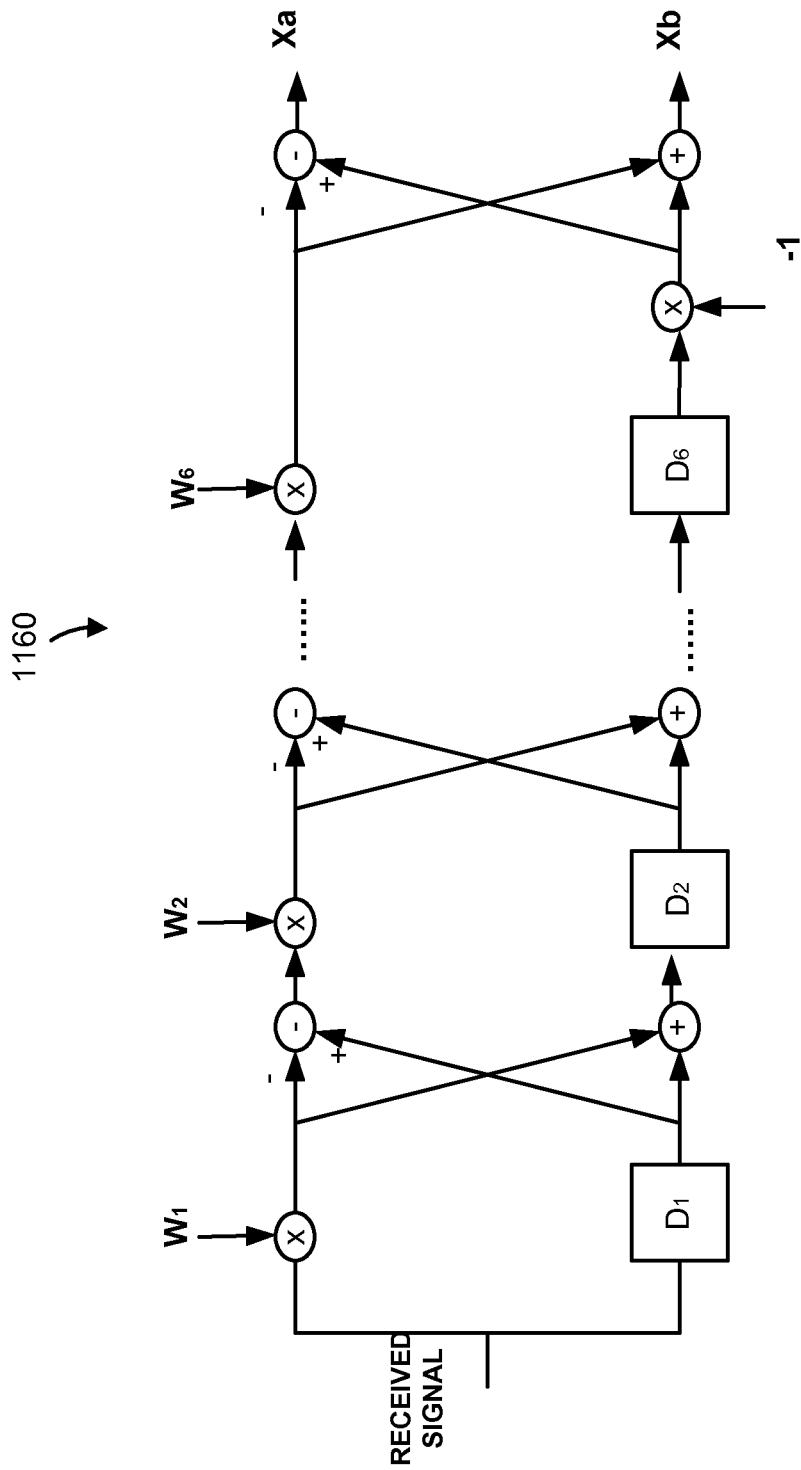
FIG. 27C is a block diagram of another correlator for correlating a signal with shorter sequences as compared to the correlator of FIG. 27A.

As another example, the vector $D'_{128}$ associated with a pair of complementary Golay sequences $a'_{128}$ and $b'_{128}$ may be given by $$D'_{128} = [D_1\, D_2\, D_3\, D_4\, D_5\, D_6\, 64], \qquad (6)$$

and the corresponding pair of vectors $W'_{64}$ and $D'_{64}$ may be given by $$W'_{64} = [W_1\, W_2\, W_3\, W_4\, W_5\, W_6] \text{ and} \qquad (7)$$

$$D'_{64} = [D_1\, D_2\, D_3\, D_4\, D_5\, D_6], \qquad (8)$$

so that complementary Golay sequences $a'_{64}$ and $b'_{64}$ are the second halves of the respective sequences $a'_{128}$ and $b'_{128}$. FIG. 27C illustrates an example 64-chip correlator 1160 that generates correlation signals corresponding to the sequences $a'_{64}$ and $b'_{64}$.

Generally speaking, a 128-chip correlator advantageously related to a certain 64-chip correlator as illustrated above may be associated with vectors $W_{128}$ and $D''_{128}$ in with $D_i$=64:

$$D'_{128}=[D_1 \ldots 64 \ldots D_7], \quad (9)$$

so that a pair vectors $W''_{64}$ and $D''_{64}$ for generating a pair of corresponding 64-chip complementary Golay sequences may be derived by removing the elements $W_i$ and $D_i$ from the vectors $W_{128}$ and $D''_{128}$. The corresponding 64-chip correlator may be constructed by removing the stage associated with $W_i$ and $D_i$ from the 128-chip correlator defined by $W_{128}$ and $D''_{128}$. Further, a 32-chip correlator based on the 128-chip correlator defined by $W_{128}$ and $D''_{128}$ can be constructed in a similar manner by removing two appropriate stages from the 128-chip correlator.

In an embodiment, the weight and delay vectors associated with 128-chip sequences $a_{128}$ and $b_{128}$ are given by:

$$W_{128}=[1\ 1\ -1\ 1\ 1\ 1\ -1] \text{ and} \quad (10)$$

$$D_{128}=[64\ 32\ 16\ 8\ 4\ 1\ 2]. \quad (11)$$

The vectors $W_{128}$ and $D_{128}$ produce the pair of 128-chip Golay sequences $$a_{128}\text{=D8D727D7D8D7D828D8D727D7272827D7;} \quad (12)$$

$$b_{128}\text{=EBE414E4EBE4EB1BEBE414E4141B14E4,} \quad (13)$$

Further, the weight and delay vectors associated with 64-chip sequences $a_{64}$ and $b_{64}$ may be given by:

$$W_{64}=[1\ -1\ 1\ 1\ 1\ -1] \text{ and} \quad (14)$$

$$D_{64}=[32\ 16\ 8\ 4\ 1\ 2]. \quad (15)$$

The vectors $W_{64}$ and $D_{64}$ produce the pair of 64-chip Golay sequences $$a_{64}\text{=D8D727D7D8D7D828;} \quad (16)$$

$$b_{64}\text{=EBE414E4EBE4EB1B,} \quad (17)$$

It will be noted that the sequences $a_{64}$ and $b_{64}$ are the first halves of the respective sequences $a_{128}$ and $b_{128}$ given by (12) and (13).

Alternatively, the weight and delay vectors associated with 64-chip sequences $a'_{64}$ and $b'_{64}$ may be given by:

$$W'_{64}=[1\ -1\ 1\ -1\ 1\ -1] \text{ and} \quad (18)$$

$$D'_{64}=[32\ 16\ 8\ 4\ 1\ 2]. \quad (19)$$

The vectors $W'_{64}$ and $D'_{64}$ produce the pair of 64-chip Golay sequences $$a'_{64}\text{=2827D727282728D8;} \quad (20)$$

$$b'_{64}\text{=1B14E4141B141BEB,} \quad (21)$$

If desired, the pairs $a_{64}$ and $b_{64}$ and $a'_{64}$ and $b'_{64}$ may be used to spread the preamble, header, and data portions of a control PHY packet. Similarly, any of the sequences $a_{64}$, $b_{64}$, $a'_{64}$ or $b'_{64}$ may be used as "fixed" cyclic prefix sequences used by the block generator 1114.

Figure 26:
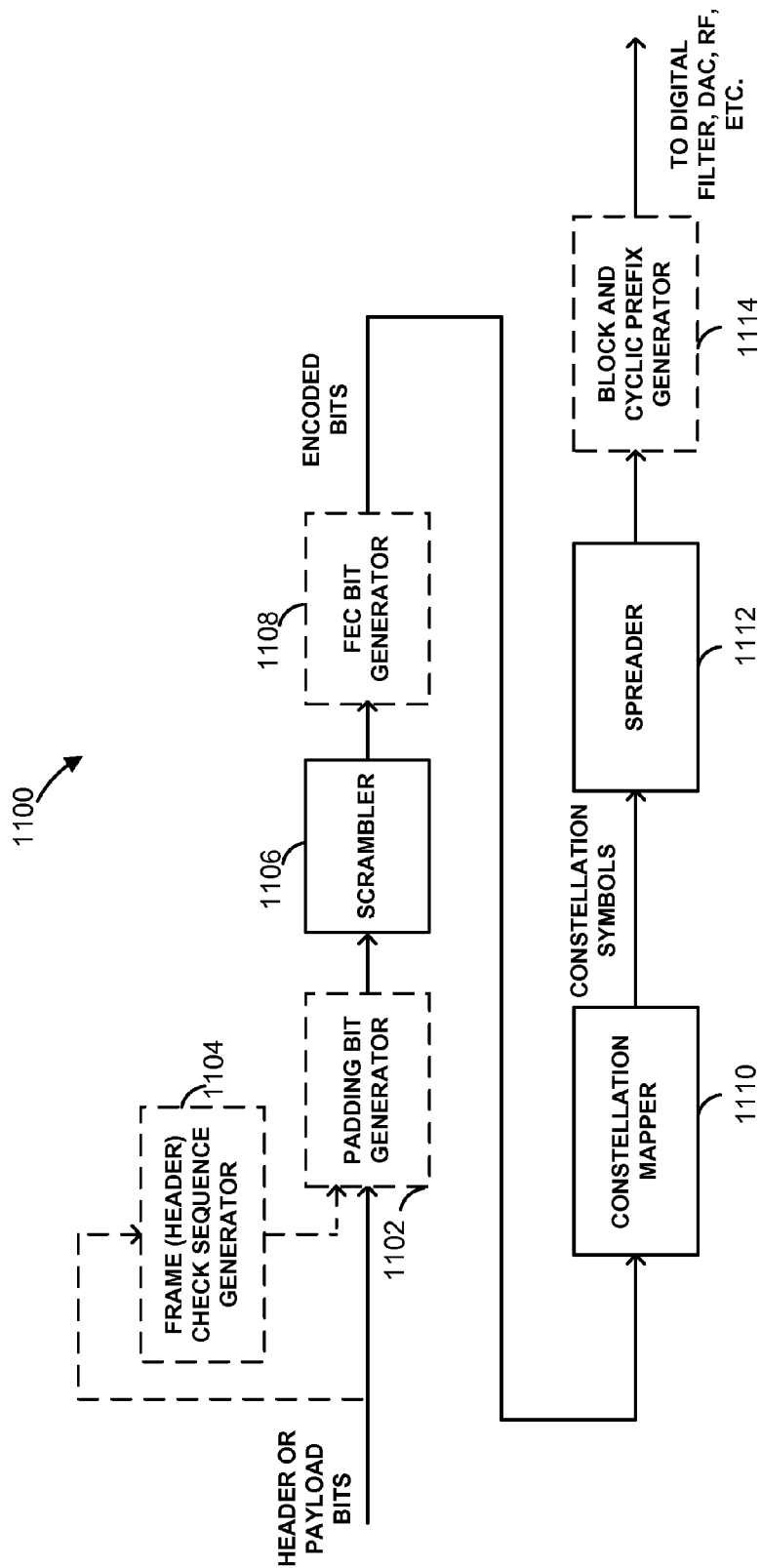
FIG. 26 depicts an example architecture of a modulator of a transmitter that may operate in the system of FIG. 1.
Figure 28:
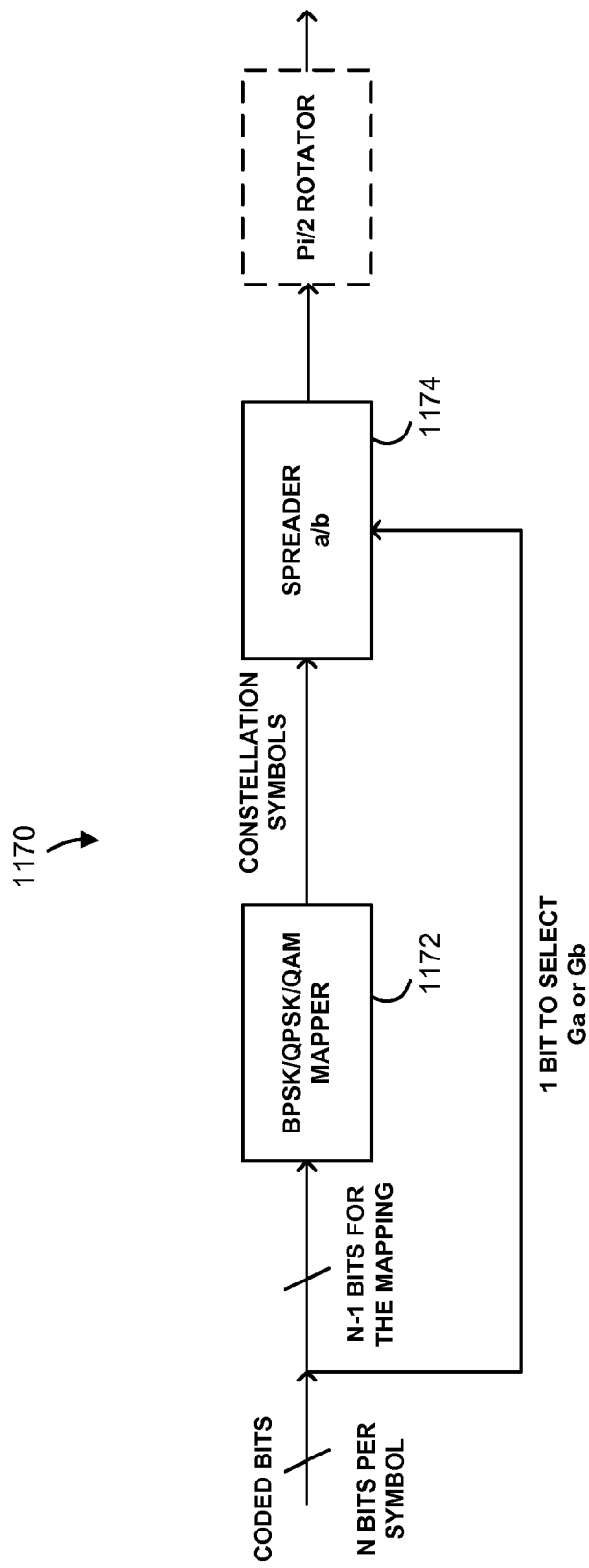
FIG. 28 is a block diagram of an example modulator and spreader for use by a transmitter that may operate in the system of FIG. 1.

As another addition or alternative to the architecture illustrated in FIGS. 2 and 26, a modulator and spreader 1170 illustrated in FIG. 28 may modulate and spread one or several of a control PHY packet preamble, header, and payload using one data bit to select between complementary sequences a and b. The modulator and spreader 1170 includes a constellation mapper 1172 that maps N−1 bits to a symbol according to the selected modulating scheme (e.g., BPSK, QPSK, QAM). However, the encoded bits may be grouped into sets of N bits, so that one bit may control the spreader 1174. In particular, the spreader 1174 may selectively apply one of a pair of complementary sequences a and b to each constellation symbol generated by the constellation mapper 1172. The spreading sequences a and b may be, for example, complementary Golay sequences of any desired length (e.g., 32, 64, 128), and the length may be also be selectable to allow transmitting control PHY preambles, headers, and payloads with different spreading factors. In these embodiments, the spreader 1170 may be implemented as illustrated in FIGS. 27A-C.

Thus, the modulator and spreader 1170 may prepare each set of N bits for transmission as a certain constellation symbol spread using a certain spreading sequence. Optionally, the modulator and spreader 1170 includes a n/2 rotator to reduce peak-to-power ratio (PAPR). As another option, the modulator and spreader 1170 may omit or bypass the constellation mapper 1172, and directly modulate individual bits by selecting between complementary sequences a and b.

Several additional techniques of modulating and spreading various portions of a control PHY packet, at least some of which may be used in conjunction with the techniques discussed above, are considered next. Referring again to FIG. 26, a transmitting device in some embodiments may include the block and cyclic prefix generator 1114. If desired, the corresponding receiving device may apply a frequency domain equalizer at the chip level prior to processing the sequences of chips using a despreader (such as the despreader 88 of FIG. 2, for example). In this manner, the receiving device may reduce or completely remove inter-symbol interference (ISI) caused by long channel delay spreading.

In some embodiments, 512 chips (e.g., four symbols each spread with the spreading factor of 128) may be aggregated into a single block, and the last 128 chips of the block may be pre-pended to the block as a cyclic prefix. It will be noted that a similar technique may be used in generating the STF and/or CEF fields of a control PHY packet preamble (see, e.g., FIGS. 16-18). It will be further noted that a fast Fourier transform (FFT) engine of an OFDM device is typically of size 512, and the block and cyclic prefix generator 1114 may accordingly use the FFT engine to process blocks of 512 chips.

In another embodiment, a known Golay sequence of 64 or 128 chips, for example, may be added to a block of 448 or 384 chips, respectively, as a cyclic prefix. Using known sequences in this manner provides reliable frequency and channel tracking as the rest of the packet is transmitted. Further, padding may be applied to form an integer number of blocks in each packet (because the receiving device 14 may not perform frequency domain equalization with a non-integer number of blocks). If desired, a 64-chip or a 128-chip sequence used to spread a portion of the data packet may also be used to define the cyclic prefix of a block.

Further, it will be noted that when the cyclic prefix generator 1114 is applied, the padding bit generator 1102 preferably adds padding bits prior to passing the data bits to the scrambler 1106 to define an integer number of blocks. Both the receiving device 14 and the transmitting device 12 can calculate the number of padding bits based on the length subfield in the header and the modulation method of the control PHY packet.

Next, FIGS. 29A-34B illustrate several example preamble formats for a control PHY packet, in which the STF includes spreading sequences that are neither identical nor complementary to the spreading sequences used in the formats of FIGS. 8A and 8B. As in the examples discussed above, the formats of FIGS. 29A-34B may be used in control PHY packets associated with beamforming or other PHY control procedures.

FIGS. 29A and 29B are diagrams of two example preamble format for a control PHY packet. FIGS. 29A and 29B generally correspond to the default formats illustrated in FIGS. 8A and 8B, respectively. In particular, FIG. 29A is a diagram of the preamble format 1200, which corresponds to FIG. 8A. FIG. 29B is a diagram of the preamble format 1210, which corresponds to FIG. 8B. In the formats illustrated in FIGS. 29A and 29B, the Golay sequence G'a is used to spread at least a portion of the STF. Compared to the Golay sequence Ga used in the format of FIG. 8A, the sequence G'a is neither identical nor complementary to Ga. Rather, the sequence G'a is unrelated to the sequence Ga. In the format illustrated in FIGS. 29A and 29B, the sequence G'a signals that the packet is a control PHY packet. Also in the format illustrated in FIGS. 29A and 29B, a delimiter field 1202 is included after the STF. The delimiter field 1202 may be useful for improving frame timing reliability, for example. The delimiter 1202 may include one or more sequences G'a.

Further, the CEF's in FIGS. 29A and 29B are the same as in FIGS. 8A and 8B, respectively. Because the sequence G'a is unrelated to the sequences Ga and Gb used in the CEF, the packets 1200 and 1210 include a cyclic prefix field 1204 that corresponds to the last portion of the CEF symbol u or v of the respective CEF.

Figures 30A, 30B:
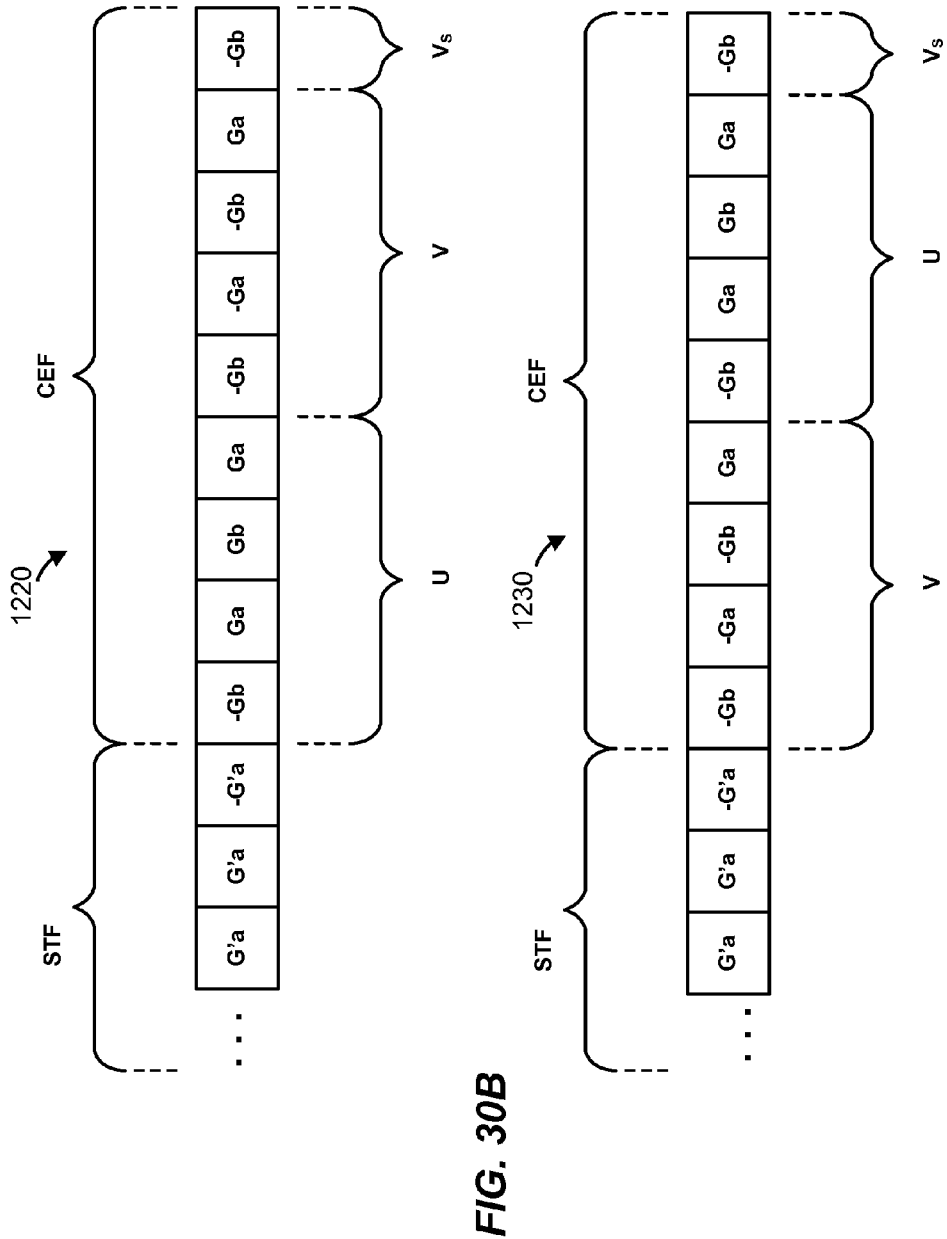
FIGS. 30A and 30B are diagrams of example formats for a preamble of a control PHY data unit, wherein a cyclic prefix in the STF is omitted as compared to the formats of FIGS. 29A and 29B.

FIGS. 30A and 30B are diagrams of two example preamble format for a control PHY packet. FIGS. 30A and 30B generally correspond to the default formats illustrated in FIGS. 8A and 8B, respectively. The preamble formats 1220 and 1230, respectively, are similar to the preamble formats 1200 and 1210, except that that the formats 1220 and 1230 omit the cyclic prefix field 1204.

Figures 31A, 31B:
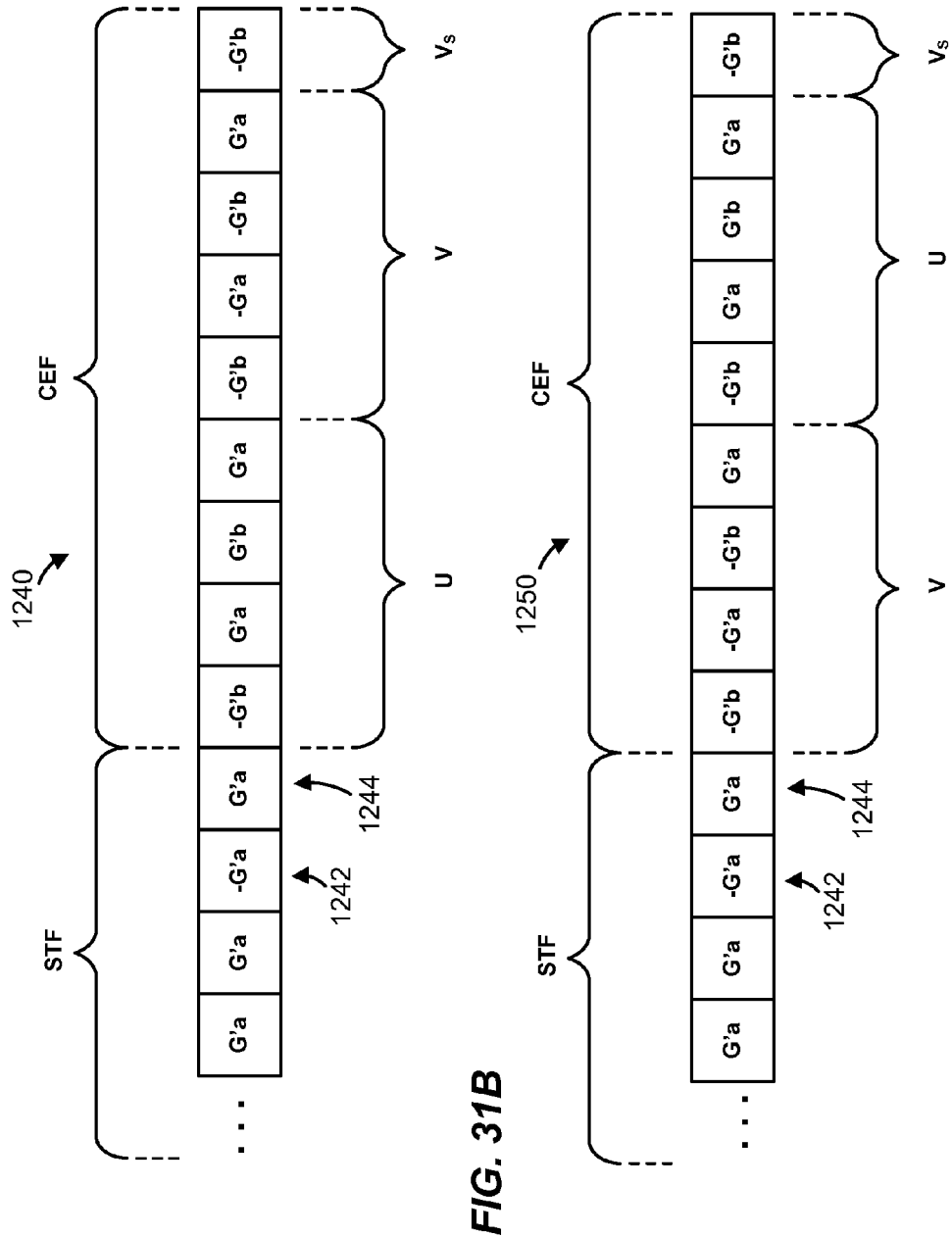
FIGS. 31A and 31B are diagrams of example formats for a preamble of a control PHY data unit, wherein different spreading sequences are used in the STF and in the CEF as compared to the format of FIGS. 8A and 8B.

FIGS. 31A and 31B are diagrams of two example preamble format for a control PHY packet. FIGS. 31A and 31B generally correspond to the default formats illustrated in FIGS. 8A and 8B, respectively. In particular, FIG. 31A is a diagram of the preamble format 1240, which corresponds to FIG. 8A. FIG. 31B is a diagram of the preamble format 1250, which corresponds to FIG. 8B. In the formats illustrated in FIGS. 31A and 31B, a pair of complementary Golay sequences G'a and G'b are used to spread both the STF and the CEF. Compared to the Golay sequences Ga and Gb used in the format of FIG. 8A, the sequences G'a and G'b are neither identical to Ga or Gb nor complementary of Ga or Gb. Rather, each of the sequences G'a and G'b is unrelated to the sequence Ga or Gb. In the formats illustrated in FIGS. 31A and 31B, the sequence G'a in the STF signals that the packet is a control PHY packet. Also in the formats illustrated in FIGS. 31A and 31B, a delimiter field 1242 is included after the STF. The delimiter field 1242 may be useful for improving frame timing reliability, for example. The delimiter field 1242 may include one or more sequences −G'a. Further, a cyclic prefix field 1244 includes the sequence G'a which corresponds to the last portion of the CEF symbol u or v of the respective CEF. It will be noted that the sign of the sequence G'a in the delimiter field 1242 is flipped relative to the earlier portion of the STF as well as relative to the cyclic prefix field 1244.

Figures 32A, 32B:
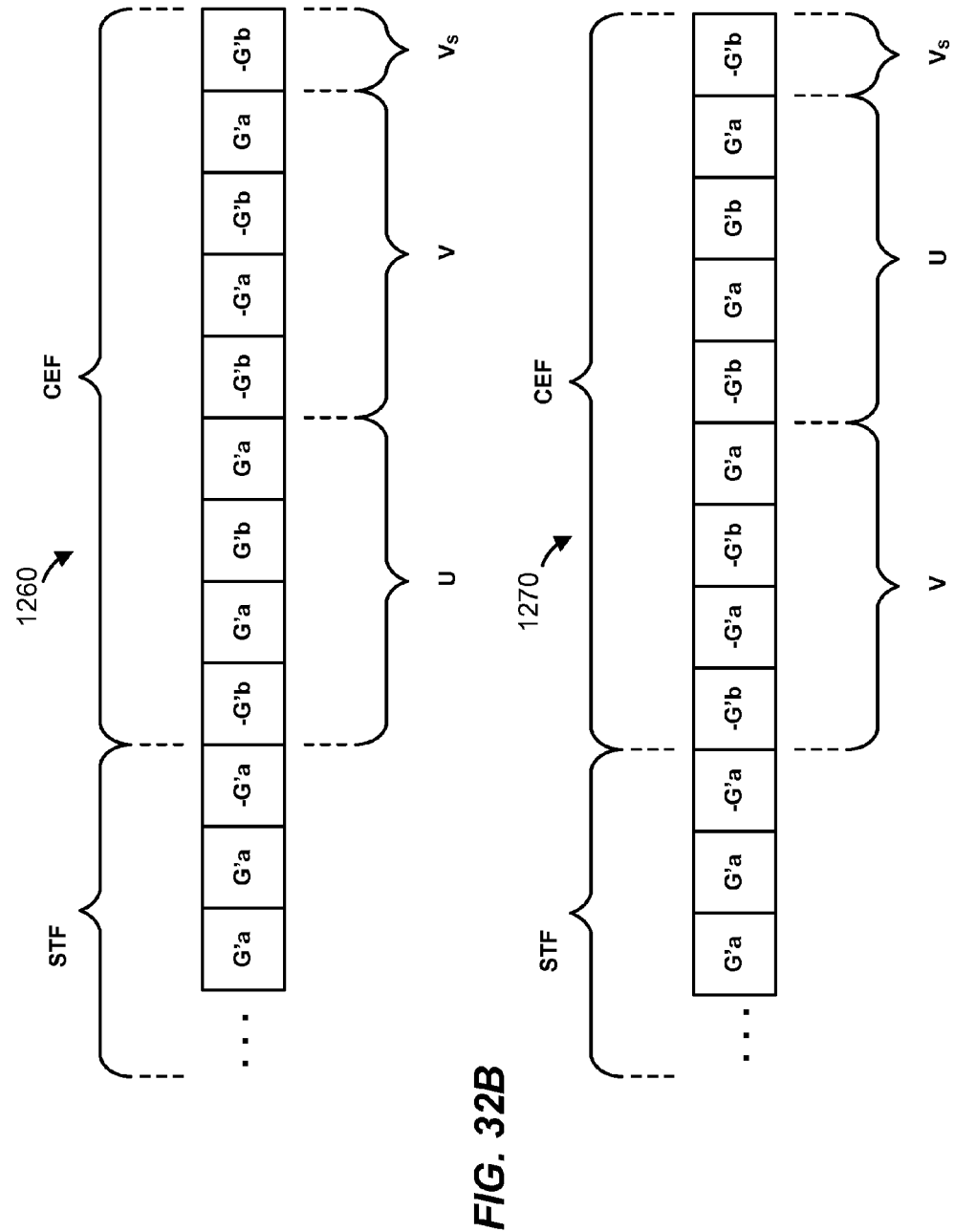
FIGS. 32A and 32B are diagrams of example formats for a preamble of a control PHY data unit, wherein a cyclic prefix in the STF is omitted as compared to the formats of FIGS. 31A and 31B.

FIGS. 32A and 32B are diagrams of two example preamble format for a control PHY packet. FIGS. 32A and 32B generally correspond to the default formats illustrated in FIGS. 8A and 8B, respectively. The preamble formats 1260 and 1270 are similar to the preamble formats 1240 and 1250, respectively, except that that the formats 1260 and 1270 omit the cyclic prefix field 1244.

FIGS. 33A and 33B are diagrams of a preamble format for a control PHY packet. FIGS. 33A and 33B generally correspond to the default formats illustrated in FIGS. 8A and 8B, respectively. In particular, FIG. 33A is a diagram of the preamble format 1280, which corresponds to FIG. 8A. FIG. 33B is a diagram of the preamble format 1290, which corresponds to FIG. 8B. In the formats illustrated in FIGS. 33A and 33B, a shorter Golay sequence $Ga_{64}$ is used to spread a portion of the STF. For example, the sequences a and b used in the formats of FIGS. 8A and 8B may be 128-chip Golay sequences $Ga_{128}$ and $Gb_{128}$, whereas the Golay sequence $Ga_{64}$ is a 64-chip sequence. If desired, the Golay sequence $Ga_{64}$ may be the first half or the second half of the sequence $Ga_{128}$, or otherwise related to the sequence $Ga_{128}$ (e.g., generated by omitting a stage corresponding to $D_i=64$ and $W_i$ using the techniques discussed with reference to FIGS. 27A-27C). Alternatively, the Golay sequence $Ga_{64}$ may be unrelated to the sequences $Ga_{128}$ or $Gb_{128}$.

In the formats illustrated in FIGS. 33A and 33B, the shorter sequence $Ga_{64}$ in the STF signals that the packet is a control PHY packet. Also in the formats illustrated in FIGS. 33A and 33B, a delimiter field 1282 is included after the STF. The delimiter field 1282 may be useful for improving frame timing reliability, for example. The delimiter field 1282 may include one or more sequences $-Ga_{64}$. Further, a cyclic prefix field 1284 includes the longer sequence $Ga_{128}$ which corresponds to the last portion of the CEF symbol u or v of the respective CEF.

Figures 34A, 34B:
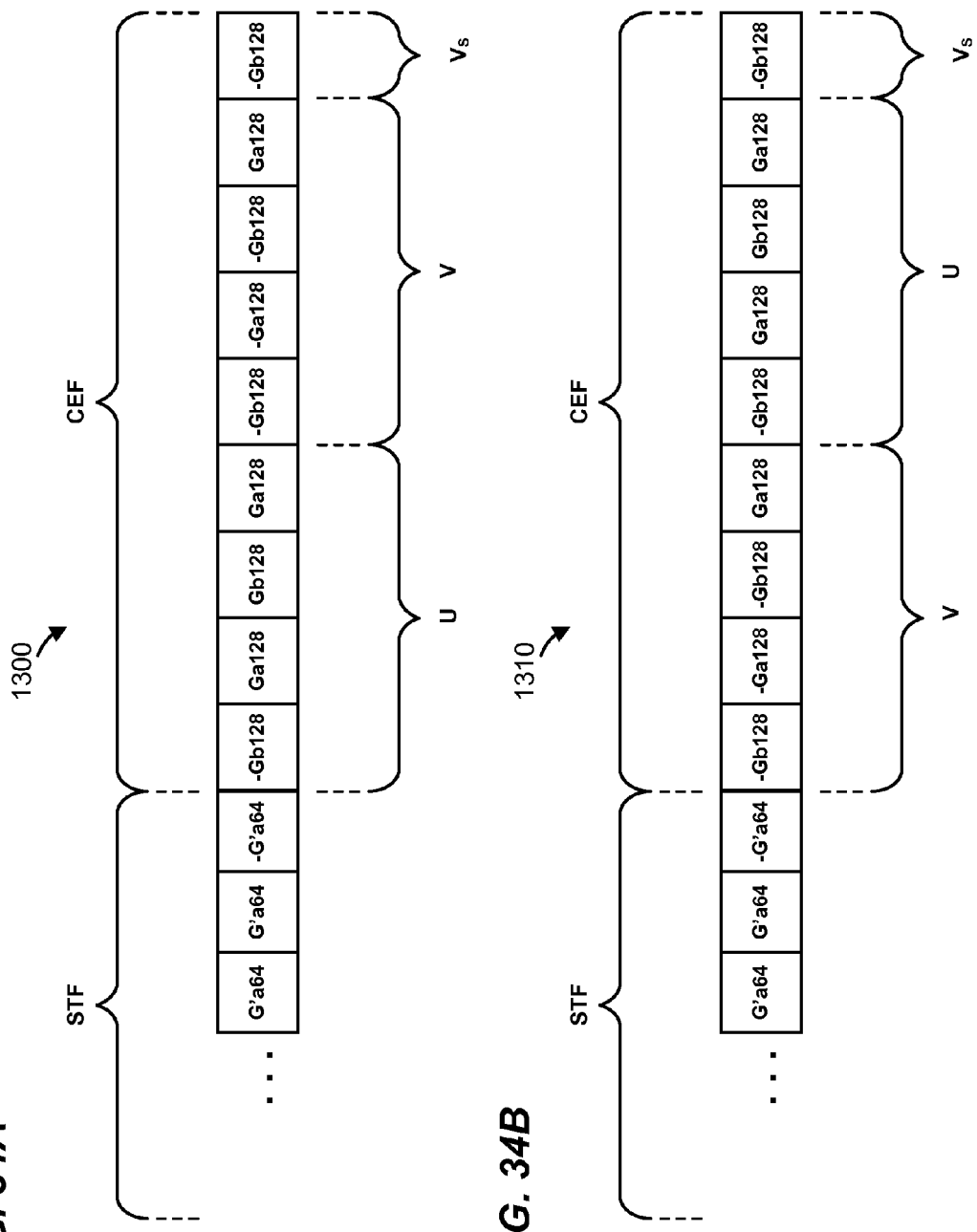
FIGS. 34A and 34B are diagrams of example formats for a preamble of a control PHY data unit, wherein a cyclic prefix in the STF is omitted as compared to the formats of FIGS. 33A and 33B.

FIGS. 34A and 34B are diagrams of a preamble format for a control PHY packet. FIGS. 34A and 34B generally correspond to the default formats illustrated in FIGS. 8A and 8B, respectively. The preamble formats 1300 and 1310 are similar to the preamble formats 1280 and 1290, respectively, except that that the formats 1300 and 1310 omit the cyclic prefix field 1284.

Generally with respect to control PHY formats discussed above, the receiving device 14 (see FIG. 1) may further benefit from detecting a particular type of a control PHY relatively early, i.e., prior to receiving the entire packet or even the entire header. For example, the receiving device 14 may determine that a packet is a control PHY packet based on the STF, and further determine that the control PHY packet is a BFT packet based on the SFD or CEF, for example. In the preamble formats 1320 and 1330 illustrated in FIGS. 35A and 35B, the sequence b, complementary to the sequence a used in the default formats of FIGS. 8A and 8B, is used to spread the STF. Additionally, the SFD in the format 1320 includes a 2-length sequence −b, −b to indicate that the packet is a control PHY packet unrelated to beamforming, and the SFD in the format 1330 includes a 2-length sequence −b, b to indicate that the packet is a BFT packet. In another example, the second −b sequence in the SFD of the format 1320 (i.e., the sequence −b adjacent to the CEF) may be replaced with a (or Ga). In another example, the b sequence in the SFD of the format 1330 (i.e., the sequence b adjacent to the CEF) may be replaced with −a (or −Ga). In these examples, the 2-length sequence −b, a in the SFD of the format 1320 indicates that the packet is a control PHY packet unrelated to beamforming, and the SFD in the format 1330 includes a 2-length sequence −b, −a to indicate that the packet is a BFT packet.

Figure 35A:
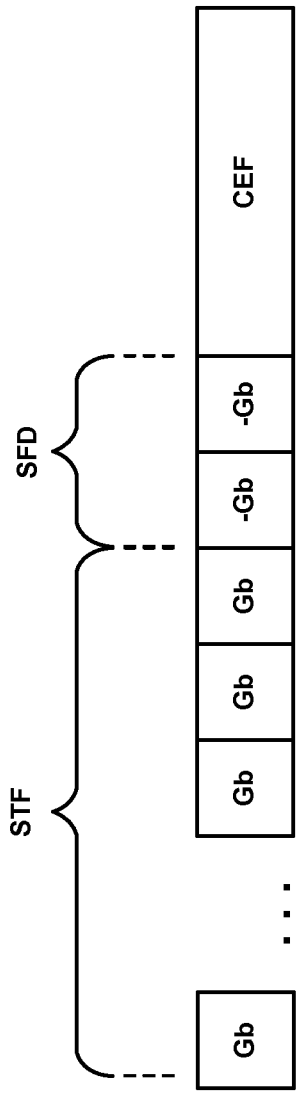
FIGS. 35A are 35B are diagrams of example formats for a preamble of a control PHY data unit, wherein an SFD field indicates whether the data unit is related to beamforming.
Figure 35B:
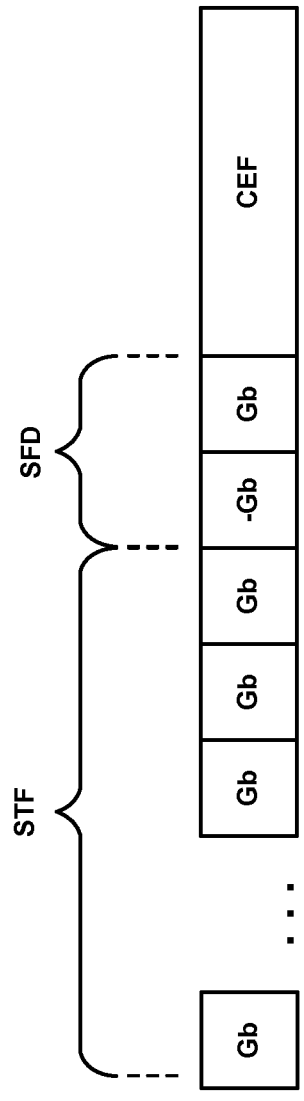

In general, the formats 1320 and 1330 need not be limited to signaling control PHY packets. It is possible to signal other parameters using various cover codes and/or complementary sequences in the SFD field. Thus, the sequence −b, −b may signal one value of any desired parameter (or formatting option) in the remaining portion of the packet, and the sequence −b, b may signal another value of the parameter. Of course, these sequences may be used in conjunction with other formatting options discussed herein, as illustrated in FIGS. 35A-B. As one example, there may be multiple types of control PHY packets having different formats, which may be referred to as sub-formats of the control PHY packet. The SFD field may be utilized to indicate to which of the sub-formats the control PHY conforms. For instance, one of the sub-formats may correspond to a BFT packet, whereas the other sub-formats may correspond to other types of control PHY packets. Thus, the SFD field may indicate whether the control PHY packet is a BFT packet. As another example, the SFD field may indicate whether the control PHY packet includes a payload.

Figure 36A:
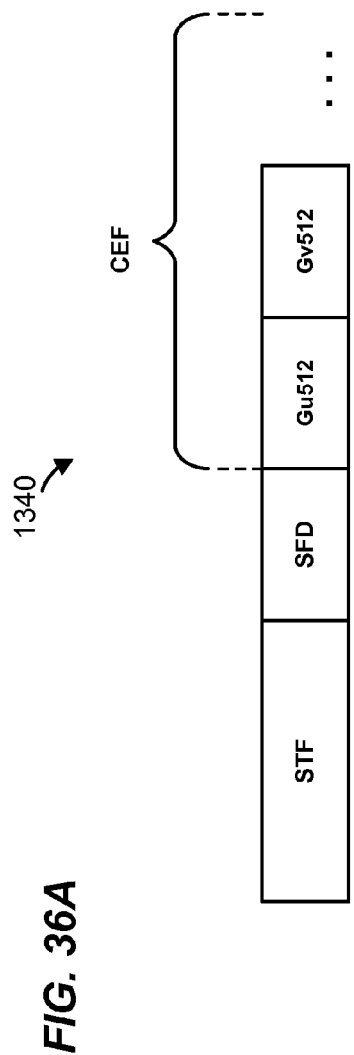
FIG. 36A are 36B are diagrams of example formats for a preamble of a control PHY data unit, wherein the ordering of channel estimation sequences in the CEF field indicates whether the control PHY data unit is related to beamforming.
Figure 36B:
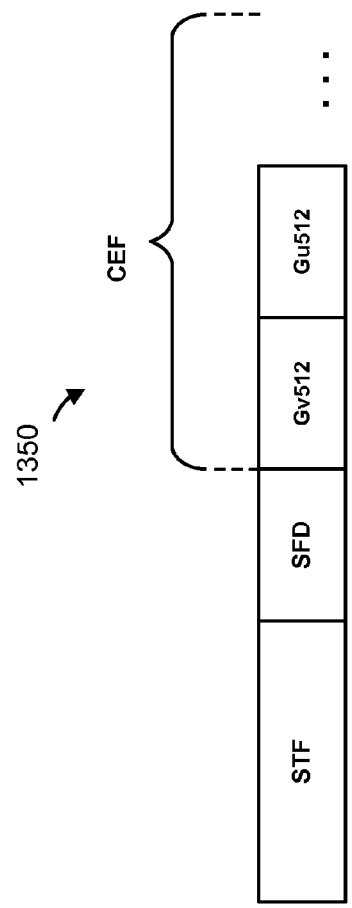

FIGS. 36A are 36B are diagrams of two example preamble formats for control PHY packets unrelated to beamforming and BFT packets. In particular, the STF of each of the formats 1340 and 1350 indicates that the packet is a control PHY packet according to one of the techniques discussed above (e.g., using a complementary sequence, sign flipping, etc.). Further, in the format 1340, the ordering of 512-chip sequences u and v indicates that the packet is a control PHY packet unrelated to beamforming, whereas the opposite ordering of the sequences u and v in the format 1350 indicates that the packet is a BFT packet.

Figure 37A:
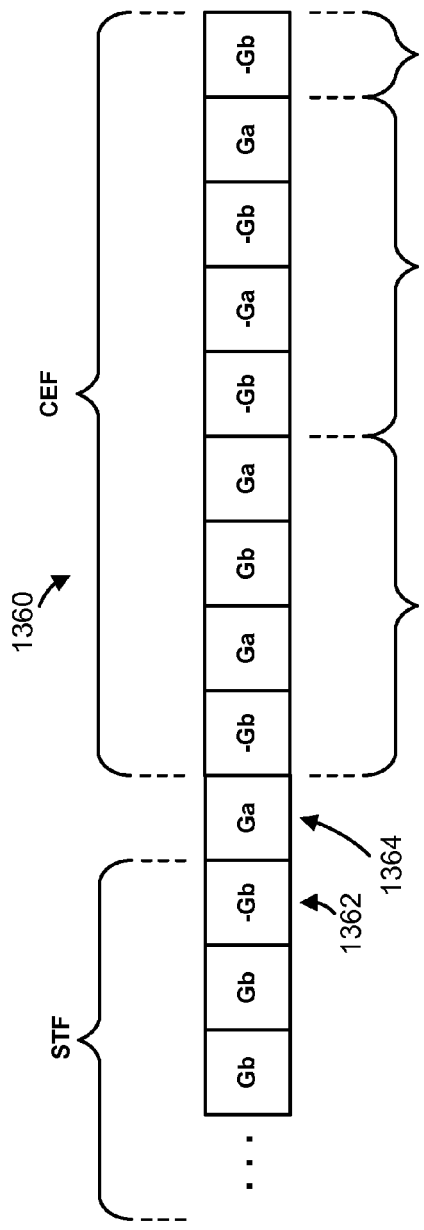
Figure 37B:
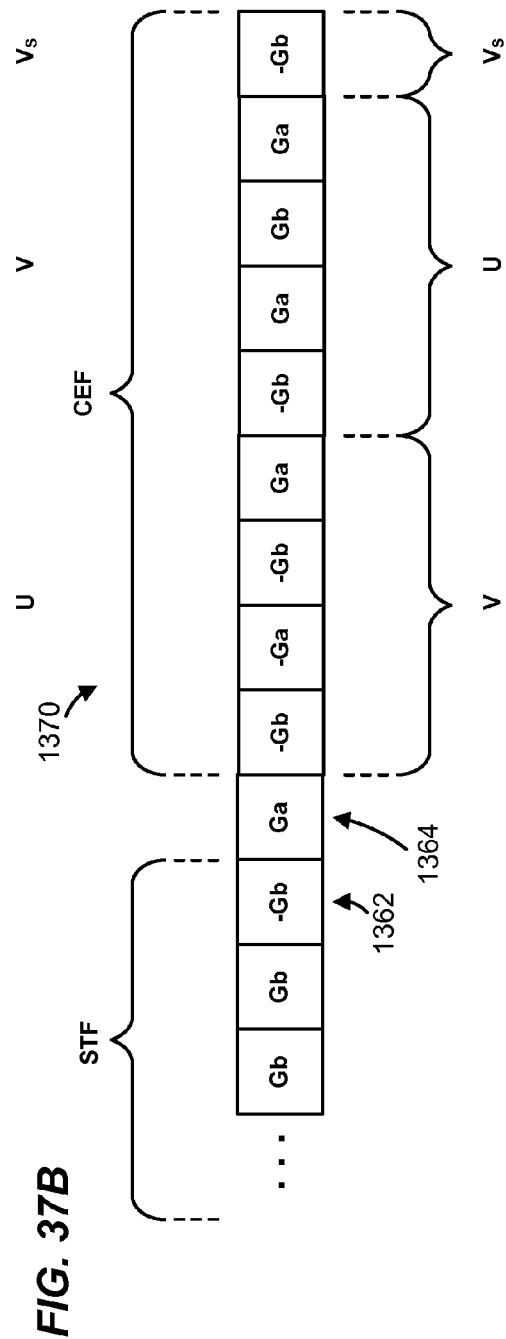

As illustrated above in FIG. 13A-B, 14, or 18, the complementary sequence b may be used in the STF to signal that the packet is a control PHY packet, and an additional delimiter field between the STF and the CEF may be useful for improving frame timing reliability. However, the sequences u and v in the formats of FIGS. 13A-B, 14, and 18 are not identical to the sequences u and v used in the default format illustrated in FIGS. 8A-B. Because it may be desirable to use the same correlator architecture for "regular" SC/OFDM and control PHY packets, an additional field may be used to permit the use of the same sequences u and v in the CEF's of all packets. As one example, FIGS. 37A and 37B are diagrams of two example preamble formats for a control PHY packet. FIG. 37A is a diagram of the preamble format 1360, which corresponds to FIG. 8A, and FIG. 37B is a diagram of the preamble format 1370 f, which corresponds to FIG. 8B. In addition to one or several instances of the field 1362 at the end of the STF, each of the formats 1360 and 1370 includes a field 1364 with a spreading sequence complementary to both the last sequence of the STF field and the first sequence of the CEF field. It is noted that the CEF's in FIGS. 37A and 37B are the same as in FIGS. 8A and 8B, respectively. If desired, the sign of the sequence in the field 1364 also may be flipped, although the field 1364 according to the formats 1360 and 1370 conveniently serves as a cyclic prefix of the respective CEF sequence u or v.

As another alternative, illustrated in FIGS. 38A-B are two example preamble formats 1380 and 1390, which correspond to FIGS. 8A and 8B, respectively. In the formats 1380 and 1390, the STF may be spread using the sequence a, and may include one or several instances of the sequence –a in a field 1382. The field 1382 may indicate that the packet is a control PHY packet. To use the same sequences u and v in the CEF as in the format of FIGS. 8A-B, the format may include a field 1384 with one or more instances of the sequence a. It is also contemplated that the fields 1364 and 1384 may be omitted in the respective formats of FIGS. 37A-38B at a relatively low cost to the resulting reliability and accuracy.

Figure 39:
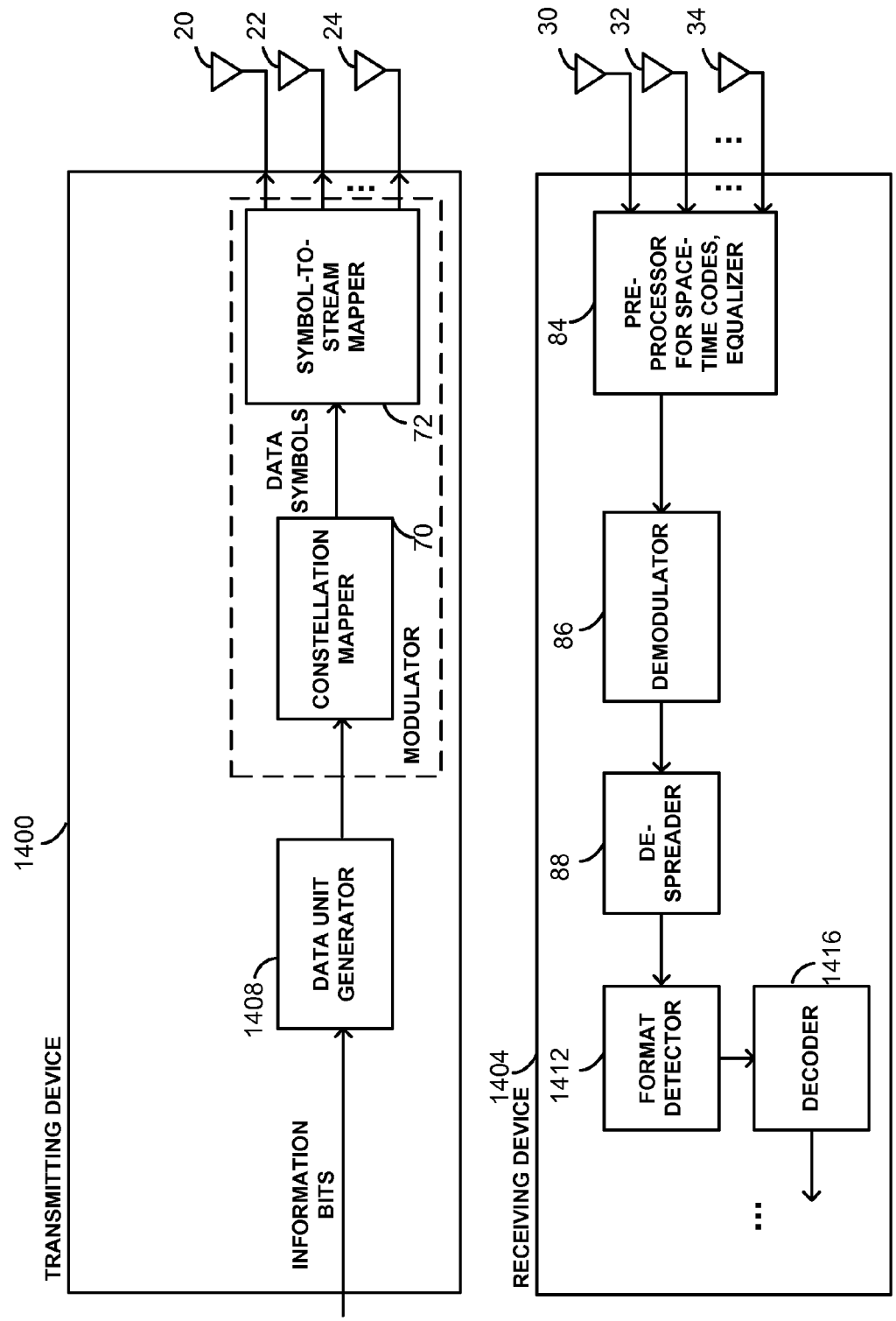
FIG. 39 are block diagrams of an example transmitter and an exaple receiver that may operate in the system of in FIG. 1.

FIG. 39 is a block diagram of an example transmitting device 1400 and an example receiving device 1404 similar to the transmitting device 12 and the receiving device 14 of FIG. 2. The transmitting device 1400 may generally convert a sequence of information bits into signals appropriate for transmission through a wireless channel (e.g., channel 16 of FIG. 1), and may have some of the same components as the transmitting device 12 of FIG. 2. The receiving device 14 may generally receive the transmitted signals and attempt to regenerate the information bits transmitted by the transmitting device 1400, and may have some of the same components as the receiving device 14 of FIG. 2.

The transmitting device 1400 may include a data unit generator 1408 configured to choose a delimiter field from a plurality of different delimiter fields corresponding to a plurality of different data unit formats or sub-formats. For example, the plurality of different delimiter fields may utilize different spread codes and/or different cover codes. The data unit generator 1408 generates a first portion of the data unit that includes a preamble having the chosen delimiter field, and wherein at least the chosen delimiter field indicates the data unit conforms to the one format or sub-format. Additionally, the data unit generator 1408 generates a second portion of the data unit according to the one format or sub-format.

The receiving device 1404 may include a data unit format detector 1412 configured to detect a delimiter field in a preamble of a received data unit, and determine one of the plurality of formats based on the delimiter field. The receiving device 1404 also may include a decoder 1416 to decode the received data unit according to the determined one format. For example, the data unit format detector 1412 may generate an indication of the detected format and provide the indication to the decoder 1416. The decoder 1416 may then decode the data unit according to the indicated format.

In one embodiment for use in a wireless communication system wherein communication devices exchange information utilizing data units that conform to a first format, a method is for generating a physical layer (PHY) data unit that conforms to a second format, wherein the PHY data unit is for transmitting PHY information. The method may comprise generating a preamble of the PHY data unit to indicate the PHY data unit conforms to the second format, and generating a second portion of the PHY data unit according to the second format, wherein the second portion of the PHY data unit includes PHY information elements. Generating the preamble to indicate the PHY data unit conforms to the second format may spreading a short training field (STF) of the preamble using a different spread code than used in the first format. Generating the preamble to indicate the PHY data unit conforms to the second format may comprise spreading a short training field (STF) of the preamble using a different cover code than used in the first format.

The second format may comprise a plurality of sub-formats, and the method may further comprise setting at least one field in a PHY header of the PHY data unit to indicate that the PHY data unit conforms to one of the sub-formats. For example, a first sub-format may include a payload and a second sub-format may omit the payload, and setting at least one field in the PHY header of the PHY data unit may include setting at least one field in the PHY header of the PHY data unit to indicate whether the PHY data unit includes the payload. As another example, one of the sub-formats may correspond to a beamforming training (BFT) data unit, and setting at least one field in the PHY header of the PHY data unit may include setting at least one field in the PHY header of the PHY data unit to indicate whether the PHY data unit is a BFT data unit. Additionally, the method may comprise choosing a delimiter field from a plurality of different delimiter fields corresponding to the plurality of sub-formats, and generating the first portion of the data unit may include generating the preamble to have the chosen delimiter field, wherein at least the chosen delimiter field indicates the data unit conforms to one sub-format from the plurality of sub-formats.

Generating the second portion of the PHY data unit according to the second format may comprise generating a PHY header to include PHY information elements not specified by the first format. For example, the first format may specify a media access control (MAC) header, and generating the second portion of the PHY data unit according to the second format may comprise generating a fixed-length payload of the PHY data unit that omits at least some of the MAC header specified by the first format.

Generating the second portion of the PHY data unit according to the second format may comprise omitting a payload from the PHY data unit.

Generating the second portion of the PHY data unit according to the second format may comprise generating the PHY header to conform to the first format, and generating a payload that does not conform to the first format, wherein the payload includes PHY information elements not specified by the first format.

The PHY data unit may be a beamforming training (BFT) data unit, and the second portion of the BFT data unit includes BFT information elements.

In another embodiment, a communication device for use in a wireless communication system is provided, wherein the communication device exchanges information with other communication devices utilizing data units that conform to a first format, and utilizes a physical layer (PHY) data unit that conforms to a second format, wherein the PHY data unit is for transmitting PHY information. The communication device may comprise a PHY data unit generator configured to generate a preamble of the PHY data unit to indicate the PHY data unit conforms to the second format, and to generate a second portion of the PHY data unit according to the second format, wherein the second portion of the PHY data unit includes PHY information elements.

The PHY data unit generator may be configured to spread a short training field (STF) of the preamble using a different spread code than used in the first format, and/or to spread the STF of the preamble using a different cover code than used in the first format.

The communication device may further comprise a PHY controller to control the PHY data unit generator during implementation of PHY functions.

The communication device may further comprise a modulator to modulate the PHY data unit.

In another embodiment for use in a wireless communication system wherein communication devices exchange information utilizing data units that conform to a first format, a method is for generating a physical layer (PHY) data unit that conforms to a second format, wherein the PHY data unit is for transmitting PHY information. The method comprises analyzing a preamble of a received data unit to determine if the received data unit is a PHY data unit. The method also comprises utilizing PHY information elements in a second portion of the PHY data unit to perform a PHY function if the received data unit is a PHY data unit, wherein the second portion of the PHY data unit conforms to the second format, and wherein the PHY information elements are not specified by the first format.

Analyzing the preamble of the received data unit is a PHY data unit may comprise determining if a short training field (STF) of the preamble was spread using a different spread code than used in the first format, and/or determining if the STF of the preamble was spread using a different cover code than used in the first format.

The PHY data unit may be a beamforming training (BFT) data unit, and the second portion of the BFT data unit may include BFT information elements, and utilizing PHY information elements in the second portion of the PHY data unit may comprise performing a beamforming training function.

The second format may comprise a plurality of sub-formats, and the method may further comprise analyzing a PHY header of the PHY data unit to determine if the PHY data unit conforms to one of the sub-formats, or analyzing a frame delimiter of the preamble to determine if the PHY data unit conforms to one of the sub-formats.

Utilizing PHY information elements in the second portion of the PHY data unit may comprise utilizing PHY information elements in a PHY header, wherein the PHY information elements in the PHY header are not specified by the first format.

The first format may specify a media access control (MAC) header, and wherein the PHY data unit includes a fixed-length payload that omits at least some of the MAC header specified by the first format.

The PHY data unit may omit a payload.

The PHY data unit may include a PHY header that conforms to the first format, and the PHY data unit may includes a payload that does not conform to the first format, wherein the payload includes PHY information elements.

In another embodiment, a communication device is for use in a wireless communication system, wherein the communication device exchanges information with other communication devices utilizing data units that conform to a first format, wherein the communication device utilizes a physical layer (PHY) data unit that conforms to a second format, wherein the PHY data unit is for transmitting PHY information. The communication device may comprise a PHY data unit detector configured to analyze a preamble of a received data unit to determine whether a short training field (STF) is spread using a different spread code than used in the first format and/or to determine whether the STF is spread using a different cover code than used in the first format. The communication device also comprises a PHY controller to utilize the PHY information elements in a second portion of the PHY data unit to perform a PHY function if the received data unit is a PHY data unit, wherein the second portion of the PHY data unit conforms to the second format, and wherein the PHY information elements are not specified by the first format.

The PHY controller may comprise a beamforming training controller.

The communication device may further comprise a demodulator to demodulate the received data unit.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method implemented in a communication device configured to generate (i) physical layer (PHY) data units corresponding to a first modulation mode and (ii) PHY data units corresponding to a second modulation mode different than the first modulation mode, the method comprising:
    generating, in the communication device, a PHY data unit having a channel estimation field (CEF), wherein generating the PHY data unit includes
        generating a sequence u of the CEF, wherein the sequence u of the CEF (i) includes complementary Golay sequences a and b and (ii) is spread with a first cover code,
        generating a sequence v of the CEF, wherein the sequence v of the CEF (i) includes the complementary Golay sequences a and b, and (ii) is spread with a second cover code different than the first cover code, and
        generating the PHY data unit such that, within the CEF of the PHY data unit, (i) the sequence u precedes the sequence v when the PHY data unit corresponds to the first modulation mode, and (ii) the sequence v precedes the sequence u when the PHY data unit corresponds to the second modulation mode; and
    causing, with the communication device, the PHY data unit to be transmitted via a communication channel.

2. The method of claim 1, wherein the sequence v of the CEF is complementary to the sequence u of the CEF.

3. The method of claim 2, wherein the sequence u of the CEF and the sequence v of the CEF form a complementary Golay pair.

4. The method of claim 3, wherein generating the PHY data unit includes generating the PHY data unit such that, within the CEF of the PHY data unit, (i) the sequence u immediately precedes the sequence v when the PHY data unit corresponds to the first modulation mode, and (ii) the sequence v immediately precedes the sequence u when the PHY data unit corresponds to the second modulation mode.

5. The method of claim 4, wherein generating the PHY data unit further includes generating an additional sequence of the CEF that immediately follows (i) the sequence v of the CEF when the PHY data unit corresponds to the first modulation mode, and (ii) the sequence u of the CEF when the PHY data unit corresponds to the second modulation mode, and wherein the additional sequence of the CEF is a cyclic postfix.

6. The method of claim 1, wherein:
    the sequence u of the CEF includes a sequence [b a b a] spread with the first cover code; and
    the sequence v of the CEF includes the sequence [b a b a] spread with the second cover code.

7. The method of claim 1, wherein generating the PHY data unit further includes generating a short training field (STF) that precedes (i) the sequence u of the CEF when the PHY data unit corresponds to the first modulation mode, and (ii) the sequence v of the CEF when the PHY data unit corresponds to the second modulation mode, and wherein the STF includes a plurality of consecutive repetitions of the Golay sequence a.

8. The method of claim 7, wherein the STF further includes a flipped Golay sequence −a immediately following the plurality of consecutive repetitions of the Golay sequence a.

9. The method of claim 1, wherein the first modulation mode is a single carrier (SC) mode, and wherein the second modulation mode is an orthogonal frequency division multiplexing (OFDM) mode.

10. A communication device for use in a wireless communication system, wherein the communication device exchanges information with other communication devices utilizing (i) physical layer (PHY) data units corresponding to a first modulation mode and (ii) PHY data units corresponding to a second modulation mode different than the first modulation mode, the communication device comprising:
    an integrated circuit device configured to:
        generate a PHY data unit having a channel estimation field (CEF), wherein the PHY data unit generator is configured to generate the PHY data unit at least by
            generating a sequence u of the CEF, wherein the sequence u of the CEF (i) includes complementary Golay sequences a and b and (ii) is spread with a first cover code,
            generating a sequence v of the CEF, wherein the sequence v of the CEF (i) includes the complementary Golay sequences a and b, and (ii) is spread with a second cover code different than the first cover code, and
            generating the PHY data unit such that that, within the CEF of the PHY data unit, (i) the sequence u precedes the sequence v when the PHY data unit corresponds to the first modulation mode, and (ii) the sequence v precedes the sequence u when the PHY data unit corresponds to the second modulation mode; and
        cause the PHY data unit to be transmitted via a communication channel.

11. The communication device of claim 10, wherein:
    the sequence u of the CEF and the sequence v of the CEF form a complementary Golay pair; and
    the integrated circuit device is configured to generate the PHY data unit such that, within the CEF of the PHY data unit, (i) the sequence u immediately precedes the sequence v when the PHY data unit corresponds to the first modulation mode, and (ii) the sequence v immediately precedes the sequence u when the PHY data unit corresponds to the second modulation mode.

12. The communication device of claim 11, wherein:
    the integrated circuit device is further configured to generate the PHY data unit by generating an additional sequence of the CEF that immediately follows (i) the sequence v of the CEF when the PHY data unit corresponds to the first modulation mode, and (ii) the sequence u of the CEF when the PHY data unit corresponds to the second modulation mode; and
the additional sequence of the CEF is a cyclic postfix.

13. The communication device of claim 10, wherein:
the sequence u of the CEF includes a sequence [b a b a] spread with the first cover code; and
the sequence v of the CEF includes the sequence [b a b a] spread with the second cover code.

14. The communication device of claim 10, wherein the first modulation mode is a single carrier (SC) mode, and wherein the second modulation mode is an orthogonal frequency division multiplexing (OFDM) mode.

15. A method implemented by a communication device configured to generate (i) physical layer (PHY) data units corresponding to a single carrier (SC) mode and (ii) PHY data units corresponding to an orthogonal frequency division multiplexing (OFDM) mode, the method comprising:
generating, in the communication device, a PHY data unit having a channel estimation field (CEF), wherein generating the PHY data unit includes
generating a sequence u of the CEF, wherein the sequence u of the CEF (i) includes complementary Golay sequences a and b in a sequence [b a b a] and (ii) is spread with a first cover code,
generating a sequence v of the CEF, wherein the sequence v of the CEF (i) includes the complementary Golay sequences a and b in the sequence [b a b a], (ii) is spread with a second cover code different than the first cover code, and (iii) forms a complementary Golay pair with the sequence u of the CEF,
generating an additional sequence of the CEF that immediately follows the sequence u of the CEF or the sequence v of the CEF, wherein the additional sequence of the CEF is a cyclic postfix, and
generating the PHY data unit such that, within the CEF of the PHY data unit, (i) the sequence u immediately precedes the sequence v when the PHY data unit corresponds to the SC mode, and (ii) the sequence v immediately precedes the sequence u when the PHY data unit corresponds to the OFDM mode
causing, with the communication device, the PHY data unit to be transmitted via a communication channel.

16. The method of claim 15, wherein generating the PHY data unit further includes:
generating a short training field (STF) that precedes (i) the sequence u of the CEF when the PHY data unit corresponds to the SC mode, and (ii) the sequence v of the CEF when the PHY data unit corresponds to the OFDM mode, wherein the STF includes
a plurality of consecutive repetitions of the Golay sequence a, and
a flipped Golay sequence −a immediately following the plurality of consecutive repetitions of the Golay sequence a.

17. A communication device for use in a wireless communication system, wherein the communication device exchanges information with other communication devices utilizing (i) physical layer (PHY) data units corresponding to a single carrier (SC) mode and (ii) PHY data units corresponding to an orthogonal frequency division multiplexing (OFDM) mode, the communication device comprising:
an integrated circuit device configured to:
generate a PHY data unit having a channel estimation field (CEF), wherein the PHY data unit generator is configured to generate the PHY data unit at least by
generating a sequence u of the CEF, wherein the sequence u of the CEF (i) includes complementary Golay sequences a and b in a sequence [b a b a] and (ii) is spread with a first cover code,
generating a sequence v of the CEF, wherein the sequence v of the CEF (i) includes the complementary Golay sequences a and b in the sequence [b a b a], (ii) is spread with a second cover code different than the first cover code, and (iii) forms a complementary Golay pair with the sequence u of the CEF,
generating an additional sequence of the CEF that immediately follows the sequence u of the CEF or the sequence v of the CEF, wherein the additional sequence of the CEF is a cyclic postfix, and
generating the PHY data unit such that, within the CEF of the PHY data unit, (i) the sequence u immediately precedes the sequence v when the PHY data unit corresponds to the SC mode, and (ii) the sequence v immediately precedes the sequence u when the PHY data unit corresponds to the OFDM mode; and
cause the PHY data unit to be transmitted via a communication channel.

18. The communication device of claim 17, wherein the integrated circuit device is further configured to generate the PHY data unit by:
generating a short training field (STF) that precedes (i) the sequence u of the CEF when the PHY data unit corresponds to the SC mode, and (ii) the sequence v of the CEF when the PHY data unit corresponds to the OFDM mode, wherein the STF includes
a plurality of consecutive repetitions of the Golay sequence a, and
a flipped Golay sequence −a immediately following the plurality of consecutive repetitions of the Golay sequence a.

* * * * *